(12) United States Patent
Tadlock et al.

(10) Patent No.: US 6,869,287 B1
(45) Date of Patent: Mar. 22, 2005

(54) METHOD OF TEACHING READING

(76) Inventors: Kyle Ray Tadlock, 32 SE. Bay East Dr., Shelton, WA (US) 98584; Dolores Rae Tadlock, SE. 90 Low Rd., Shelton, WA (US) 98584

( * ) Notice: Subject to any disclaimer, the term of this patent is extended or adjusted under 35 U.S.C. 154(b) by 354 days.

(21) Appl. No.: 09/741,483

(22) Filed: Dec. 15, 2000

Related U.S. Application Data

(60) Provisional application No. 60/172,276, filed on Dec. 17, 1999.

(51) Int. Cl.$^7$ .............................................. G09B 17/00
(52) U.S. Cl. ....................................................... 434/178
(58) Field of Search ................................ 434/178, 179, 434/185, 156, 157, 219

(56) References Cited

U.S. PATENT DOCUMENTS

| | | | |
|---|---|---|---|
| 4,189,852 A | | 2/1980 | Chatlien |
| 4,204,343 A | * | 5/1980 | Brooks ........................ 434/172 |
| 4,245,405 A | | 1/1981 | Lien et al. |
| 4,406,626 A | | 9/1983 | Anderson et al. |
| 4,650,426 A | | 3/1987 | Brigance |
| 4,820,165 A | | 4/1989 | Kanapa |
| 5,007,838 A | | 4/1991 | Cochran |
| 5,010,495 A | | 4/1991 | Willetts |
| 5,788,502 A | * | 8/1998 | Shea .......................... 434/157 |
| 6,305,942 B1 | * | 10/2001 | Block et al. ................ 434/156 |

OTHER PUBLICATIONS

READ RIGHT History, 1995.*
Productivity Magazine, 1995.*
Tadlock, D.R., "A Practical Application of Psycholinguistics and Piaget's Theory to Reading Instruction," *Reading Psychology: An International Quarterly*, vol. 7, 1986, pp. 183–195.

* cited by examiner

*Primary Examiner*—Kurt Fernstrom
(74) *Attorney, Agent, or Firm*—Christensen O'Connor Johnson Kindness PLLC

(57) ABSTRACT

A method for teaching reading is provided, reflecting the understanding that reading is a process, operating primarily implicitly and guided by a neural network built specifically for that purpose. During the Excellent Reading component, the student must produce excellent reading—made possible by enhancing the predictability of the text through listening repeatedly to it interspersed with reading it silently. The student's brain is seduced into utilizing prediction of meaning as the major reading strategy, which allows it to develop implicitly-operating prediction and confirmation strategies that consistently yield excellent reading. During the Coached Reading component, as the student reads the text aloud from unfamiliar text, a tutor gives feedback designed to assist the brain realize its current reading strategies are not producing the desired results and the erroneously-built neural network needs remodeling. During the Independent Reading component, the brain experiments with the strategy ideas formulated as a result of experiencing the other components.

13 Claims, 39 Drawing Sheets

INTERVIEW FORM FOR MIDDLE/HIGH SCHOOL STUDENTS

| NAME | GENDER | DATE OF BIRTH | DATE OF CONSULTATION |
|---|---|---|---|
| HIGHEST GRADE COMPLETED | INITIAL RANGE | PRIMARY LANGUAGE / FOR ESL: WHICH LANGUAGE IS SPOKEN IN YOUR HOME? | FOR ESL: HOW LONG HAVE YOU BEEN SPEAKING ENGLISH? |
| HAVE YOU EVER HAD SPECIAL HELP IN READING? YES ☐ NO ☐ | | IF NO: DO YOU FEEL LIKE YOU NEED SPECIAL HELP? YES ☐ NO ☐ | |
| WHAT ABOUT NOW? DO YOU THINK YOU ARE A GOOD READER OR DO YOU THINK YOUR READING COULD BE IMPROVED? GOOD READER ☐ COULD BE IMPROVED ☐  IF COULD BE IMPROVED: DESCRIBE YOUR READING; IN WHAT WAY COULD IT BE IMPROVED? | | WHAT DO YOU CURRENTLY READ?  ☐ NOTHING   ☐ WORK MATERIALS  ☐ NEWSPAPER  ☐ MAGAZINES  ☐ READER'S DIGEST ☐ NOVELS  ☐ BIBLE   ☐ OTHER | |
| DO YOU LIKE TO READ? YES ☐ NO ☐ | | DO YOU EVER GET SO INVOLVED IN YOUR READING THAT YOU ARE NOT AWARE OF THE TIME PASSING OR OF ANYTHING GOING ON AROUND YOU? YES ☐ NO ☐ | |
| UNUSUAL SPEECH PATTERNS, IF ANY: | | | |

*Fig. 1*

|  | ERRORS | SELF CORRECTIONS | TEXT DEVIATIONS THAT WORK | UNKNOWN WORDS | SPEECH PATTERNS |
|---|---|---|---|---|---|
|  |  |  |  |  |  |
| TOTAL |  |  |  |  |  |

ERRORS
  1    2    3
NONE  MODERATE  SEVERE

SELF-CORRECTIONS, TEXT DEVIATIONS THAT WORK, AND UNKNOWN WORDS EXCESSIVE IF MORE THAN 1 (EACH).

__ UNNATURAL PAUSING            __ ENUNCIATION
__ TONE QUALITY OF LANGUAGE WAS INAPPROPRIATE    __ WORKING AT READING
__ RHYTHM "OFF"                 __ REPEATED CORRECTLY READ TEXT

UNNATURAL CADENCE? ____
                   SCORE
CADENCE (0-4)   ____   ____   ____   ____   ____
               NONE(0) SUBTLE(1)  (2)  MODERATE(3)  (4)

ERRORS      ____    ____      ____        ____
           NONE   SUBTLE    MODERATE     SEVERE

COMPREHENSION PROBLEM
ON THE PASSAGE?  ____    ____      ____        ____
                NONE   SUBTLE    MODERATE     SEVERE

EXCESSIVE SELF-CORRECTIONS?  YES ☐ NO ☐   EXCESSIVE TEXT DEVIATIONS THAT WORK?  YES ☐ NO ☐
EXCESSIVE UNKNOWN WORDS?     YES ☐ NO ☐   UNUSUAL SPEECH PATTERNS               YES ☐ NO ☐

*Fig. 2*

| | ERRORS | SELF CORRECTIONS | TEXT DEVIATIONS THAT WORK | UNKNOWN WORDS | SPEECH PATTERNS |
|---|---|---|---|---|---|
| | | | | | |
| TOTAL | | | | | |

~1112

~1115

ERRORS
  1    2    3    4    5
NONE  SUBTLE  MODERATE  SEVERE

SELF-CORRECTIONS, TEXT DEVIATIONS THAT WORK, AND UNKNOWN WORDS EXCESSIVE IF MORE THAN 1 (EACH).

~1117

__ UNNATURAL PAUSING        __ ENUNCIATION
__ TONE QUALITY OF LANGUAGE WAS INAPPROPRIATE   __ WORKING AT READING
__ RHYTHM "OFF"              __ REPEATED CORRECTLY READ TEXT

UNNATURAL CADENCE? ___
                    SCORE
CADENCE (0-4)
         ___      ___       ___      ___        ___
        NONE (0) SUBTLE (1)  (2)  MODERATE (3)  (4)

ERRORS
       ___      ___       ___         ___
      NONE    SUBTLE    MODERATE    SEVERE

COMPREHENSION PROBLEM
ON THE PASSAGE?
       ___      ___       ___         ___
      NONE    SUBTLE    MODERATE    SEVERE

EXCESSIVE SELF-CORRECTIONS?  YES ☐ NO ☐   EXCESSIVE TEXT DEVIATIONS THAT WORK? YES ☐ NO ☐
EXCESSIVE UNKNOWN WORDS?     YES ☐ NO ☐   UNUSUAL SPEECH PATTERNS              YES ☐ NO ☐

*Fig. 3*

|  | ERRORS | SELF CORRECTIONS | TEXT DEVIATIONS THAT WORK | UNKNOWN WORDS | SPEECH PATTERNS |
|---|---|---|---|---|---|
|  |  |  |  |  |  |
| TOTAL |  |  |  |  |  |

ERRORS
    1    2-3    4-5    6-7    8
NONE  SUBTLE    MODERATE    SEVERE

SELF-CORRECTIONS, TEXT DEVIATIONS THAT WORK, AND UNKNOWN WORDS EXCESSIVE IF MORE THAN 3 (EACH).

___ UNNATURAL PAUSING      ___ ENUNCIATION
___ TONE QUALITY OF LANGUAGE WAS INAPPROPRIATE      ___ WORKING AT READING
___ RHYTHM "OFF"      ___ REPEATED CORRECTLY READ TEXT

UNNATURAL CADENCE? ____
           SCORE
CADENCE (0-4)    ___    ___    ___    ___    ___
                NONE (0)  SUBTLE (1)  (2)  MODERATE (3)  (4)

ERRORS
        NONE    SUBTLE    MODERATE    SEVERE

COMPREHENSION PROBLEM ON THE PASSAGE?
        NONE    SUBTLE    MODERATE    SEVERE

EXCESSIVE SELF-CORRECTIONS? YES ☐ NO ☐    EXCESSIVE TEXT DEVIATIONS THAT WORK? YES ☐ NO ☐
EXCESSIVE UNKNOWN WORDS? YES ☐ NO ☐    UNUSUAL SPEECH PATTERNS YES ☐ NO ☐

*Fig. 4*

| | ERRORS | SELF CORRECTIONS | TEXT DEVIATIONS THAT WORK | UNKNOWN WORDS | SPEECH PATTERNS |
|---|---|---|---|---|---|
| *1112* | | | | | |
| ERRORS<br>1-2  3-4  5-6  7-8  9<br>NONE SUBTLE MODERATE SEVERE  *1115* | | | | | |
| SELF-CORRECTIONS, TEXT DEVIATIONS THAT WORK, AND UNKNOWN WORDS EXCESSIVE IF MORE THAN 3 (EACH).  *1117* | | | | | |
| TOTAL | | | | | |

___ UNNATURAL PAUSING      ___ ENUNCIATION
___ TONE QUALITY OF LANGUAGE WAS INAPPROPRIATE    ___ WORKING AT READING
___ RHYTHM "OFF"      ___ REPEATED CORRECTLY READ TEXT

UNNATURAL CADENCE? ____
        SCORE
CADENCE (0-4)    ____    ____    ____    ____    ____
        NONE (0)   SUBTLE (1)   (2)   MODERATE (3)   (4)

ERRORS   ____   ____   ____   ____   ____
       NONE    SUBTLE    MODERATE    SEVERE

COMPREHENSION PROBLEM
ON THE PASSAGE?   ____   ____   ____   ____   ____
       NONE    SUBTLE    MODERATE    SEVERE

EXCESSIVE SELF-CORRECTIONS?   YES ☐   NO ☐    EXCESSIVE TEXT DEVIATIONS THAT WORK?   YES ☐   NO ☐
EXCESSIVE UNKNOWN WORDS?   YES ☐   NO ☐    UNUSUAL SPEECH PATTERNS   YES ☐   NO ☐

*Fig. 5*

|  | ERRORS | SELF CORRECTIONS | TEXT DEVIATIONS THAT WORK | UNKNOWN WORDS | SPEECH PATTERNS |
|---|---|---|---|---|---|
| *(1112)* | | | | | |
| ERRORS<br>1-2  3  4-5  6  7<br>NONE SUBTLE MODERATE SEVERE *(1115)* | | | | | |
| SELF-CORRECTIONS, TEXT DEVIATIONS THAT WORK, AND UNKNOWN WORDS EXCESSIVE IF MORE THAN 4 (EACH). *(1117)* | | | | | |
| TOTAL | | | | | |

```
__ UNNATURAL PAUSING                        __ ENUNCIATION
__ TONE QUALITY OF LANGUAGE WAS INAPPROPRIATE   __ WORKING AT READING
__ RHYTHM "OFF"                             __ REPEATED CORRECTLY READ TEXT

UNNATURAL CADENCE?    _____
                       SCORE
CADENCE (0-4)     _____    _____    _____    _____    _____
                 NONE (0)  SUBTLE (1)  (2)   MODERATE (3)  (4)
```

ERRORS
_____ _____ _____ _____
NONE   SUBTLE   MODERATE   SEVERE

COMPREHENSION PROBLEM ON THE PASSAGE?
_____ _____ _____ _____
NONE   SUBTLE   MODERATE   SEVERE

EXCESSIVE SELF-CORRECTIONS?  YES ☐  NO ☐   EXCESSIVE TEXT DEVIATIONS THAT WORK?  YES ☐  NO ☐
EXCESSIVE UNKNOWN WORDS?     YES ☐  NO ☐   UNUSUAL SPEECH PATTERNS                YES ☐  NO ☐

*Fig. 6*

|  | ERRORS | SELF CORRECTIONS | TEXT DEVIATIONS THAT WORK | UNKNOWN WORDS | SPEECH PATTERNS |
|---|---|---|---|---|---|
| (1112) | | | | | |
| ERRORS 1 2 3 4 NONE SUBTLE MODERATE SEVERE (1115) | | | | | |
| SELF-CORRECTIONS, TEXT DEVIATIONS THAT WORK, AND UNKNOWN WORDS EXCESSIVE IF MORE THAN 3 (EACH). (1117) | | | | | |
| TOTAL | | | | | |

___ UNNATURAL PAUSING ___ ENUNCIATION
___ TONE QUALITY OF LANGUAGE WAS INAPPROPRIATE ___ WORKING AT READING
___ RHYTHM "OFF" ___ REPEATED CORRECTLY READ TEXT

UNNATURAL CADENCE? _____
SCORE
CADENCE (0-4) _____
NONE (0)   SUBTLE (1)   (2)   MODERATE (3)   (4)

ERRORS
NONE   SUBTLE   MODERATE   SEVERE

COMPREHENSION PROBLEM
ON THE PASSAGE?
NONE   SUBTLE   MODERATE   SEVERE

EXCESSIVE SELF-CORRECTIONS?   YES ☐ NO ☐   EXCESSIVE TEXT DEVIATIONS THAT WORK?   YES ☐ NO ☐
EXCESSIVE UNKNOWN WORDS?   YES ☐ NO ☐   UNUSUAL SPEECH PATTERNS   YES ☐ NO ☐

*Fig. 7*

| | ERRORS | SELF CORRECTIONS | TEXT DEVIATIONS THAT WORK | UNKNOWN WORDS | SPEECH PATTERNS |
|---|---|---|---|---|---|
| *1112* | | | | | |
| ERRORS    1   2   3   4 <br> NONE SUBTLE   MODERATE   SEVERE    *1115* | | | | | |
| SELF-CORRECTIONS, TEXT DEVIATIONS THAT WORK, AND UNKNOWN WORDS EXCESSIVE IF MORE THAN 3 (EACH).    *1117* | | | | | |
| TOTAL | | | | | |

___ UNNATURAL PAUSING      ___ ENUNCIATION
___ TONE QUALITY OF LANGUAGE WAS INAPPROPRIATE    ___ WORKING AT READING
___ RHYTHM "OFF"      ___ REPEATED CORRECTLY READ TEXT

UNNATURAL CADENCE? _____
                SCORE
CADENCE (0-4)    ___    ___    ___    ___    ___
                NONE (0)   SUBTLE (1)   (2)   MODERATE (3)   (4)

ERRORS    ___    ___    ___    ___
         NONE    SUBTLE    MODERATE    SEVERE

COMPREHENSION PROBLEM ON THE PASSAGE?    ___    ___    ___    ___
         NONE    SUBTLE    MODERATE    SEVERE

EXCESSIVE SELF-CORRECTIONS?    YES ☐   NO ☐    EXCESSIVE TEXT DEVIATIONS THAT WORK?   YES ☐   NO ☐
EXCESSIVE UNKNOWN WORDS?    YES ☐   NO ☐    UNUSUAL SPEECH PATTERNS    YES ☐   NO ☐

*Fig. 8*

ASSESSMENT OF LETTER AND SOUND RECOGNITION
FOR NON-READERS

SHOW THE STUDENT THE FLASHCARDS FOR SMALL LETTERS, ONE AT A TIME, ASKING HIM OR HER TO NAME EACH LETTER. ON THIS SHEET, CIRCLE UNKNOW LETTERS.

GO THROUGH THE FLASHCARDS A SECOND TIME, ASKING THE STUDENT TO IDENTIFY THE SOUND REPRESENTED BY EACH LETTER. IF HE CAN'T, GIVE HIM THREE WORDS, ONE OF WHICH STARTS WITH THE TARGETED LETTER, AND ASK HIM WHICH WORD STARTS WITH THAT LETTER. IF HE CAN ANSWER CORRECTLY, HE KNOWS THE SOUND. ON THIS SHEET, MAKE A DIAGONAL CROSS THROUGH THE LETTER (OR THE CIRCLED LETTER) FOR ANY UNKNOWN SOUND.

REPEAT THE PROCESS WITH THE FLASH CARDS CAPITAL LETTERS.

SMALL LETTERS

NUMBER CORRECT

| | | |
|---|---|---|
| s | y | f |
| n | t | h |
| z | k | w |
| r | j | d |
| b | l | m |
| p | v | |

CAPITAL LETTERS

NUMBER CORRECT

| | | |
|---|---|---|
| F | T | M |
| K | P | S |
| D | H | Y |
| R | J | V |
| Z | B | L |
| N | W | |

*Fig. 9*

LOG OF INSTRUCTION IN SOUND-SYMBOL ASSOCIATION

CIRCLE THE LETTERS FOR WHICH THE STUDENT COULD NOT NAME THE ASSOCIATED SOUND DURING THE ASSESSMENT

| LETTERS TO BE INTRODUCED | |
|---|---|
| SMALL | h  y  f  n  t  s  d  k  w  r  j  z  b  l  m  p  v |
| CAPITAL | F  T  M  K  P  S  D  H  Y  R  J  V  Z  B  L  N  W |

| DATE | LETTERS INSTRUCTED | COMMENTS |
|---|---|---|
|  |  |  |
|  |  |  |
|  |  |  |
|  |  |  |
|  |  |  |
|  |  |  |
|  |  |  |
|  |  |  |

| NOTATION SYSTEM FOR READING ANALYSIS | | |
|---|---|---|
| READING CHARACTERISTIC | NOTATION | EXAMPLE |
| DEVIATIONS FROM TEXT | | |
| OMISSION | CIRCLE THE OMITTED WORD OR WORDPART. | The ⟨man⟩ was enjoying walk⟨ing⟩ in his garden. |
| SUBSTITUTION | WRITE THE SUBSTITUTED WORD ABOVE THE ACTUAL WORD. | talking<br>The man was enjoying walking in his garden. |
| INSERTION | INDICATE THE INSERTION WITH A CARET, OR WRITE IT VERTICALLY BEGINNING IN THE SPACE WHERE IT WAS INSERTED. | old                                      beautiful<br>The∧man was enjoying walking in his∧garden. |
| NONSENSE WORD | TREAT NONSENSE WORDS LIKE SUBSTITUTIONS. IF YOU CAN'T HEAR EXACTLY WHAT WAS SAID BUT YOU KNOW IT WAS A NONSENSE WORD, PLACE A ? ABOVE THE ACTUAL WORD. | ??                                       gargent<br>The man was enjoying walking in his garden. |
| SELF-CORRECTION | MAKE THE PROPER NOTATION FOR THE ERROR, THEN CROSS-OUT THE NOTATION AND WRITE SC. | sc b̶e̶a̶u̶t̶i̶f̶u̶l̶<br>The man was enjoying walking in his garden. |

*Fig. 12A*

| CADENCE | | |
|---|---|---|
| HALTING OR UNNATURAL PAUSING | PLACE A VERTICAL LINE THROUGH THE SENTENCE AT THE POINT OF THE HALT OR PAUSE. | The man \|was enjoying walking in \|his garden. |
| ELONGATING WORDS | PLACE A CURVED LINE OVER THE ELONGATED WORD. | The man was ⌒enjoying walking in his ⌒garden. |
| INAPPROPRIATELY EMPHASIZING SOUNDS (T IN LITTLE, ETC.) | PLACE AN ACCENT MARK ON THE EMPHASIZED SOUND. | The líttle boy didńt like spinach. |
| REPEATING CORRECTLY-READ TEXT | PLACE A HORIZONTAL LINE OVER THE REPEATED TEXT. | The man was enjoying walking in his garden. |
| UNNATURAL UP-TONE | PLACE AN ARROW POINTING UP OVER THE WORD WHICH WAS GIVEN THE IMPROPER UP-TONE. | The man was en↑joying walking in his ga↑rden. |
| RUSHING THROUGH PERIODS | TREAT IT AS AN OMISSION BY CIRCLING THE PERIOD. (IT IS UNNATURAL RHYTHM.) | The man was enjoying walking in his garden○ |
| SLOW OR UNEVEN SPEED OR RUSHING (RHYTHM IS OFF) | MAKE A MARGINAL NOTATION OR CHECK APPROPRIATE LINE ON TEXT ANALYSIS SHEET. | *Speed was inconsistent.* |
| FEELING FORCED (WORKING AT READING) | | *Forced, lots of effort.* |
| ANNOUNCING VOICE OR OTHER UNNATURAL TONE, SUCH AS SING-SONG OR MONOTONE (TONAL QUALITY OF LANGUAGE IS INAPPROPRIATE). | | *Sing-song at times. Occasional announcing voice.* |

*Fig. 12B*

STARTING THE STUDENT CHECK LIST

| STARTING THE STUDENT SEQUENCES | ACHIEVED EXCELLENCE | NOT ACHIEVED EXCELLENCE |
|---|---|---|
| LABEL THE READ SEQUENCE | | |
| CHOOSE THE APPROPRIATE FEEDBACK SEQUENCE | | |

*Fig. 14*

THE GUIDING CHECK LIST

INSTRUCTION AREA ONE
INCONSISTENT JUDGEMENTS OF EXCELLENCE OR STUDENT UNCERTAINTY

| INCONSISTENCY | STUDENT-SAYS YES; TUTOR-DISAGREES PER SESSION | STUDENT-SAYS NO; TUTOR-DISAGREES PER SESSION | STUDENT IS UNCERTAIN PER SESSION |
|---|---|---|---|
| NAME | CHECK MARKS | | |
| NAME | CHECK MARKS | | |
| NAME | CHECK MARKS | | |
| NAME | CHECK MARKS | | |

INSTRUCTION AREA TWO
THE STUDENT DIDN'T DO ENOUGH CYCLES TO ACHIEVE EXCELLENCE

| INCONSISTENCY | FAR FROM EXCELLENT (LESS THAN 80% EXCELLENT) PER SESSION | CLOSE TO EXCELLENT (AT LEAST 80% EXCELLENT) PER PARAGRAPH |
|---|---|---|
| NAME | CHECK MARKS | |
| NAME | CHECK MARKS | |
| NAME | CHECK MARKS | |
| NAME | CHECK MARKS | |

| NAME | INSTRUCTION AREA THREE<br>THE STUDENT DISPLAYED INAPPROPRIATE BEHAVIOR OR COMMENTS<br>PER SESSION<br>IF THE STUDENT'S BEHAVIOR IS SUFFICIENTLY INAPPROPRIATE, PROCEED IMMEDIATELY TO INSTRUCTION | | | | |
|---|---|---|---|---|---|
| | INCONSISTENCY | | | | |
| NAME | CHECK MARKS | | | | |
| NAME | CHECK MARKS | | | | |
| NAME | CHECK MARKS | | | | |
| NAME | CHECK MARKS | | | | |
| | LACK OF EFFICIENCY IN ACHEIVING EXCELLENCE<br>THE STUDENT DID NOT ACHEIVE EXCELLENCE IN THE LAST TEN-MINUTES<br>LIST TIME PER PARAGRAPH FOR BLUE STUDENTS; OPTIONAL FOR RED AND GREEN STUDENTS | | | | |
| | INCONSISTENCY | | | | |
| NAME | CHECK MARKS | | | | |
| | TIME A NEW PARAGRAPH WAS STARTED (BY MINUTE) | | | | |
| NAME | CHECK MARKS | | | | |
| | TIME A NEW PARAGRAPH WAS STARTED (BY MINUTE) | | | | |
| NAME | CHECK MARKS | | | | |
| | TIME A NEW PARAGRAPH WAS STARTED (BY MINUTE) | | | | |
| NAME | CHECK MARKS | | | | |
| | TIME A NEW PARAGRAPH WAS STARTED (BY MINUTE) | | | | |

INSTRUCTION CHECK LIST
AREA ONE

DIRECTIONS:

- AFTER YOU HAVE COMPLETED INSTRUCTION SET ONE, AND YOU NEED TO INSTRUCT IN THIS AREA AGAIN, START WITH INSTRUCTION SET TWO: LABELING THE READ SEQUENCE.

- IF THE SESSION ENDS BEFORE YOU HAVE COMPLETED ANY OF THE INSTRUCTION SETS, START WHERE YOU LEFT OFF IN THE NEXT SESSION. DO NOT ERASE ANY CHECK MARKS.

| INSTRUCTION SETS FOR AREA ONE | | | | DATE COMPLETED | | |
|---|---|---|---|---|---|---|
| INSTRUCTION SET ONE: VERBAL | | | | | | |
| INSTRUCTION SET TWO, SEQUENCES: | ACHIEVED EXCELLENCE | | | NOT ACHIEVED EXCELLENCE | | |
| LABEL THE READ SEQUENCE | | | | | | |
| CHOOSE THE FEEDBACK SEQUENCE | | | | | | |

*Fig. 21*

INSTRUCTION CHECK LIST
AREA TWO

DIRECTIONS:

- AFTER YOU HAVE COMPLETED EACH INSTRUCTION SET, AND YOU NEED TO INSTRUCT IN THIS AREA AGAIN START WITH INSTRUCTION SET TWO: DOES THE STUDENT THINK HIS SILENT READING WAS EXCELLENT?

- IF THE SESSION ENDS BEFORE YOU HAVE COMPLETED ANY OF THE INSTRUCTION SETS, START WHERE YOU LEFT OFF IN THE NEXT SESSION. DO NOT ERASE ANY CHECK MARKS.

| INSTRUCTION SETS FOR AREA TWO | | | | DATE COMPLETED |
|---|---|---|---|---|
| INSTRUCTION SET ONE:<br>VERBAL | | | | |
| INSTRUCTION SET TWO:<br>DOES THE STUDENT THINK HIS SILENT READING WAS EXCELLENT? | | | | |
| | EXCELLENCE | | NOT EXCELLENCE | |
| INSTRUCTION SET THREE:<br>TELLING THE STUDENT HOW MANY CYCLES TO COMPLETE | | | | |

Fig. 22

INSTRUCTION CHECK LIST
AREA THREE

DIRECTIONS:

- IF THE BEHAVIOR TRANSGRESSION IS SEVERE, GO DIRECTLY TO INSTRUCTION SET TWO, THREE, OR FOUR. OTHERWISE, COMPLETE INSTRUCTION SETS ONE, TWO, AND THREE SEQUENTIALLY. THEN, IF YOU NEED TO INSTRUCT IN THIS AREA AGAIN, START WITH INSTRUCTION SET THREE.
    - IF YOU REPEAT INSTRUCTION SET THREE, ERASE THE OLD DATE AND ENTER A NEW ONE.
- REPEAT INSTRUCTION SET THREE FOR ONE TO THREE SESSIONS AND THEN COMPLETE INSTRUCTION SET FOUR.
- ONCE YOU HAVE COMPLETED INSTRUCTION SET FOUR AND YOU NEED TO INSTRUCT IN THIS AREA AGAIN, USE INSTRUCTION SET FIVE AND THEN INSTRUCTION SET SIX.
- IF THE SESSION ENDS BEFORE YOU HAVE COMPLETED AN INSTRUCTION SET, IN THE NEXT SESSION START OVER WITH THE SET THAT WAS INCOMPLETE.

| INSTRUCTION SETS FOR AREA THREE | STUDENT INITIALS | TUTOR INITIALS | DATE COMPLETED |
|---|---|---|---|
| INSTRUCTION SET ONE:<br>    VERBAL, SIXTH GRADERS AND OLDER<br>OR<br>    VERBAL, FIFTH GRADERS AND YOUNGER | | | |
| INSTRUCTION SET TWO:<br>    WARNING OF REFUSAL TO WORK WITH A<br>    NON-COOPERATING STUDENT | | | |
| INSTRUCTION SET THREE<br>    REFUSING TO WORK WITH A NON-COOPERATING<br>    STUDENT FOR FIFTEEN MINUTES | | | |
| INSTRUCTION SET FOUR<br>    SEND THE STUDENT TO<br>    THE PRINCIPAL OR COUNSELOR | | | |
| INSTRUCTION SET FIVE<br>    PARENTS, TEACHER, PRINCIPAL, AND/OR<br>    COUNSELOR MEETING | | | |
| INSTRUCTION SET SIX<br><br>    TEMPORARY REMOVAL FROM THE PROGRAM?? | | | |

*Fig. 23*

INSTRUCTION CHECK LIST LOE
QUESTION FIVE

DIRECTIONS:

- IF THE SESSION ENDS BEFORE YOU HAVE COMPLETED QUESTION FIVE, START OVER WITH A NEW PARAGRAPH (RECORDING A NEW TIME) IN THE NEXT SESSION. DO NOT ERASE ANY CHECK MARKS

| | INSTRUCTION CHECK LIST FOR QUESTION FIVE | | | | | |
|---|---|---|---|---|---|---|
| | EXCELLENCE WAS ACHIEVED BEFORE TEN MINUTES ELAPSED (THE TEXT IS NOT TOO COMPLEX) | | | EXCELLENCE WAS NOT ACHIEVED, AND TEN MINUTES ELAPSED (THE TEXT IS TOO COMPLEX) | | |
| CHECK MARKS | | | | | | |
| TIME STARTED A NEW PARAGRAPH IN QUESTION FIVE BY MINUTE | | | | | | |

*Fig. 24*

THE GRADUATION CHECK LIST

DIRECTIONS:

- IF THE SESSION ENDS BEFORE YOU HAVE COMPLETED ANY PAGE (OR COLUMN), ERASE ALL THE CHECK MARKS IN THAT SECTION, AND START OVER WITH A NEW PAGE (OR COLUMN) IN THE NEXT SESSION.

301

| FIRST READ (NOT TAPE RECORDED): IDENTIFYING AN EXCELLENT READER | | | | | | | | | |
|---|---|---|---|---|---|---|---|---|---|
| | PAGE ONE OF SELECTION (OR COLUMN ONE) | | | PAGE TWO OF SELECTION (OR COLUMN TWO) | | | PAGE THREE OF SELECTION (OR COLUMN THREE) | | |
| CHECK MARKS FOR IDENTIFIABLE SYMPTOMS | | | | | | | | | |
| CHECK MARKS FOR SELF-CORRECTIONS | 302 | | | | | | | | |
| CHECK MARK FOR A RE-START | 303 | | | | | | | | |
| SECOND READ (TAPE RECORDED): IDENTIFYING A READ RIGHT GRADUATE | | | | | | | | | |
| 306 | PAGE ONE OF SELECTION (OR COLUMN ONE) | | | PAGE TWO OF SELECTION (OR COLUMN TWO) | | | PAGE THREE OF SELECTION (OR COLUMN THREE) | | |
| CHECK MARKS FOR IDENTIFIABLE SYMPTOMS | | | | | | | | | |
| CHECK MARKS FOR SELF-CORRECTIONS | 307 | | | | | | | | |
| CHECK MARK FOR A RE-START | 308 | | | | | | | | |
| | EXPERIENCING A SENSE OF KNOWING THE STUDENT IS AN EXCELLENT READER | | | | EXPERIENCING A SENSE OF KNOWING THE STUDENT IS NOT AN EXCELLENT READER | | | | |
| CHECK MARK FOR YOUR SENSE OF KNOWING | | | | | | | | | |

METHOD OF TEACHING READING

CROSS-REFERENCE TO RELATED APPLICATION

This application claims the benefit of U.S. Provisional Application No. 60/172,276, filed Dec. 17, 1999.

FIELD OF THE INVENTION

The present invention is directed to a method of teaching reading, and more particularly, to a method of teaching reading that is designed to eliminate reading problems or to prevent them from occurring in the first place based on the recognition that a reading process is directed by neural networks built specifically to guide the process.

BACKGROUND OF THE INVENTION

Most early (kindergarten through third grades) and remedial instruction programs for reading are characterized by a systematic presentation of word attack skills designed to allow the student to "crack the reading code." Students are encouraged to sound and blend phonemes to identify words they do not instantly recognize. This approach is not effective for significant numbers of students. The U.S. Department of Labor says that 40% of employed adults do not read well enough to comfortably perform the reading tasks demanded by their current jobs. The National Assessment of Educational Progress, 1996 reports that 40% of fourth graders were reading below fourth grade level. The National Research Council (1998) states, "A person who is not at least a modestly skilled reader by the end of third grade is quite unlikely to graduate from high school." These statistics support the view that current methodologies are not able to consistently eliminate reading problems. In fact, the field of reading has not been able to satisfactorily define a reading problem. For example, scores on tests have become the primary vehicle for the definition: if you are in eighth grade, and you score at the sixth grade level on a reading test, you have a reading problem. And of course, students with severe reading problems can be identified functionally—they can't read well enough to know what the author is communicating. Both of these methods of identifying a reading problem are less than satisfactory because they say nothing about cause.

Another prior method of teaching reading, developed by the inventors (hereinafter "the prior method"), also had limitations.

The prior method consisted of The Taping Procedure in which the student read a page of an assigned book while following along with a tape and then read it silently. This was repeated until the student could read the page fluently, and then he/she worked on the next page. When the assigned number of pages was completed, the student read them aloud to the teacher. If the oral reading was not laborious, the student was assigned additional pages, and the process was repeated. The limitations associated with the Taping Procedure were as follows: The students were not held accountable to an identifiable standard, and so there was wide deviation in what passed for fluent reading in the judgment of various teachers. There was a pattern in which the pages worked on first were the least fluent during oral reading. Teachers didn't know what to do if the Taping Procedure did not yield the desired result of fluent reading. There were frequently problems in the text that prevented the students from reading fluently, and the prior method did not give direction in what to do in that case. The student was not given assistance or support beyond the Taping Procedure to achieve the indefinite goal of more fluent reading, thus the method was not responsive to differences among students. Students with severe reading problems (those placed in first through third grade materials) were frequently unsuccessful.

The prior method also had a Feedback component in which the student read orally from unfamiliar text while the teacher provided feedback based on errors that emerged in the student's reading. The feedback was designed to encourage students to utilize their knowledge of the world and of language to figure out the words. The limitations associated with the Feedback component were as follows: Often times readers would not commit errors during oral reading of unfamiliar text, but their reading was clearly laborious, and there was no feedback protocol for that situation. The feedback of the prior method was designed to help students expand their strategies for figuring out the words, and for many students this type of feedback had little effect on performance. The feedback protocols were global, and implementing them required deductive thinking on the part of the teacher, which was very difficult—sometimes impossible—to train.

The students in the prior method were also asked to do Silent Reading alone during the reading session with a teacher on a daily basis. The Silent Reading component thus took up what could otherwise be valuable instruction time.

Furthermore, the prior method did not prescribe how multiple students could be instructed, and it did not provide a systematic mechanism for identifying and solving implementation problems. It was often difficult to get the student cognitively engaged in the process. The prior method did not provide criteria for knowing when to advance a student to more complex text, and it did not define a procedure for graduating a student from the program.

A need exists for a method that overcomes all the limitations associated with the prior method and other pre-existing methods.

SUMMARY OF THE INVENTION

The present invention provides a method of teaching reading (called "the method" or "the methodology" throughout the present description). Unlike other programs, the method recognizes the fact that processes, including reading, are directed by neural networks built specifically to guide the processes. If the network guiding reading is built with erroneous or missing information, the process will be guided incorrectly, and the individual will have a reading problem. The only way to eliminate it is for the brain to remodel the network—and it is resistant to do so. The method structures the environment in such a way that the student's brain is compelled to remodel the network, thereby eliminating the reading problem. The method generally comprises three components: Excellent Reading, lasting 75% of the tutoring session conducted in accordance with the method and Coached Reading, lasting 25% of the tutoring session. The third component, Independent Reading, is completed by the student as homework.

The Excellent Reading Component

During the Excellent Reading component of the method's tutoring session, a clear goal is established for the student to produce excellent reading—reading that feels comfortable and natural and results in understanding the author's message When the reading is done out loud, the language produced sounds natural—like the reader talks in normal conversation. Students with reading problems cannot realize this goal if left entirely to their own devices because their neural networks for guiding the implicit process of reading have been improperly built and so are guiding reading inappropriately, interfering in communication with the author and creating a feeling of discomfort and, usually, external symptoms. The Excellent Reading Component of the method's tutoring process structures the environment in such a way that the student can produce excellent reading even though he or she has a reading problem.

By artificially enhancing the predictability of the text through listening repeatedly to an audio tape-recorded version of it (or a tutor reading it out loud) interspersed with reading it silently, which are referred to as "cycles", the student's brain is seduced into utilizing prediction from prior knowledge as the major reading strategy. The reader must implicitly figure out how to use pre-existing knowledge of the world, knowledge of how language works and graphophonic information in an appropriate mix to keep the predictions coming and then use those same systems to confirm or reject the predictions. It is the demand for excellence at each paragraph that contributes to the brain's eventually figuring out how the complex integrative, interactive implicit process of reading is accomplished. As the "puzzle" is solved, the brain remodels its guidance system to reflect the new discoveries, and the reading problem is eventually totally eliminated.

In an ideal session of the method, the student is driving all decisions necessary to realize the output expectation of excellent reading. He decides how many cycles he needs to produce excellent reading silently, and then he attempts excellence out loud. He successfully judges when he needs more cycles to further enhance the predictability of the text, and he successfully judges whether his oral reading was excellent. The tutor's role is to offer guiding remarks when the student's judgment of excellence is inconsistent with the tutor's, he is not doing enough cycles to achieve excellence on the oral reading, and when he displays any behavior that precludes his full engagement in the process. The tutor may also utilize guiding techniques—brief instruction designed to avoid confusion in any of these areas on the part of the student or to get him back on track as he plays his role in the tutoring process.

The tutor utilizes a Guiding Check List system to keep track of inconsistencies in the student's judging excellence, in his judging the number of cycles required, and in his willingness to fully engage in the tutoring process. When three such inconsistencies emerge in any one area, the pattern lets the tutor know that there is a problem that requires instruction. The tutor then engages in prescribed instruction strategies in the appropriate area. The tutor tracks the student's progress on an Instruction Check List, and when he demonstrates that he is no longer confused, the tutor returns to guiding using the Guiding Check List and remains there until three inconsistencies are recorded in one area again. She then returns to instruction for that area. It is the student's performance that triggers the instruction and the return to guiding—thereby insuring the methodology is both student-centered and individualized.

In addition to monitoring inconsistencies in the three areas that reflect the student's role in the tutoring process, the tutor must also insure that the student is efficiently achieving excellence. He must experience excellent reading at least every 10 minutes for his brain to get the information it needs to figure out how reading is properly done. The Guiding Check List system also provides a place to track the amount of time it takes the student to achieve excellence on each paragraph. If the time goes over 10 minutes for any paragraph, the tutor shifts to probing to find out the cause of the problem and then implements a solution so the efficiency of achieving excellence can be maintained at an acceptable standard.

The Check List system (using both the Guiding and Instruction Check Lists) forces the tutor to continue to address confusion as long as it occurs or to identify whatever problem is hindering the student's appropriate participation in the process. Consistency in addressing these issues through proper instruction will ultimately eliminate the student's confusion or solve the problem. It is important to note that the instruction is not in "how to read." The implicit process of reading cannot be explicitly instructed. The method creates a tutoring environment that compels the brain to figure out how to read. Instruction is designed to allow the student to participate fully in that environment by helping him understand what he must do to fulfill his role and by providing him with experiences that will enable him to make judgments consistent with his role.

The Coached Reading Component

During the Coached Reading component of a tutoring session, the student reads aloud to the tutor from materials he has never read before. As he does so, the implicit process of reading is being guided inappropriately by his neural network. This causes symptoms to emerge. These could include changes of text resulting in a 'senseless' or awkward sentence; being 'stuck;' unnatural cadence such as rushing, strange tones, and pausing; and excessive text deviations that work. As the student reads, the tutor follows along and reacts to the symptoms, giving timely feedback that is designed to:

1. Let the brain know that its current reading strategies are not producing the desired results.

2. Give the brain information that will influence the direction of its experimentation as it seeks to discover how the process of reading should be conducted.

3. Keep the brain accountable to a high standard of performance even though its own guidance system for reading is instructing it to do otherwise.

During the Coached Reading component there are four key areas that must be addressed for all readers:

1. Errors-Semantic and Syntactic (coached every occurrence)

2. Becoming Stuck (coached every occurrence)

3. Unnatural Cadence (coached as needed to regulate the total coaching time)

4. Text Deviations That Work (coached only when excessive in the red [early $1^{st}$ and 1st grade] and green [$2^{nd}$ and $3^{rd}$ grades] ranges)

In addition to the above four key areas, the tutor must be prepared to intervene if the student encounters:

A. Unknown vocabulary words and concepts

B. Unknown language conventions

The student has difficulty pronouncing a word.

The student misreads punctuation marks.

The student misreads numbers.

The method provides the tutor with detailed instructions for coaching the student in all of these areas.

The Independent Reading Component

Students select books from the Independent Reading Library to take home and read. They are required to choose books from grade-level ranges below the one they are placed in for Excellent Reading and Coached Reading. Because the brain is reading without the assistance that Coached Reading provides and outside the protective, controlled environment of Excellent Reading, it is important to diminish the degree of struggle the brain will experience in reading the text. Independent Reading provides a laboratory in which the brain can experiment with all the strategy ideas it is formulating as a result of a tutoring in accordance with the method. When it is convinced these strategies are more productive than what it is currently doing, it will remodel the neural net. Students who participate in Independent Reading progress more rapidly in eliminating their reading problems than those who don't because their brains have more opportunity to experiment.

Accordingly, during the Excellent Reading component, by artificially enhancing the predictability of the text through listening repeatedly to the text interspersed with reading it silently, the student's brain is seduced into utilizing prediction from prior knowledge as the major reading strategy. During the Coached Reading component, as the student reads the text aloud, a tutor gives timely feedback that is designed to assist the student to realize that his current reading strategies are not working and that he should remodel an erroneously built neural network. The feedback also influences the direction of the brain's experimentation as it seeks to discover how the process of reading should be conducted. During the Independent Reading component, the student's brain can experiment with all the strategy ideas it is formulating as a result of experiencing the Excellent Reading and Coached Reading components. When the brain is convinced that these strategy ideas are more productive than what it is currently doing, it will remodel the neural network. Therefore, the method structures the environment in such a way that the student's brain is compelled to remodel the network, thereby eliminating the reading problem.

BRIEF DESCRIPTION OF THE DRAWINGS

The foregoing aspects and many of the attendant advantages of this invention will become more readily appreciated by reference to the following detailed description, when taken in conjunction with the accompanying drawings, wherein:

FIG. 1 is a sample interview form suitable for use in the consultation stage of the method;

FIGS. 2–8 are sample passage evaluation sheets suitable for use in the consultation stage in evaluating the student's reading problems;

FIG. 9 is a sample form suitable for assessing a student's knowledge of the alphabet and corresponding sounds, during the consultation stage for example, when the student is suspected to be a non-reader;

FIG. 10 is a sample form suitable for instructing a non-reader student sound-symbol associations;

FIGS. 12A and 12B collective show a list of notation system for analyzing a student's reading, suitable for analyzing the symptoms of the reading problem and used in the present method (hereinafter collectively referred to as FIG. 12);

FIG. 14 is a sample Starting the Student Checklist suitable for use in starting the student in a method of the present invention;

FIGS. 19A and 19B collectively show a sample Guiding Check List suitable'for use by a tutor during Excellent Reading component to keep track of inconsistencies in a student's reading (hereinafter collectively referred to as FIG. 19);

FIG. 21 is a sample Instruction Check List Area One, suitable for use when instructing a student who is confused about judging excellent reading;

FIG. 22 is a sample Instruction Check List Area Two, suitable for use when instructing a student who is confused about judging how many cycles are required to achieve excellent reading;

FIG. 23 is a sample Instruction Check List Area Three, suitable for use when instructing a student who is not willing to fully engage in the tutoring process;

FIG. 24 is a sample Instruction Check List Lack of Efficiency (LOE), suitable for use when instructing a student who is not efficient in achieving excellent reading (within every 10 minutes);

FIG. 30 is a sample Graduation Check List, suitable for use in evaluating whether a student is ready to graduate from a method of the present invention.

DETAILED DESCRIPTION OF THE PREFERRED EMBODIMENT

Figure 11:
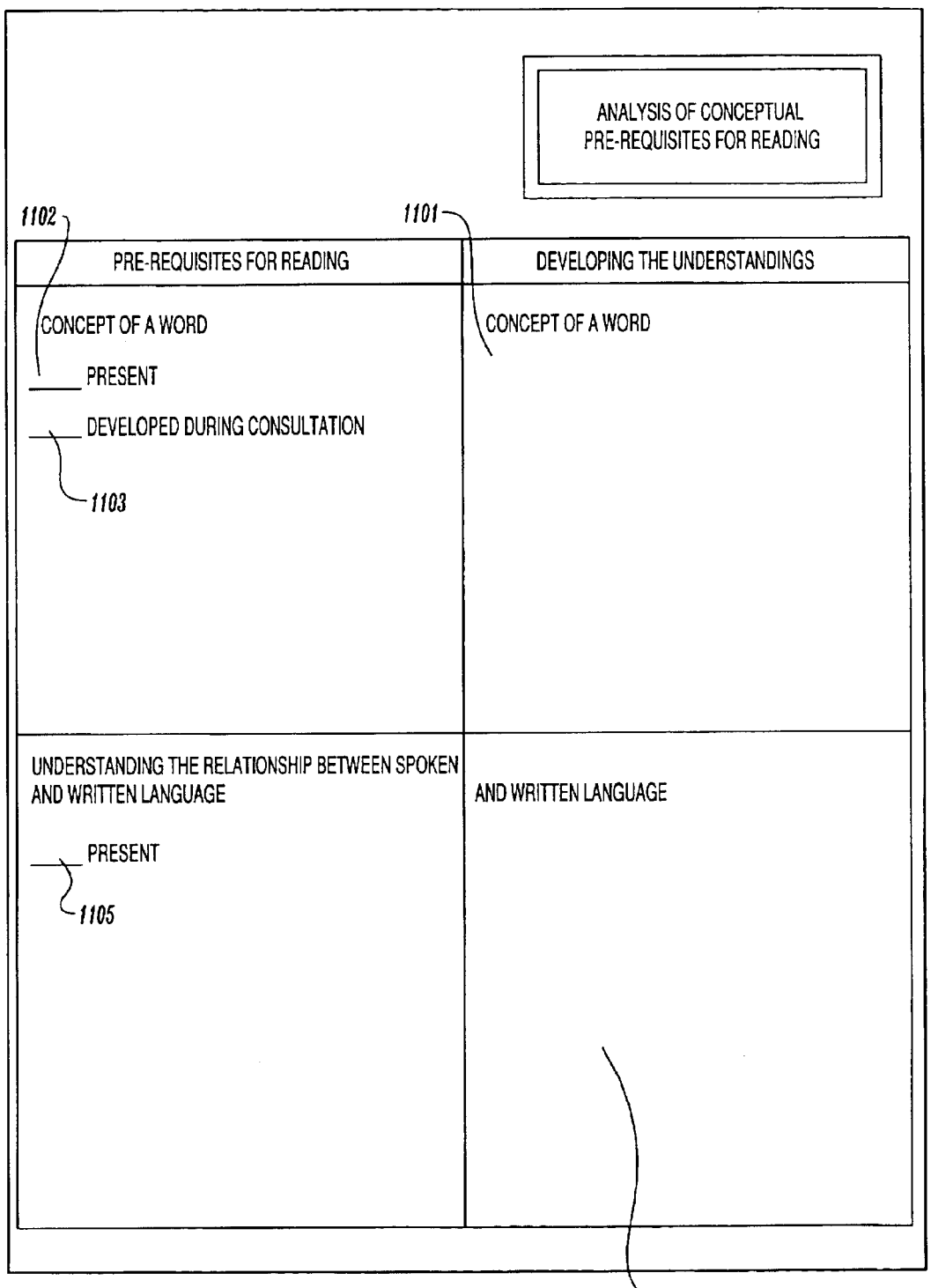
FIG. 11 is a sample "Analysis of Conceptual Pre-Requisites for Reading" form suitable for assessing, during the consultation stage for example, whether a non-reader student has developed the pre-requisites for learning to read.

The present invention provides a method of teaching reading. The method is a result of a unique application of theoretical perspectives that were synthesized and, in many cases, expanded by the inventors. Unlike other programs, the method recognizes the fact that processes, including reading, are directed by neural networks built specifically to guide the processes. If the network guiding reading is built with erroneous or missing information, the process will be guided incorrectly, and the individual will have a reading problem. The only way to eliminate it is for the brain to remodel the network—and it is resistant to do so. The method structures the environment in such a way that the student's brain is compelled to remodel the network, thereby eliminating the reading problem. The method may be implemented in private settings or in schools. The following is generally divided into 20 chapters: (I) the theory behind the method; (II) the consultation process conducted for placing a student in a proper range in the method; (III) the Symptom Reduction Analysis to be conducted periodically to monitor the progress of the student in the method; (IV) and (V) the processes of starting students in the method; (VI)–(VIII) the method overview including Excellent Reading, Coached Reading, and Independent Reading components for various ranges; (IX) Excellent Reading component; (X)–(XV) various guiding remarks, techniques, and instructions for use during Excellent Reading component; (XVI) Coached Reading component; (XVII) the methods of managing multiple students at once; (XVIII) and (XIX) the processes of moving and graduating a student in and from the method; and (XX) the development of a library suitable for use in the present method.

I. The Theory Behind the Method

Neural networks that control processes primarily operate implicitly—below the level of conscious awareness. (Bicycle riders are unaware—as it is happening—of the muscle contraction and expansion that keeps them upright on their bicycles.) The challenge for reading instruction is to cause the student's brain to re-build the neural network that guides reading even though the implicit nature of the process precludes both the student and the tutor from knowing how reading happens. Attempts to teach reading explicitly cannot work; explicit teaching of implicit processes is impossible. The present method is unique in its ability to cause the student's brain to remodel an erroneously-operating neural network.

There is always a part of a process that is explicit. Bicycle riders, for example, are explicitly aware that they are pedaling and operating the brakes. The point at which the operation of a process demands an interaction with the environment is the point at which a small portion of the process becomes momentarily explicit. Reading becomes momentarily explicit when our brain needs to integrate phonetic information from the text. Reading programs have historically emphasized this explicit piece, focusing on using phonics to figure out what the words are. The method contends that the role of phonics in reading is not to figure out what the words are but rather to assist the brain in eliciting predictions based on meaning. When the predictions emanate from the reader's own knowledge of the world—as they must much of the time if the communication with the author is to be accomplished—phonics is used to confirm or reject predictions in order to keep them congruent with the author's intended message. This explains why someone who lacks knowledge of physics cannot communicate with an author of a book about nuclear physics. His lack of knowledge of physics does not allow him to make predictions from his knowledge of the world. Even if he can read the words, he cannot communicate with the author. Students whose guidance systems for reading are directing them to figure out what the words are rather than to predict based on meaning will have the same result: They won't understand what they are reading. The fact that these strategies cannot be explicitly taught because they operate implicitly is reflected in the methodology.

The method of the invention defines reading functionally by telling the student that excellent reading results in communication with the author and feels comfortable and natural. The method establishes the expectation for the student to produce excellent reading. The methodology enables the student to do so in spite of his reading problem by systematically enhancing the predictability of the text, which "seduces" the brain to utilize a predictive strategy. Prediction based on meaning—not figuring out what the words are—is the primary strategy in the complex, integrative, interactive, largely implicit process of reading.

By holding the student strictly accountable to consistently produce excellent reading, the brain is compelled to figure out the implicit process. When an attempt at excellent reading fails, the brain receives valuable information that what it tried didn't work. When it finally achieves excellent reading, it can examine how it was able to do so. Over time the reading strategies are fine-tuned and made sufficiently sophisticated to account for whatever variations are encountered in the text. Ultimately, what the brain is learning is "hard-wired" into the neural network that guides reading, thereby eliminating the reading problem.

The method also requires the student to read aloud from books he has never read before. As symptoms of the reading problem emerge, the tutor gives timely, pertinent feedback designed to force the brain to confront the evidence of its erroneous reading strategies. This convinces the brain it is reading wrong and motivates it to experiment with new strategies.

II. Performing a Consultation

The consultation has three purposes: (1) To determine if the student has a reading problem; (2) To decide in which range to start the student; and (3) To provide a base-line from which to measure the reduction of symptoms of the reading problem over time.

1. THE INTERVIEW

The interview portion of the consultation has three purposes: (1) To relax the student before you ask him to read out loud to you; (2) To give you information you need to make a decision about which consultation story you will have the student read; and (3) To familiarize yourself with the student's speech characteristics. The vast majority of students will display no unusual speech characteristics. FIG. 1 is a sample interview form suitable for elementary school students.

When the student enters the room, greet him, tell him where to sit, and exchange a few seconds of pleasantries. Ask him if he knows why he's here. If he doesn't know, tell him the school is bringing in a new reading program that works really quickly to help students who don't read quite as well as they would like, and he may be invited to participate. The interview has two parts.

Part One: Demographic Information

Asking the student easy-to-answer questions helps him relax and allows you to move more gently into the portion of the interview where you will be asking him about his reading.

Part Two: Gathering Information About the Student's Reading

The student's self-diagnosis is usually highly accurate. Probe to get detailed information. For example, if he says, "I don't read real well." Ask him, "Talk to me about that. What is in your head about your reading that keeps you from saying, 'I'm a great reader!'?" It is helpful to get detailed information about the symptoms, but sometimes students can't provide that—they just aren't introspective. Probe for answers about what he reads. If he says books, ask him what kind he likes and who are his favorite authors. If he has indicated he hates to read, never reads, etc. don't ask him if he ever gets "lost" in a book.

2. DETERMINING WHICH PASSAGES THE STUDENT WILL READ ALOUD

Ask the student to read as many prepared passages, shown below as PASSAGES 2–8, as are required to make your placement decision. In practice, PASSAGES 2–8 below are to be inserted into block 1112 of FIGS. 2–8, respectively, which are used for making the placement decision. (The student will be given separate forms that include the passages only, without any notation space for the tutor as in FIGS. 2–8, for the purpose of reading them out loud.) That could be one, two, or three passages. To determine which passage the student will read out loud, consider his age, his grade in school, and, if necessary, what he said during the interview about his reading problem and his reading behavior.

PASSAGE 2
THE PARKING LOT

Tom and Mark went to work. They drove into the parking lot. The parking lot was full. They had to park far away. They were late for work.

PASSAGE 3
THE SINGER

Jane heard a man singing, but she didn't like his voice. She wanted to cover her ears with her hands, but she knew that wouldn't be polite. When he stopped singing, she clapped. She didn't want to hurt his feelings, so she didn't tell him that his singing hurt her ears. When he started again, she quietly left the room.

PASSAGE 4
WANDA AND THE CLOWN

Wanda was in a bad mood. This was Billy's birthday party. Wanda didn't like any birthday party except her own.

Standing in front of her was Smiley the clown. "Hello, hello, hello," he said. He was bouncing up and down happily. Wanda closed her eyes and would not look at Smiley. She didn't like clowns.

She could hear him taking deep breaths. Then she could hear him blowing the air out. She didn't know what was going on. She had to open her eyes and look. She was staring at a green balloon shaped like an elephant. Smiley handed it to her!

Wanda really loved elephants and balloons. She knew the balloon would look nice on her bedroom dresser. Now she was feeling lucky that Billy had invited her to his party. She wasn't in such a bad mood after all.

PASSAGE 5
THE PHONE CALL

The office manager seemed annoyed as the phone began ringing. Where were the three women who were supposed to be there to screen the calls? They were normally much more responsible than this. She hoped this kind of behavior wouldn't continue. She was busy with her own work, and she didn't have time to do someone else's job. She listened to the phone ring for the fourth time and kept wishing her assistant would hurry into the office to pick up the receiver. She certainly couldn't let the call go unanswered. She finally picked up the phone.

Before the office manager could even say hello, three familiar voices began singing Happy Birthday. Loud laughter followed, and then someone hung up the phone. Seconds later, the missing office workers suddenly appeared, bringing cake, presents, and good wishes. The office manager was no longer annoyed. She was pleased that she had such good friends at work. The folks that worked for her were glad she was such a good sport, and they all enjoyed another twenty minutes of talking and laughing before getting back to work.

PASSAGE 6
THE SKI PATROL

America's ski slopes are safer today than ever before thanks to the National Ski Patrol.

More than 9,000 unpaid volunteers work in about 600 separate patrol units to help keep skiing safe. The ski patrol does its job in dozens of ways. They "sweep" the slopes each night to be sure no one is left lying in the snow with a broken leg. They help with broken bindings, deliver messages, give directions to lost skiers, and teach skiing safety.

The idea of a ski patrol was developed by Charles Dole, an insurance agent from New York. Charles fractured an ankle in a fall on one of New England's ski slopes in 1938. For hours he lay shivering in the snow while a friend, Frank Edson, searched for help. Dole finally reached a doctor after riding down the hill balanced on a piece of rusty metal. He did not have the benefit of a splint on his broken ankle. By the time he reached the hospital he was in critical condition from the cold, the pain and the loss of blood. Two weeks later, while still in the hospital, he received word that his friend Frank had died in a similar accident.

When Charles finally recovered, he was determined to find some way to help skiers in trouble. He encouraged fellow skiers to become involved in his campaign. Thanks to his tireless efforts the National Ski Patrol system was created.

PASSAGE 7
LOST IN THE FOG

Shane peered anxiously through the fog lying thick and heavy on the Yukon River as he cautiously navigated the 50-foot fishing boat. It was carrying 5000 pounds of fresh salmon in the hold, and he was responsible for delivering the fish to the workers waiting at the base camp at the mouth of the Yukon to clean and quick-freeze them for export to Japan.

Mac, Shane's boss, was a cantankerous old man who had built the Far North Fish Company into a thriving and lucrative business. He seldom spoke to his employees when everything was going well, but he chastised them severely if anything went wrong. Shane didn't relish the thought of facing Mac's merciless wrath if he stayed lost in the fog until the valuable cargo spoiled. "Mac is so unreasonable that he will hold me personally responsible for the fog," worried Shane. He hadn't slept for 24 hours, but he was wide-awake now, straining his eyes to find the channel that would lead him to the camp while avoiding running up on a sand bar.

Mac's voice crackled over the two-way radio, "Are you lost, or are you on a pleasure cruise?" he demanded, the sarcasm clear in his gruff, unfriendly voice.

"No," lied Shane uneasily, "I'm on my way in." And then he saw that it wasn't really a lie because the dense fog had begun lifting, floating eerily up into the early morning sky. Slowly the banks of the Yukon became visible through the scattered fog, and, immediately recognizing where he was, Shane knew he could proceed safely and would soon be back to the base camp. He felt a wave of relief, realizing at that moment how tense and anxious he had been, and he found himself slumping against the wheel as all the tension left his body. The crisis was over, the cargo would be delivered unspoiled, and Shane at last could look forward to a long and peaceful sleep.

PASSAGE 8
THE PIKE PLACE MARKET

Established in 1907 because angry housewives didn't like high food prices, Seattle's Pike Place Market is the oldest continuously operating farmer's market in the United States. In the early days, farmers and fishmongers were allowed to park their wagons along Pike Street and sell directly to the consumer. Later, stalls were built to accommodate more farmers who were allowed to occupy them when their numbers were called in the daily drawing.

Urban decay and the advent of supermarkets caused a decline of Pike Place Market, and in 1960 city officials were considering tearing it down, but the people of Seattle objected and began a "Save the Market" campaign that, in 1971, resulted in the establishment of a seven-acre historical district.

Today, Pike Place Market doesn't sell just fish and farm products. Handmade crafts, antiques, imported goods, and second-hand clothes can also be found in the stalls and stores. No national or regional chains or franchises are allowed to do business in the market, yet it contains over 200 businesses and over 50 restaurants. A variety of ethnic shops, street musicians, and flower shops add to the Market's unique ambiance.

The hundreds of daily visitors who enjoy the quick pace and constant commotion of the market may not realize how close it came to being destroyed. Pike Place Market is a dynamic symbol of the power of citizens when united around a common cause to affect change. Margaret Mead, the famous anthropologist, recognized this power when she said, "Never doubt that a small group of dedicated men and women can change the world. Indeed, it is the only thing that ever has." She could have been speaking about the people in Seattle who saved the Pike Place Market.

The passages in FIGS. 2–8 are designed to be readily readable for students in various ranges:

| | | |
|---|---|---|
| FIG. 2 | for early 1$^{st}$ and 1st grade (0–1) | RED range |
| FIG. 3 | for 2$^{nd}$ and 3$^{rd}$ grades (2–3) | GREEN range |
| FIG. 4 | for 4$^{th}$ and 5$^{th}$ grades (4–5) | BLUE range |
| FIG. 5 | for 6$^{th}$ and 7$^{th}$ grades (6–7) | LIME range |
| FIG. 6 | for 8$^{th}$ and 9$^{th}$ grades (8–9) | PURPLE range |
| FIG. 7 | for 10$^{th}$ and 11$^{th}$ grades (10–11) | YELLOW range |
| FIG. 8 | for 12$^{th}$ grade and college (12+) | ORANGE range |

For fourth graders or below, have them read the red (0–1) passage first and then, if necessary, the green (2–3) one. It is highly unlikely that a fourth grader referred to a remedial reading program will be placed in blue (4–5).

For older students who have told you reading is not easy for them and who don't do much reading, have them read at least two ranges below their current grade in school.

For high school students, when applicable, pick a passage that is the range below the one in which you think he may start the program based on information provided by the student in the interview. If he does a lot of reading, the first range. you ask him to read should be no lower than lime (6–7). If he reads the newspaper or magazines fairly regularly, but he doesn't read books, have him read the blue (4–5) range first. If he mentions "hard words" or in some other way lets you know that he sees reading as a task of figuring out what words are, the first range you ask him to read should be no higher than blue (4–5).

If you suspect the student is a non-reader, give him the red range story, skip the instructions for reading orally, and say "I want you to read this passage to me, and if you can't, that's okay." If the student reads it better than anticipated, but he gets stuck, coach him to skip the word and go on. If the student can't read the story well enough to warrant asking him to summarize it, assess his knowledge of the alphabet and corresponding sounds. A form shown in FIG. 9 may be used with alphabet flash cards for that purpose. In using the form of FIG. 9, for small letters and capital letters respectively, if the student knows 11 or fewer sound associations, circle the unknown ones on the "Log of Instruction in Sound-Symbol Association" sheet of FIG. 10, and follow the instructions on the sheet during the student's tutoring sessions. If the student knows 12 or more, there is no need for special instruction in sound-symbol association.

The Log of Instruction in Sound-Symbol Association form of FIG. 10 may be used to instruct the student in sound-symbol associations. A box 1000 in FIG. 10 contains the instructions regarding how to use the sheet of FIG. 10. Specifically, box 1000 includes the following directions:

DIRECTIONS FOR INSTRUCTING SOUND-SYMBOL ASSOCIATIONS

Spend 10–15 minutes at the beginning of each tutoring session with the following instructional process, and then proceed to the tutoring methodology for the red range.
1. Write three circled small letters on a separate paper.
    a. Ask the student to name each letter as you point to it.
       Mix the order.
       If the student's response is not immediate, tell the student the name of the letter.
    b. Continue the process until the student answers quickly and effortlessly each time you point.
2. Add the three capital letters.
    a. Ask the student to name the corresponding sound as you point to each letter.
       Mix the order, including both small and capital letters.
       If the student's response is not immediate, tell the student the sound.
    b. Continue the process until the student answers quickly and effortlessly each time you point.
    c. Ask for a word that begins with each letter.
       If the student cannot supply a word, name three words and ask him to pick the one that begins with the targeted sound.
       Provide additional examples.
3. Repeat the instructional process with three new letters. When they are mastered, review all the letters and sounds that were instructed.
4. Continue until all circled letters have been instructed.

Also, you may assess whether a suspected non-reader student has developed the pre-requisites for learning to read, and help him to develop them if he has not. An "Analysis Of Conceptual Pre-Requisites For Reading" form in FIG. 11 may be used for that purpose. In FIG. 11, a box 1101 contains instructions regarding how to develop the student's understanding of the concept of a word. Specifically, the box 1101 includes the following directions:

CONCEPT OF A WORD
1. Ask the student to count words in a red book.
    a. If the student can count the words:
       He knows what a word is.
       Check "Present" on the line 1102 of this form (FIG. 11).
       Proceed to the next item.
    b. If the student cannot count the words:
       Explain the difference between words and letters and that you can tell where each new word starts because of the larger space.
       Demonstrate counting words, tying the demonstration to the fact of larger spaces between words.
2. Ask the student to count the words on the page you have just demonstrated.
3. Ask the student to count words on a different page.
    a. Continue until he demonstrates competency.
    b. Check "Developed During Consultation" on the line 1103 of this form (FIG. 11).

Next, still referring to FIG. 11, a box 1104 contains instructions regarding how to develop the student's understanding of the relationship between spoken and written language. Specifically, the box 1104 includes the following directions:

UNDERSTANDING THE RELATIONSHIP BETWEEN SPOKEN AND WRITTEN LANGUAGE
1. Read a sentence in a red book, without his following along.
    a. With the student watching you, say the same sentence, raising a finger for each word as it is spoken.
    b. Read the same sentence, pointing to each word as you read it.

2. Read a new sentence to the student, without his following along.
   a. Ask the student to say the sentence three times to get it in his head.
   b. Ask him to tell you how many words are in the sentence.
   If he has difficulty, assist him to count by raising a finger for each new word as he says the sentence.
   c. Read the sentence again, pointing to each word as you read it.
3. Repeat the process with a new sentence until the student can accurately do the task.
   Check "Present" on the line 1105 of this form (FIG. 11).
   The paragraph beginning at page 123, line 1 and ending at page 123, line 6 has been amended as follows:
   FIGS. 25–29B are flow charts for Managing the Excellent and Coached Reading Components in a Single or Mixed Methodology Group, and are designed to be administered step-by-step. When you begin tutoring a new group, select the appropriate Managing the Excellent and Coached Reading Components in a Single or Mixed Methodology Group flow charts (FIGS. 25–29B) and position it where it will be easily accessible for reference as you are tutoring.
3. STUDENT INSTRUCTIONS FOR READING OUT LOUD
   Put the throat microphone on the student and make sure it is turned on. Do not open the notebook containing the passages. Place it in front of the student and say, "I'm going to ask you to read a short story out loud to me in a few moments. When I ask you to begin reading, I don't want a performance. Relax and read just like you would if you were reading silently. If you get stuck on a word, skip it and go on. I am not going to help you. If you know you made a mistake and you want to go back and fix it, you can do that. When you've finished reading out loud, I'm going to ask you to re-read the story silently. Then I'm going to ask you to tell me about it. I am going to be tape-recording your reading so I can listen to it later if I need to, and I am also going to be taking notes while you're reading." FIGS. 2–8 each include space for taking such notes, for later evaluating the student's reading skill. The use of FIGS. 2–8 will be more fully described, in particular reference to FIG. 2 (FIGS. 2–8 all include the identical space for taking notes.)
   Turn the tape recorder to 'record,' wait for enough time to allow the tape leader to pass the recording heads, and say, "This is the initial consultation for [student] on [date]." Then open the consultation notebook to the correct passage, and placing it in front of the student, say, "I want you to read this selection (point to it). Start with the title, and begin reading when you're ready." (Don't read the title or summarize the main theme of the selection.) If the passage is obviously way too hard for the student, stop him, saying, "I'm sorry, I asked you to read the wrong passage. Let's begin again with this one." (Direct the student to a passage at a lower range.)
4. NOTING THE SYMPTOMS THAT EMERGE AS THE STUDENT READS
   As the student reads out loud from the consultation story, make notations that reflect symptoms emerging from the student's reading on the passages of FIGS. 2–8. Do not mark any symptoms that emerge in the title. A sample notation system is illustrated in FIG. 12.
5. WHEN THE STUDENT FINISHES READING THE PASSAGE
   Say, "I want you to tell me what the story was about, but first re-read it silently." Complete the cadence section 1100 of the symptom analysis in FIGS. 2–8, as will be described fully below, while the student is reading silently. If the student finishes before you're ready, ask him to wait. If the cadence analysis alone does not reveal the student's placement range, complete as much of the Test of the analysis on FIGS. 2–8 as is needed to make the placement decision.

ANALYZING IDENTIFIED SYMPTOMS
   The symptom analysis process determines the placement range for the student and is also used to analyze the reduction of symptoms that occur as the reading problem diminishes.
A. ANALYZING AND TALLYING UNNATURAL CADENCE
   Look at each of the six cadence categories in FIGS. 2–8, block 1100, and decide if it occurred during the reading you just heard. If it occurred, ask yourself if there was a pattern of occurrence. (At least two times—with the exception of a single example of a re-reading if the number of words in the repetition exceeded two.)
   1. Unnatural Pausing (includes word-by-word)
   2. Enunciation (elongated words; inappropriately emphasizing sounds as the "t's" in little)
   3. Tonal Quality of Language Was Inappropriate (monotone; up-tone, sing-song, etc.)
   4. Working at Reading (forced; uncomfortable, loud, etc.)
   5. Rhythm "Off" (fast/slow, too fast; too slow)
   6. Repeated Correctly Read Text
   If a pattern of the category under consideration was present in the reading, ask yourself, "How frequently did it occur?" As you are considering this question, think of the story as read by the student in isolation. Don't think of it relative to other students you have heard. If the answer is "Infrequently," write a 1 in the line beside the category. If the answer is, "Very frequently," write a 3 in the line beside the category. For everything else, write a 2.
   If you wrote a 2, ask yourself a second question: Was it intense? Answer either yes or no. If it was intense, change the 2 to a 3. If it is not intense, leave the score as a 2. Move to the next cadence category and repeat steps 1, 2, and 3 until all six have been considered. To determine whether the cadence pattern was intense, the following guidelines should be used. In Unnatural Pausing (includes word-by-word), if the pauses were definite and relatively long they are intense. In Tonal Quality of Language, if the tonal discrepancies are very obvious because there is a wide divergence between what you are hearing and "normal" tone, the tonal discrepancies are intense. In Rhythm "Off" (fast/slow; too fast, too slow), if the rhythm disruption is extreme (as in really fast or really slow), it is intense. In Enunciation (elongated words; inappropriately emphasizing sound as the t's in little), if the elongation is quite long or the emphasized sound is quite staccato, then the enunciation category can be considered intense. In Working at Reading (forced; uncomfortable; loud, etc.), intensity is judged by how forcefully the language is being "pushed" out of the mouth, by how loud the "reading voice" is, and by how much discomfort is being expressed through body language. Repeated Correctly Read Text can be thought of as intense if the number of words in the repetitions exceed two.
   Add the numbers you have written in the small line preceding each cadence category, and enter this number on the Score line in FIGS. 2–8, block 1100. If the number is 0–4, mark the corresponding line (0–4) on the Cadence lines in FIGS. 2–8.
B. ANALYZING AND TALLYING SYMPTOMS OTHER THAN UNNATURAL CADENCE
   In each line of the consultation passage in FIGS. 2–8, look for every notation you made that indicate how the reader changed the text while he was reading out loud by adding words, deleting words, or substituting one word for another. Ignore marks that were made to indicate unnatural cadence.
   Analyze each notation to determine if it is an error, a self-correction, a text deviation that works, an unknown word, or an example of the reader's speech pattern, as more fully described below. Based on the conclusion, make a tally in the appropriate column (1114–1122) in FIGS. 2–8 on which you made your original notations as the student was reading.

Errors

Errors are deviations from the text that: do not make sense (semantic error); sound funny because they are linguistically incorrect (syntactic error); or significantly change the author's intended meaning. If the notation you made while the student was reading can be categorized an error, make a tally mark in the Error column 1114 directly across from the notation. If a syntactic error reflects the way the reader talks, don't tally it as an error.

C. ANALYZING AND TALLYING MISCELLANEOUS ISSUES THAT ARE NOT SYMPTOMS UNLESS EXCESSIVE

Self-Corrections

If the student makes an error and spontaneously corrects it, it is a self-correction. Self-corrections are not symptoms of a reading problem unless they are excessive. If the notation you made while the student was reading can be categorized a self-correction, make a tally mark in the Self-Correction column 1116 directly across from the notation.

Text Deviations that Work

If the student changes the text in such a way that it makes sense, does not sound awkward, and does not significantly change the author's meaning, the deviation works. Deviations that work are not symptoms of a reading problem unless they are excessive. If the notation you made while the student was reading can be categorized a text deviation that works, make a tally mark in the Text Deviation that Works column 1118 directly across from the notation.

D. ANALYZING AND TALLYING MISCELLANEOUS ISSUES THAT ARE NEVER SYMPTOMS

Unknown Words

Unknown vocabulary in the text is not a symptom of a reading problem. After the student has re-read the passage silently and has summarized it, you must determine whether any words that were skipped or were pronounced as "nonsense" words during the oral reading of the passage are in his vocabulary. (Be reasonable—if he skipped house you don't need to ask him if he has heard of the word house.) You don't need to ask him if he knows what the word means—only if he has heard of the word. If he answers no, then the word isn't in his vocabulary. In this case, make a tally mark in the Unknown Words column 1120 directly across from the notation in the story. If he answers yes, then the word is probably in his vocabulary and the tally will go in the Errors column.

Speech Pattern

If the notation you made while the student was reading is reflective of his speech pattern, it is not a symptom of a reading problem ('ax' for 'ask,' or 'seen' for 'saw'). Any notation that is reflective of the student's speech patterns should be tallied in the Speech Pattern column 1122 and listed on the bottom of the story form.

E. TOTALING THE TALLIES

Count the errors in column 1114 and enter the total in the Total box. Look at the scale in block 1115 provided beneath the passage of FIGS. 2–8 to determine if errors were none, subtle, moderate, etc., and mark the appropriate line 1124 on the Errors section in FIGS. 2–8. (The passage forms that the students have do not include the scale.)

Count the self-corrections in column 1116, and enter the total in the Total box. Check the scale in block 1117 to see if the self-corrections are excessive, and check the yes or no box accordingly in block 1126.

Count the text deviations that work in column 1118, and enter the total in the Total box. Check the scale in block 1117 to see if the deviations that work are excessive, and check the yes or no box accordingly in block 1126.

Count the unknown words in column 1120, and enter the total in the Total" box. Check the scale in block 1117 to see if the unknown words are excessive, and check the yes or no box accordingly in block 1126.

Determine if there are incidents of unusual speech patterns in column 1122, and check the yes or no box accordingly in block 1126. List any unusual speech patterns in the space provided at the bottom of FIGS. 2–8.

If the student is a virtual or total non-reader, check severe on errors 1124 and comprehension 1128, check "Yes" for excessive self-corrections and text deviations that work, and enter a score of 18 for cadence. (A virtual non-reader has a concept of word, knows at least 80% of the letters of the alphabet and their corresponding sounds and may be able to identify isolated words or phrases but cannot communicate with the author.)

DETERMINING IF THE STUDENT UNDERSTOOD THE PASSAGE

Ask the student to summarize the passage that he has just read. If the student's summary included the major elements of the story or essay or if, upon probing, the student reveals that he knows the major elements, there is no comprehension problem, and the mark should be placed on the "none" line in block 1128, "Comprehension Problem on the Passage?", in FIGS. 2–8. For example (using the passage of FIG. 7 "Lost in the Fog"): The student knows that: Shane is responsible for delivering the salmon in his boat to the base camp for quick-freezing. There is a heavy fog, which causes Shane to lose his way, and he is worried he will go aground on a sand bar and won't make it back before the fish spoil. His boss is mean and will really be "on Shane's case" if he doesn't make it back in time—even though he can't be expected to be able to navigate in a heavy fog. The fog lifts, Shane can see his way, and he knows he will make it back in time and his boss will be satisfied.

If the student can demonstrate an understanding of the story or essay either by the original re-telling or by successfully answering your subsequent probing questions, but he misses information that is somewhat important (more than trivial) but is not at all critical to the understanding of the story, mark the "subtle" line. For example: The student doesn't know that it is important for Shane to return to the base camp on time because there is a danger of the fish spoiling. (It is okay if the student doesn't know trivial information, such as the name of the characters or the fact that Shane hadn't slept for 24 hours. In such a case, mark the "none" line.)

If the student communicates his understanding of the most important elements of the story, but he cannot recount or answer a probe about rather important aspect of the story, mark the "moderate" line. For example: The student knows that Shane was lost and that he got back on time, but he doesn't know he was lost because of the fog and that he got back on time because the fog lifted. He does know that Shane's boss is unreasonable and that if he doesn't get to base camp on time, the boss will hold Shane accountable, and he will be in big trouble.

If the student cannot communicate his understanding of the most important elements of the story, mark the "severe" line. For example: The student can't weave the element of the mean boss into the story.

5. DETERMINING THE STUDENT'S PLACEMENT RANGE

Sometimes placement decisions can be made by considering only the cadence symptoms that were revealed as the student read out loud. If the cadence score is 10–18, the selection is too difficult for placement. Ask the student to read a less-complex passage. If the cadence score is 5–9 and there are no other symptoms, place the student at this range. If there is one or more other symptoms (errors, comprehension, excessive self-corrections, excessive text deviations that work, excessive unknown words), be cautious about placing the student at this range. Ask him to read a less-complex passage. If the cadence score is 0–4, check the appropriate line on FIGS. 2–8, block 1100, and use this information in 1conjunction with the other symptom information to determine placement, as described below.

Once the marks are entered in the appropriate lines for Cadence (0"4), Errors, and Comprehension, analyze the position of the marks. If there is not a balance, ask the student to read another passage—higher if the imbalance reveals the passage isn't sufficiently challenging and lower if the imbalance reveals the passage is too challenging. If there is a balance around the center, the student is placed at that range, and there is no need to read another passage.

EXAMPLE #1

| Unnatural Cadence? | -3- score | | | | |
|---|---|---|---|---|---|
| Cadence (0–4) | None (0) | Subtle (1) | 2 | X Moderate (3) | 4 |
| Errors | None | Subtle | | X Moderate | Severe |
| Comprehension Problem on the passage? | None | | | X Subtle | Moderate | Severe |

The marks line up in the center, so unless more than one excessive box is checked, the range that yielded this result is probably appropriate for placement. If three excessive boxes are checked, this range is most likely too complex, and if two are checked, it is a gray area. The results on the symptom analysis of the next lower range will help to make the decision. When in doubt, place at the lower range.

EXAMPLE #2

| Unnatural Cadence? | 4 score | | | | |
|---|---|---|---|---|---|
| Cadence (0–4) | None (0) | Subtle (1) | 2 | Moderate (3) | X 4 |
| Errors | None | Subtle | | X Moderate | Severe |
| Comprehension Problem on the passage? | None | | | Subtle | X Moderate | Severe |

The marks are congregated on the high end (right-hand side); there is no balance around the center. This range is too complex for placement. It doesn't matter what the results of the "Excessive" boxes are; this is not appropriate for placement. Ask the student to read a less-complex range.

EXAMPLE #3

| Unnatural Cadence? | 4 score | | | | |
|---|---|---|---|---|---|
| Cadence (0–4) | None (0) | Subtle (1) | 2 | Moderate (3) | X 4 |
| Errors | X None | Subtle | | Moderate | Severe |
| Comprehension Problem on the passage? | None | | | X Subtle | Moderate | Severe |

The score of 4 in cadence is on the high end, but is balanced by the "none" mark in the Errors category and by the "subtle" mark in Comprehension. If there are checks in the excessive boxes, you need to hear the next lower range to make the decision about placement.

6. CONCLUDING THE CONSULTATION

If the student described any difficulty with reading during the interview, tell him that what you heard while he was reading out loud verifies what he was saying, and then repeat some of the things he told you. Reassure him that the method's program will take care of those symptoms. Explain what the next steps are concerning starting the program (when he will be told his tutoring schedule and when tutoring will begin).

III. Administering a Symptom Reduction Analysis (SRA)

The Symptom Reduction Analysis is designed to measure the student's progress in the method. As his reading problem is eliminated, the symptoms that emerge when he reads orally diminish until, finally, they disappear. This measure is criterion-referenced, reflecting the progress the brain is making in remodeling the guidance system for reading. It is the most valid measure of reading improvement because it is not dependent on artificial and ambiguous concepts like grade-level and it is not measuring unrelated variables such as the ability to make inferences, test-taking skills, the emotional state of the student, or the student's willingness to take the test seriously.

A Symptom Reduction Analysis must be conducted every time the student advances to a new range and at least every two months or 40 hours of tutoring.

Ask the student to read aloud from a passage at the same range he is currently in (not the one he is moving to). Tape-record the reading on the original consultation tape, and proceed exactly as if this were a consultation except that the student will read only one passage. Mention the date and the total hours of tutoring since the last recording just before the student starts reading the passage.

The results of the symptom reduction analysis are reported on a Symptom Reduction form, similar to the forms of FIGS. 2–8.

IV. Starting the Student—Red and Green Ranges

Figure 13:
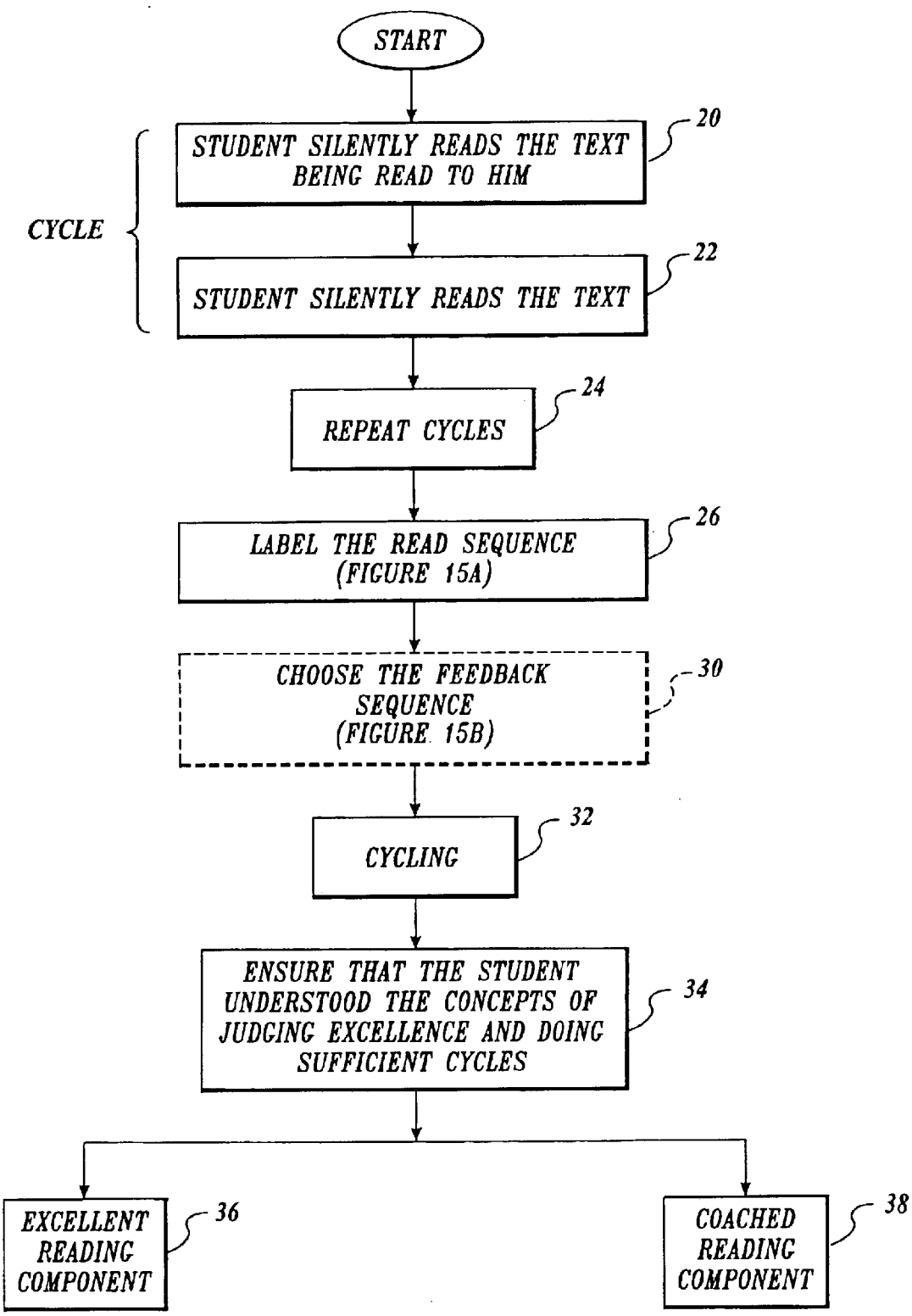
FIG. 13 is a flowchart illustrating the steps involved in starting a student in a method of the present invention.

Starting the Student teaches the methodology to the student, and it begins building the concept of excellent reading, which lays the foundation for judging excellence. FIG. 13 is a flowchart illustrating some major steps included in the Starting the Student process.

It is important to lead the student through the starting process one step at a time. It is very confusing to the student if you tell him too many things at once. Read the quotations virtually verbatim, and observe your student closely to make sure he does each step correctly. The tendency for tutors is to try to protect the student from mistakes by giving him lots of information in advance. The brain learns much more quickly by experimenting with a reasonable amount of new information, making mistakes applying the new information, and resolving the mistakes independently.

The Starting the Student process is designed to be administered step-by-step. You will always use the Starting the Student Check List, shown in FIG. 14, when you are starting any student.

Bring in all the students scheduled in the group. Start one student while the others observe.

Step One

Retrieve two or three 'easier' books—those having shorter or fewer paragraphs (or sentences)—from the student's placement range. The books are part of the library prepared to implement the methodology. The library will be described in detail later in Chapter XX.

Step Two

Say to the student, "Today we are going to talk about excellent reading and begin tutoring. I will lead you through the starting the student process one step at a time. When we're done, you'll understand what your job is as a student. I will also be reading you instructions from this notebook, as I am doing now. Do not let that distract you. The messages I read are for you."

Step Three

Put the books in front of the student, saying "Pick a book that you want to work with."

Step Four (Block 20 of FIG. 13)

After he picks a book, say "I'm going to read the first paragraph [sentence] in this book out loud. You need to read along with me silently."

As he reads along silently, make sure he's reading only with his mind and not pointing, moving his lips, or bobbing his head.

Step Five (Block 22 of FIG. 13)

After you and the student finish the reading, say "I want you to read the paragraph [sentence] silently again. After you're finished, softly tap your finger on the desk."

Step Six (Block 24 of FIG. 13)

After the student taps his finger, explain the process of cycling, saying "You have just completed one cycle. The first step in the cycling process is for you to read with me silently as I read out loud. The second step in the cycling process is for you to read it silently again."

Have the student practice cycling without attempting excellence, saying to the student "We're going to do three more cycles on the same paragraph [sentence]. Softly tap your finger on the desk each time you've finished reading it silently by yourself."

Step Seven

After completion of the cycles, explain why you're doing them, saying "You do cycles so that you can familiarize yourself with the paragraph [sentence] in order to read it excellently. The idea is to continue doing cycles until you achieve excellence silently, and then read it out loud to me. In order to understand what we mean by achieving excellence, you need to experience non-excellent reading and then experience excellent reading. That's what we're going to do next. The contrast will help you identify excellence."

Step Eight

Figure 15A:
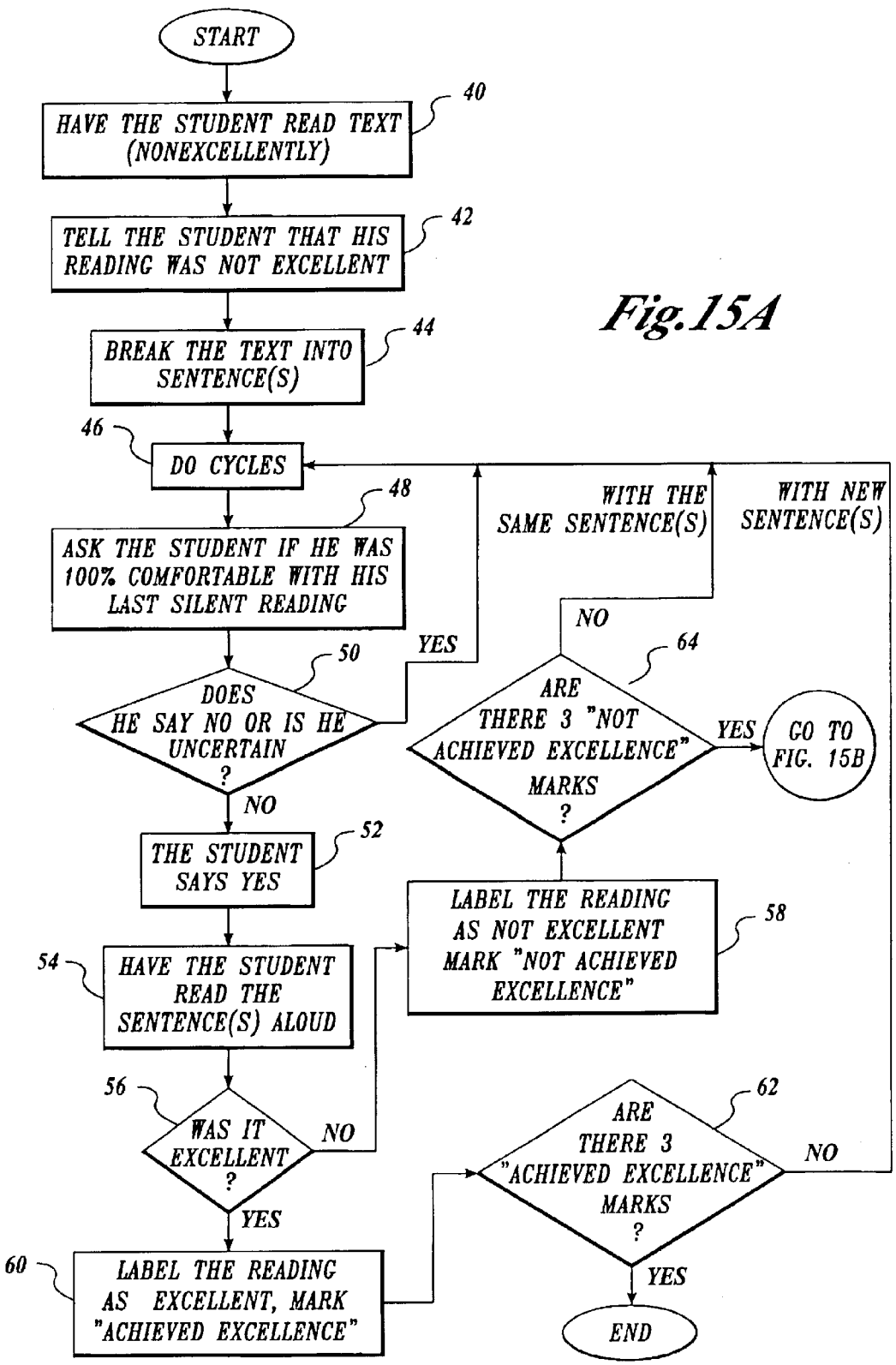
FIG. 15A is a flowchart illustrating the steps involved in Label the Read Sequence according to the present invention.

Implement the Label the Read sequence (block 26 in FIG. 13) described below, and begin using the Starting the Student Check List of FIG. 14. The Label the Read sequence is described in a flowchart of FIG. 15A.

Label the Read Sequence

A. (Block 40 of FIG. 15A) Move to the next paragraph (sentence) and say to the student, "I want you to experience non-excellent reading. Read out loud until I say stop." Have the student continue reading until he reads less than excellently for about 10 seconds and then tell him to stop.

B. (Block 42) After you tell the student to stop, say "That wasn't excellent. I'm going to help you think about what we mean by excellent reading. Think about what the author is saying, even when you're reading out loud. This is by far the most important instruction I can give you. Let me say it again. Think about what the author is saying, even when you're reading out loud. If you don't understand what the author is saying, ask me to explain it to you."

"Then, when you finish the read, ask yourself if you were comfortable with it. If you felt 100% comfortable with the reading and understood what the author said, you achieved excellence. If you didn't understand what the author said or you weren't 100% comfortable you didn't achieve excellence."

C. (Block 44) Break down the paragraph the student was on when you said, "Stop" into one sentence.

D. (Block 46) Point to the sentence, and say, "Now I'm going to show you what excellent reading feels like. We're going to do_(enter any number of cycles, 3 or 4, for example, but could be 1 through 8) cycles on this sentence. If you don't understand something you read, interrupt the cycling and ask me to explain it. Each time you finish the silent reading, tap your finger on the desk so I'll know you're done." (When you repeat step "D", as described below, you can choose to leave out the first, third, and/or fourth sentences).

E. Proceed with cycling.

F. (Block 48) After the cycling is completed, say "Were you 100% comfortable with your last silent read?"

If the student says no or is uncertain (Block 50)

Tell the student how many additional cycles you are going to do, and repeat E and F.

If the student says yes (Block 52)

Say, "Read the sentence out loud." (Block 54)

G. After the student finishes the read, decide if it was excellent. (Block 56)

If it wasn't excellent (Block 58)

Label the read, saying, "That wasn't excellent."

Put a check mark in the "Not Achieved Excellence" box in the Label the Read Sequence on the Starting the Student Check List of FIG. 14.

Proceed to H, using the same sentence.

If it was excellent (Block 60)

Label the read, saying, "That was excellent."

Put a check mark in the "Achieved Excellence" box in the

Label the Read Sequence on the Starting the Student Check List of FIG. 14.

Erase any check marks in the "Not Achieved Excellence" box, Label the Read Sequence on the Starting the Student Check List of FIG. 14.

Proceed to H, using a new sentence.

If you are uncertain

Say, "I'm not sure. Read it again."

Repeat (without cycling) until your uncertainty is resolved. When you resolve your uncertainty, label the reading and proceed accordingly (for non-excellent reading or for excellent reading) as above.

H. Repeat D, E, F, and G until:

(Block 62) The student accumulates three check marks in the "Achieved Excellence" box, Label the Read, Sequence on the Starting the Student Check List of FIG. 14, and then proceed to Step Nine; or (Block 64) The student accumulates three check marks in the "Not Achieved Excellence" box, Label the Read Sequence on the Starting the Student Check List, and then proceed to the Choose the Feedback Sequence below using the same sentence.

CHOOSE THE FEEDBACK SEQUENCE (Block 30 of FIG. 13)

Figure 15B:
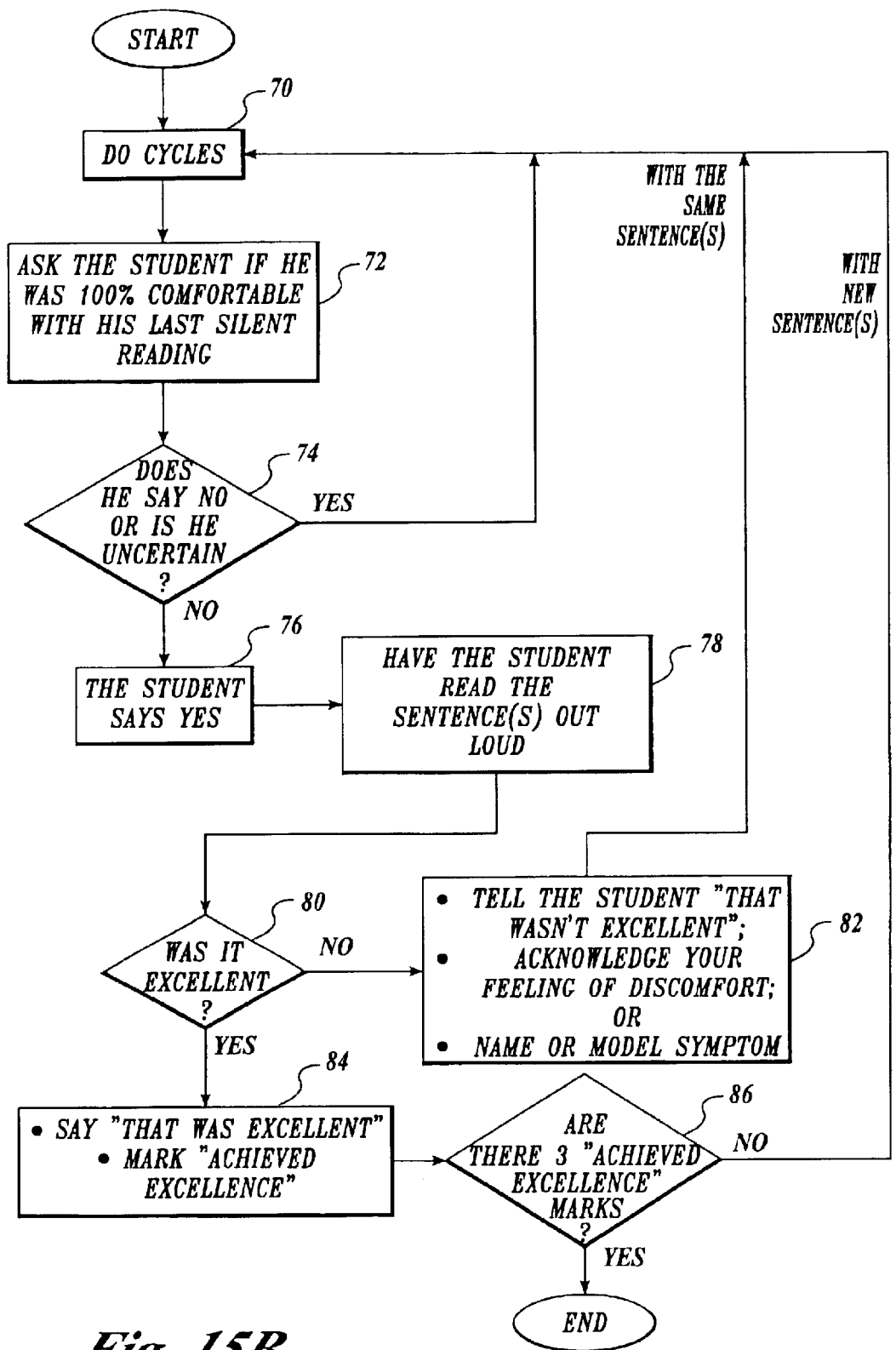
FIG. 15B is a flowchart illustrating the steps involved in Choose the Feedback Sequence according to the present invention.

FIG. 15B illustrates the steps included in the Choose the Feedback sequence.

I. (Block 70 in FIG. 15B) Point to the sentence, and say to the student, "We're going to do__cycles on this sentence."

J. Proceed with cycling.

K. (Block 72) After the cycling is completed, say "Were you 100% comfortable with your last silent read?"

If the student says no or is uncertain (Block 74)

Tell the student how many additional cycles you are going to do and repeat J and K.

If the student says yes (Block 76)

Say, "Read the sentence out loud." (Block 78)

L. After the student finishes the read, decide if it was excellent. (Block 80)

If it wasn't excellent (Block 82)

And you choose to label the read

Say, "That wasn't excellent." Proceed to M, using the same sentence.

And you choose to acknowledge your feeling of discomfort

Say, "That wasn't excellent. I wasn't comfortable with your reading." You can choose to use additional guiding remarks or techniques, as described fully below in Chapters X. Proceed to M, using the same sentence.

And you choose to name and/or model symptoms

Say, "That wasn't excellent." Then name and/or model the symptom you identified, as described fully below in Chapter X. You can choose to use additional guiding remarks or techniques described in Chapter X below. Proceed to M, using the same sentence.

If it was excellent (Block 84)

Say, "That was excellent." Put a check mark in the "Achieved Excellence" box, Choosing Instruction Sequence on the Starting the Student Check List of FIG. 14. Proceed to M, using a new sentence.

If you are uncertain

Say, "I'm not sure. Read it again." Repeat (without cycling) until your uncertainty is resolved. When you resolve your uncertainty, tell him your conclusion and proceed accordingly (not excellent or excellent) as described above.

M. (Block 86) Repeat I, J, K, and L until the student accumulates three check marks in the "Achieved Excellence" box, Choose the Appropriate Feedback Sequence on the Starting the Student Check List of FIG. 14, and then proceed to Step Nine.

Step Nine (Block 32 of FIG. 13)

Return to paragraph (sentence) one at the beginning of the book, and say "You have experienced excellent reading and practiced the cycling process. Now you will practice judging excellence on your own. We will cycle this paragraph [sentence] until you feel 100% comfortable with the reading. Often this will require many cycles. If you don't understand something on the page, ask me to explain it. If you are not 100% comfortable with the silent read, it means you didn't achieve excellence, and you need to signal me that you want another cycle. Signal me by softly tapping your finger on the desk. When you achieve excellence silently, signal me by putting your thumb up."

Proceed with cycling.

Step Ten

After the student signals with his thumb, say "Read the paragraph [sentence] out loud."

Step Eleven

After the student finishes the read, judge if it was excellent, and ask "Was it excellent?"

If the student is uncertain

Say, "The next time I ask you if the reading was excellent, you must make a decision. Tell me either yes or no. Right now we're going to do__(3 or 4, for example) cycles on the same paragraph [sentence]. Tap your finger on the desk each time you finish the silent reading."

Return to cycling on the same paragraph

After the cycling is completed, return to Step Ten.

If the student says the reading was excellent (Block 34 of FIG. 13)

And you agree

Say, "I agree."

If the student is in the red range (Block 36 of FIG. 13)

Begin tutoring the student in the Excellent Reading component using the red methodology. The Starting the Student process has been completed for this student. Throw away the Starting the Student Check List (FIG. 14).

If the student is in the green range (Block 38 of FIG. 13)

Begin tutoring the student in the Coached Reading component using the green methodology. The Starting the Student process has been completed for this student. Throw away the Starting the Student Check List (FIG. 14).

And you disagree

Say, "I disagree. We need to continue cycling. Signal when you have achieved excellence silently and are ready to read out loud." You can choose to offer a guiding remark or technique. Begin cycling on the same paragraph (sentence). When the student signals he is ready to read out loud, return to Step Ten.

And you are uncertain

Say, "I'm not sure. Read it again." Repeat (without cycling) until your uncertainty is resolved. When you resolve your uncertainty, tell him your opinion.

If you didn't think it was excellent

Say, "I didn't think that was excellent. We need to continue cycling. Signal when you have achieved excellence silently and are ready to read out loud". You can choose to offer a guiding remark or technique. Return to cycling on the same paragraph (sentence). When the student signals he is ready to read out loud, return to Step Ten.

If you thought it was excellent

Say, "I thought that was excellent". Let's cycle the next paragraph. Signal when you have achieved excellence silently and are ready to read out loud." Proceed to cycling on the next paragraph (sentence). When the student signals he is ready to read out loud, return to Step Ten.

If the student says the reading was not excellent

And you agree

Say, "I agree. We need to continue cycling. Signal when you have achieved excellence silently and are ready to read out loud." You can choose to offer a guiding remark or technique. Return to cycling on the same paragraph (sentence). When the student signals he is ready to read out loud, return to Step Ten.

And you disagree

Say, "Okay. We need to continue cycling. Signal when you have achieved excellence silently and are ready to read out loud." Return to cycling on the same paragraph (sentence). When the student signals he is ready to read out loud, return to Step Ten; or Say, "I thought that was excellent. Let's cycle the next paragraph. Signal when you have achieved excellence silently and are ready to read out loud." Proceed to cycling on the next paragraph (sentence). When the student signals he is ready to read out loud, return to Step Ten.

And you are uncertain

Say, "I'm not sure. Read it again." Repeat (without cycling) until your uncertainty is resolved. When you resolve your uncertainty, tell him your opinion.

If you didn't think it was excellent

Say, "I didn't think that was excellent. We need to continue cycling. Signal when you have achieved excellence silently and are ready to read out loud." You can choose to offer a guiding remark or technique. Return to cycling on the same paragraph (sentence). When the student signals he is ready to read out loud, return to Step Ten.

If you thought it was excellent

Say, "I thought that was excellent. Let's cycle the next paragraph. Signal when you have achieved excellence silently and are ready to read out loud." . Proceed to cycling on the next paragraph (sentence). When the student signals he is ready to read out loud, return to Step Ten.

V. Starting the Student—Blue Through Orange Ranges

The process of starting a student at these higher ranges is substantially the same as starting the student in red and green ranges as described above, but in these ranges students, with the exception of Step 12, listen to passages as recorded on cassette tapes as opposed to passages read by a tutor.

As before, the Starting the Student process is designed to be administered step-by-step. You will always use the Starting the Student Check List of FIG. 14 when you are starting any student.

STEP ONE

Retrieve two or three 'easier' book—those having shorter paragraphs or larger print—from the student's placement range in the library, and show them to the student. Be sure to include both a book of selections—containing several stories—and a single book containing only one story.

STEP TWO

Say to the student "Today we are going to talk about excellent reading and begin tutoring. I will lead you through the starting the student process one step at a time. When we're done, you'll understand what your job is as a student. I will also be reading you instructions from this notebook, as I am doing now. Do not let that distract you. The messages I read are for you."

STEP THREE

Put the books in front of the student, and then say "Pick a book that you want to work with."

If he chooses a book of selections

Show the student the cassette tape, and say "The tape on the book you have chosen contains several short stories. The ones that are taped are listed on the cassette. We will be working with the first story that's taped. When we finish it, you can move to the next taped story, or to an entirely different book."

If he chooses a single book

Say, "You have chosen a book that has one story in it, and that's the one we'll work with." Show him a book of selections, and then say "There are several short stories in this book. At some point in the future when you choose a similar book, be sure to ask me how to use it."

STEP FOUR

Take the cassette tape out of its sleeve, and then say to the student "Put the tape into the recorder and push the rewind button to make sure the tape is fully rewound."

STEP FIVE

After the tape is fully rewound, say, "Zero out the counter so we can keep track of where we are on the tape." If he doesn't understand, point to the button he needs to push in, saying, "Push this down."

STEP SIX

After he has zeroed out the counter, say to the student "You're going to listen to the tape with the earphones on. You will hear a recorded introduction at the beginning of the tape—before the story starts. Right when the introduction is finished, just before the story starts, push the pause button on the tape recorder."

STEP SEVEN

After he has pushed the pause button, say "Look at the counter number and write it on a piece of paper."

STEP EIGHT (BLOCK 20 OF FIG. 13)

After he has written the number on a piece of paper, say "Play the tape by releasing the pause button. Read along silently with the tape through the first paragraph. Immediately after you finish the first paragraph, push the pause button again." As he reads silently with the tape, make sure he's reading only with his mind and not pointing, moving his lips, or bobbing his head.

STEP NINE (BLOCK 22 OF FIG. 13)

After he finishes reading silently with the tape, say "I want you to read the paragraph silently again. Knock on the desk when you're finished."

STEP TEN (BLOCK 24 OF FIG. 13)

After the student knocks, explain the process of cycling, saying "You have just completed one cycle. The first step in the cycling process is for you to read with the tape recorder silently and push the pause button at the end of the paragraph. The second step in the cycling process is for you to read it silently again." Have the student practice cycling without attempting excellence, saying "I want you to do three cycles on the same paragraph. Rewind the tape to the counter number you wrote down. Knock on the desk after you have completed all three cycles."

STEP ELEVEN

After the student knocks, explain why you're doing cycles, saying "You do cycles so that you can familiarize yourself with the paragraph in order to read it excellently. The idea is to continue doing cycles until you achieve excellence silently, and then read it out loud to me. In order to understand what we mean by achieving excellence, you need to experience non-excellent reading and then experience excellent reading. That's what we're going to do next. The contrast will help you identify excellence."

STEP TWELVE (BLOCK 26 OF FIG. 13)

Implement the Label the Read sequence, and begin using the Starting the Student Check List of FIG. 14.

LABEL THE READ SEQUENCE (FIGURE 15A)

A. (Block 40 of FIG. 15A) Move to the next paragraph, and say to the student, "I want you to experience non-excellent reading. Read out loud until I say stop." Have the student continue reading until he reads less than excellently for about 10 seconds and then tell him to stop.

B. (Block 42) After you tell the student to stop, say "That wasn't excellent."

"I'm going to help you think about what we mean by excellent reading. Think about what the author is saying, even when you're reading out loud. This is by far the most important instruction I can give you. Let me say it again. Think about what the author is saying, even when you're reading out loud. If you don't understand what the author is saying, ask me to explain it to you."

"Then, when you finish the read, ask yourself if you were comfortable with it. If you felt 100% comfortable with the reading and understood what the author said, you achieved excellence. If you didn't understand what the author said or you weren't 100% comfortable you didn't achieve excellence."

C. (Block 44) Break the paragraph the student was on when you said, "Stop" into one or two sentences for mid-level readers (BLUE, LIME, and PURPLE range readers, generally), or three or four sentences for high-level readers (YELLOW and ORANGE range readers, generally)

D. (Block 46) Point to the sentence(s), and say "Now I'm going to show you what excellent reading feels like. We're going to do__cycles (3 or 4, for example) on these sentences. If you don't understand something you read, interrupt the cycling and ask me to explain it. Each time you finish the silent reading, tap your finger on the desk so I'll know you're done." (When you repeat step "D", you can choose to leave out the first, third, and/or fourth sentences.)

E. Proceed with cycling. Read in place of the tape recorder.

F. (Block 48) After the cycling is completed, say to the student "Were you 100% comfortable with your last silent read?"

If the student says no or is uncertain (Block 50)

Tell him how many additional cycles you are going to do, and repeat E and F.

If the student says yes (Block 52)

Say, "Read the sentences out loud." (Block 54)

G. After the student finishes the read, decide if it was excellent. (Block 56)

If it wasn't excellent (Block 58)

Label the read, saying, "That wasn't excellent." Put a check mark in the "Not Achieved Excellence" box, Label the Read Sequence on the Starting the Student Check List of FIG. 14.

Proceed to H, using the same sentence(s).

If it was excellent (Block 60)

Label the read, saying, "That was excellent." Put a check mark in the "Achieved Excellence" box, Label the Read Sequence on the Starting the Student Check List of FIG. 14. Erase any check marks in the "Not Achieved Excellence" box, Label the Read Sequence on the Starting the Student Check List.

Proceed to H, using a new set of text (one, two, or three sentences).

If you are uncertain

Say, "I'm not sure. Read it again." Repeat (without cycling) until your uncertainty is resolved. When you resolve your uncertainty, tell him your conclusion, and proceed according to your conclusion as described above.

H. Repeat D, E, F, and G until:

(Block 62) The student accumulates three check marks (horizontally) in the "Achieved Excellence" box, Label the Read Sequence on the Starting the Student Check List of FIG. 14, and then proceed to Step Thirteen; or (Block 64) The student accumulates three check marks in the "Not Achieved Excellence" box, Label the Read Sequence on the Starting the Student Check List of FIG. 14, and then proceed to the Choose the Feedback Sequence below using the same sentence(s).

CHOOSE THE FEEDBACK SEQUENCE (block 30 of FIG. 13, also see FIG. 15B)

I. (Block 70 of FIG. 15B) Point to the sentences, and say to the student "We're going to do__cycles (3 or 4, for example) on this sentence(s)."

J. Proceed with cycling. Read in place of the tape recorder.

K. (Block 72) After the cycling is completed, say to the student "Were you 100% comfortable with your last silent read?"

If the student says no or is uncertain (Block 74)

Tell the student how many additional cycles you are going to do and repeat J and K.

If the student says yes (Block 76)

Say, "Read the sentences out loud." (Block 78)

L. After the student finishes the read, decide if it was excellent. (Block 80)

If it wasn't excellent (Block 82)

And you choose to label the read

Say, "That wasn't excellent." Proceed to M, using the same sentence(s).

And you choose to acknowledge your feeling of discomfort

Say, "That wasn't excellent. I wasn't comfortable with your reading." You can choose to use additional guiding remarks or techniques. Proceed to M, using the same sentence(s).

And you choose to name and/or model symptoms

Say, "That wasn't excellent." Then name and/or model the symptom you identified. You can choose to use additional guiding remarks or techniques. Proceed to M, using the same sentence(s).

If it was excellent (Block 84)

Say, "That was excellent." Put a check mark in the "Achieved Excellence" box, Choose the Appropriate Feedback Sequence on the Starting the Student Check List of FIG. 14. Proceed to M, using a new set of text (one, two, or three sentences).

If you are uncertain

Say, "I'm not sure. Read it again." Repeat (without cycling) until your uncertainty is resolved. When you resolve your uncertainty, tell him your conclusion.

If you conclude it wasn't excellent

Say, "That wasn't excellent." You can choose to offer a guiding remark or technique. Proceed to M, using the same sentences.

If you conclude it was excellent

Say, "That was excellent." Put a check mark in the "Achieved Excellence" box, Choose the Appropriate Feedback Sequence on the Starting the Student Check List of FIG. 14. Proceed to M, using a new set of text (one, two, or three sentences).

M. (Block 86) Repeat I, J, K and L until:

The student accumulates three check marks in the "Achieved Excellence" box, Choose the Appropriate Feedback Sequence on the Starting the Student Check List of FIG. 14, then proceed to Step Thirteen.

STEP THIRTEEN (BLOCK 32 OF FIGURE 13)

Return to the first paragraph at the beginning of the book, and say to the student "Rewind the tape back to the counter number you wrote down earlier." After the student correctly rewinds the tape, say "You have experienced excellent reading and practiced the cycling process. Now you will practice judging excellence on your own. I want you to cycle this paragraph until it feels 100% comfortable. Often this will require many cycles. If you don't understand something in the paragraph, ask me to explain it." "If you are not 100% comfortable with the silent reading, it means you didn't achieve excellence, and you need to return to cycling. When you achieve excellence silently, signal me by knocking on the desk."

Have the student proceed with cycling.

STEP FOURTEEN

After the student knocks, say "Read the paragraph out loud."

STEP FIFTEEN

When he's finished the read, judge if it was excellent, and say to the student "Was it excellent?"

If the student is uncertain

Say, "The next time I ask you if your reading was excellent, you must make a decision. Tell me either yes or no. Right now I want you to do_(3 or 4, for example) more cycles on the same paragraph. Knock on the desk when you're ready to attempt excellence out loud."

Have the student return to cycling on the same paragraph.

After the student signals that he is ready to make another attempt at excellence, return to Step Fourteen.

If the student says the reading was excellent (Block 34 of FIG. 13)

And you agree (Block 36 of FIG. 13)

Say, "I agree." Instruct the student to write the new counter number on a piece of paper. Begin tutoring the student in the Excellent Reading Component, using the methodology for the blue, lime, purple, yellow, and orange ranges. The Starting The Student process has been completed for this student. Throw away the Starting the Student Check List.

And you disagree

Say, "I disagree. You need to continue cycling. Signal when you have achieved excellence silently and are ready to read out loud." You can choose to offer a guiding remark or technique. Begin cycling on the same paragraph. When the student signals he is ready to read out loud, return to Step Fourteen.

And you are uncertain

Say, "I'm not sure. Read it again." Repeat (without cycling) until your uncertainty is resolved. When you resolve your uncertainty, tell him your opinion.

If you didn't think it was excellent

Say, "I didn't think that was excellent. You need to continue cycling. Signal when you have achieved excellence silently and are ready to read out loud." You can choose to offer a guiding remark or technique. Have the student return to cycling on the same paragraph. When the student signals he is ready to read out loud, return to Step Fourteen.

If you thought it was excellent

Say, "I thought that was excellent. Cycle the next paragraph. Signal when you have achieved excellence silently and are ready to read out loud." Proceed to cycling on the next paragraph. When the student signals he is ready to read out loud, return to Step Fourteen.

If the student says the reading was not excellent

And you agree

Say, "I agree. You need to continue cycling. Signal when you have achieved excellence silently and are ready to read out loud." You can choose to offer a guiding remark or technique. Have the student return to cycling on the same paragraph. When the student signals he is ready to read out loud, return to Step Fourteen.

And you disagree

Say, "Okay. You need to continue cycling. Signal when you have achieved excellence silently and are ready to read out loud." Have the student return to cycling on the same paragraph (sentence). When the student signals he is ready to read out lout, return to Step Fourteen; or Say, "I thought that was excellent. Move to the next paragraph, please. Signal when you have achieved excellence silently and are ready to read out loud." Proceed to cycling on the next paragraph. When the student signals he is ready to read out loud, return to Step Fourteen.

And you are uncertain

Say, "I'm not sure. Read it again." Repeat (without cycling) until your uncertainty is resolved. When you resolve your uncertainty, tell him your opinion.

If you didn't think it was excellent

Say, "I didn't think that was excellent. You need to cycle the next paragraph. Signal when you have achieved excellence silently and are ready to read out loud." You can choose to offer a guiding remark or technique. Have the student return to cycling on the same paragraph. When the student signals he is ready to read out loud, return to Step Fourteen.

If you thought it was excellent

Say, "I thought that was excellent. You can cycle the next paragraph. Signal when you have achieved excellence silently and are ready to read out loud." Instruct the student to write the new counter number on a piece of paper. Proceed to cycling the next paragraph. When the student signals he is ready to read out loud, return to Step Fourteen.

VI. The Methodology for the Red Range

Figure 16A:
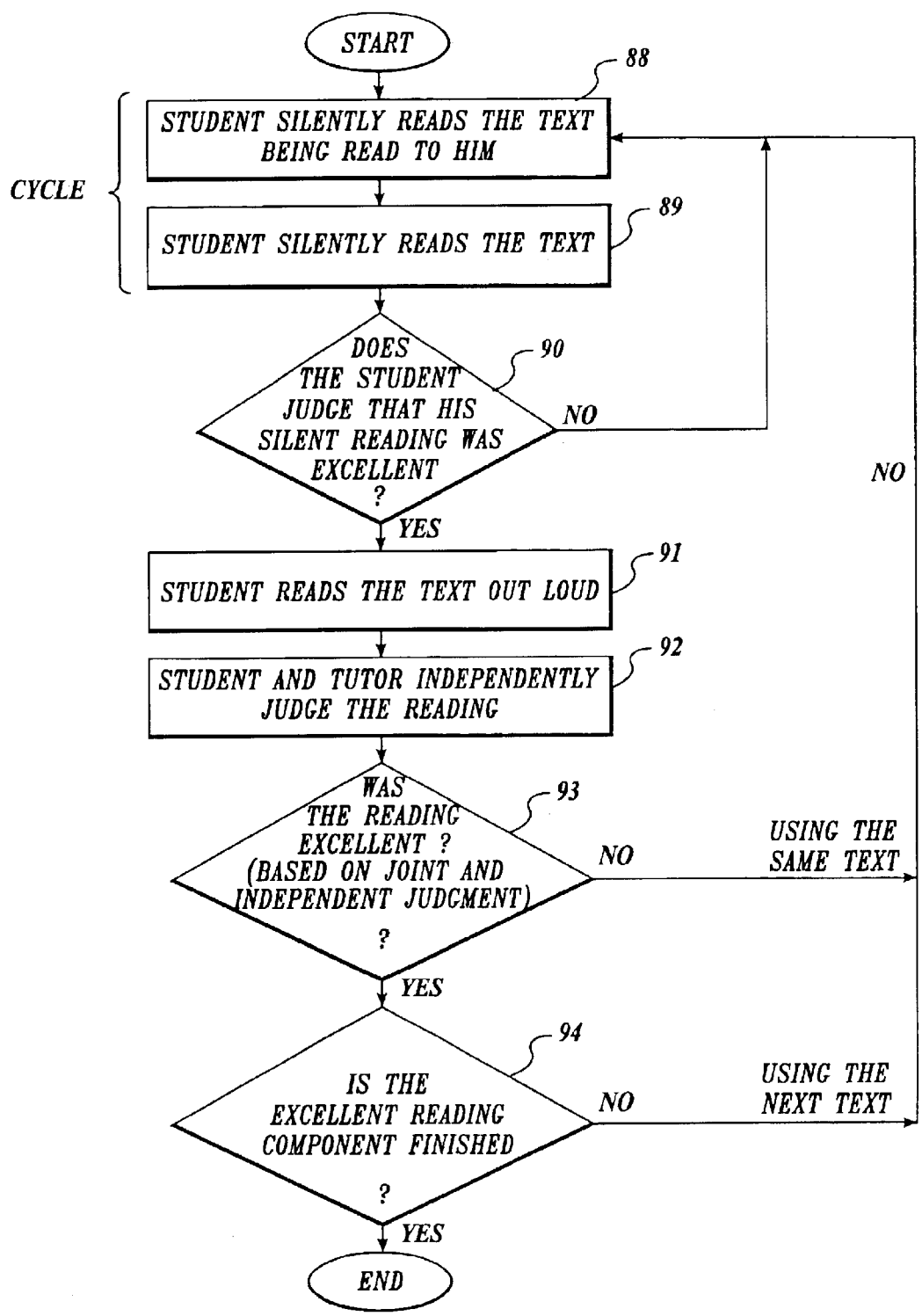
FIG. 16A is a flowchart illustrating the Excellent Reading component of the present invention.

FIG. 16A is a flowchart illustrating the methodology according to the present invention.

THE EXCELLENT READING COMPONENT

During the Excellent Reading component of the method's tutoring session, a clear goal is established for the student to produce excellent reading—reading that is comfortable and natural and results in understanding the author's message. It is the demand for excellence at each paragraph that helps the brain figure out how the complex, integrative, interactive, largely implicit process of reading is accomplished.

STEP ONE

When beginning a new book, the student reads along silently with you while you read the book out loud.

STEP TWO (BLOCKS 88 AND 89 IN FIG. 16A)

The student cycles the appropriate paragraph. He reads the paragraph silently while you read it out loud. He then reads it again silently.

STEP THREE (Block 90)

The student judges whether the silent reading was excellent.

If he thinks it was excellent

The student puts his thumb up, signaling to you that he is ready to attempt excellent reading out loud. Proceed to Step Four.

If he thinks it wasn't excellent

The student continues cycling on the same paragraph until he achieves excellence silently. The student taps his finger on the desk to signal each time he wants to do another cycle. After achieving excellence silently, the student puts his thumb up, signaling you that he is ready to attempt excellent reading out loud. Proceed to Step Four.

If he's uncertain

The student continues cycling on the same paragraph until he achieves excellence silently. The student taps his finger on the desk to signal each time he wants to do another cycle. Proceed to Step Four.

STEP FOUR (Block 91)

The student reads the paragraph out loud. You don't normally read along silently with the student.

STEP FIVE (Block 92)

You and the student independently judge if the reading was excellent.

STEP SIX (Block 93)

Ask the student, "Was it excellent?" After the student learns the cycling process, you don't have to ask him if the reading was excellent every time. He can immediately say "Yes" or "No" without waiting to be asked.

If the student says he's uncertain

Say, "We're going to continue cycling until you achieve excellence silently." Or, tell the student your opinion.

If you didn't think it was excellent

Say, "I didn't think that was excellent." Repeat Steps Two through Six, using the same paragraph.

If you thought it was excellent

Say, "I thought that was excellent." Repeat Steps Two through Six, using the next paragraph.

If the student says the reading was excellent

And you agree

Say, "I agree." Repeat Steps Two through Six, using the next paragraph.

And you disagree

Say, "I disagree." Repeat Steps Two through Six, using the same paragraph.

And you are uncertain (don't put check marks on the Guiding

Check List of FIG. 19, which will be described below)

Say, "I'm not sure. Read it again." Repeat (without cycling) until your uncertainty is resolved. When you resolve your uncertainty, tell him your opinion.

If you didn't think it was excellent

Say, "I didn't think that was excellent." Repeat Steps Two through Six, using the same paragraph.

If you thought it was excellent

Say, "I thought that was excellent." Repeat Steps Two through Six, using the next paragraph.

If the student says the reading was not excellent

And you agree

Say, "I agree." Repeat Steps Two through Six, using the same paragraph.

And you disagree

Say, "Okay." Repeat Steps Two through Six, using the same paragraph.

Or, say, "I thought that was excellent. Move to the next paragraph, please." Repeat Steps Two through Six, using the next paragraph.

And you are uncertain (don't put check marks on the Guiding Check List of FIG. 19)

Say, "I'm not sure. Read it again." Repeat (without cycling) until your uncertainty is resolved. When you resolve your uncertainty, tell him your opinion.

If you didn't think it was excellent

Say, "I didn't think that was excellent." Repeat Steps Two through Six, using the same paragraph.

If you thought it was excellent

Say, "I thought that was excellent." Repeat Steps Two through Six, using the next paragraph.

STEP SEVEN (Block 94)

Repeat Steps two through Six until a predetermined length of text is finished.

Figure 17A:
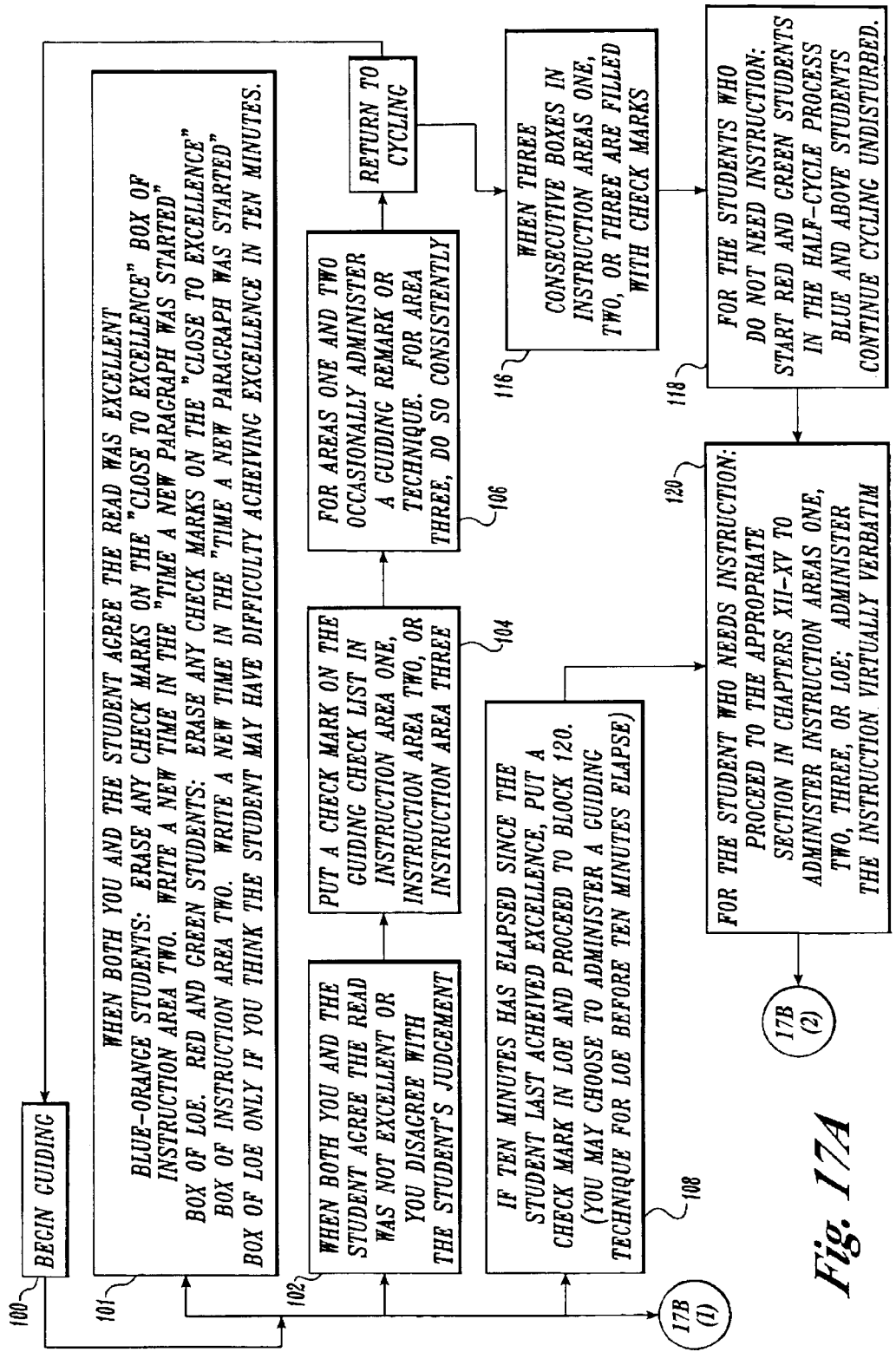
FIGS. 17A and 17B are flowcharts illustrating the guiding and instruction responsibilities of a tutor during the Excellent Reading component of a method of the present invention (hereinafter collectively referred to as FIG. 17)
Figure 17B:
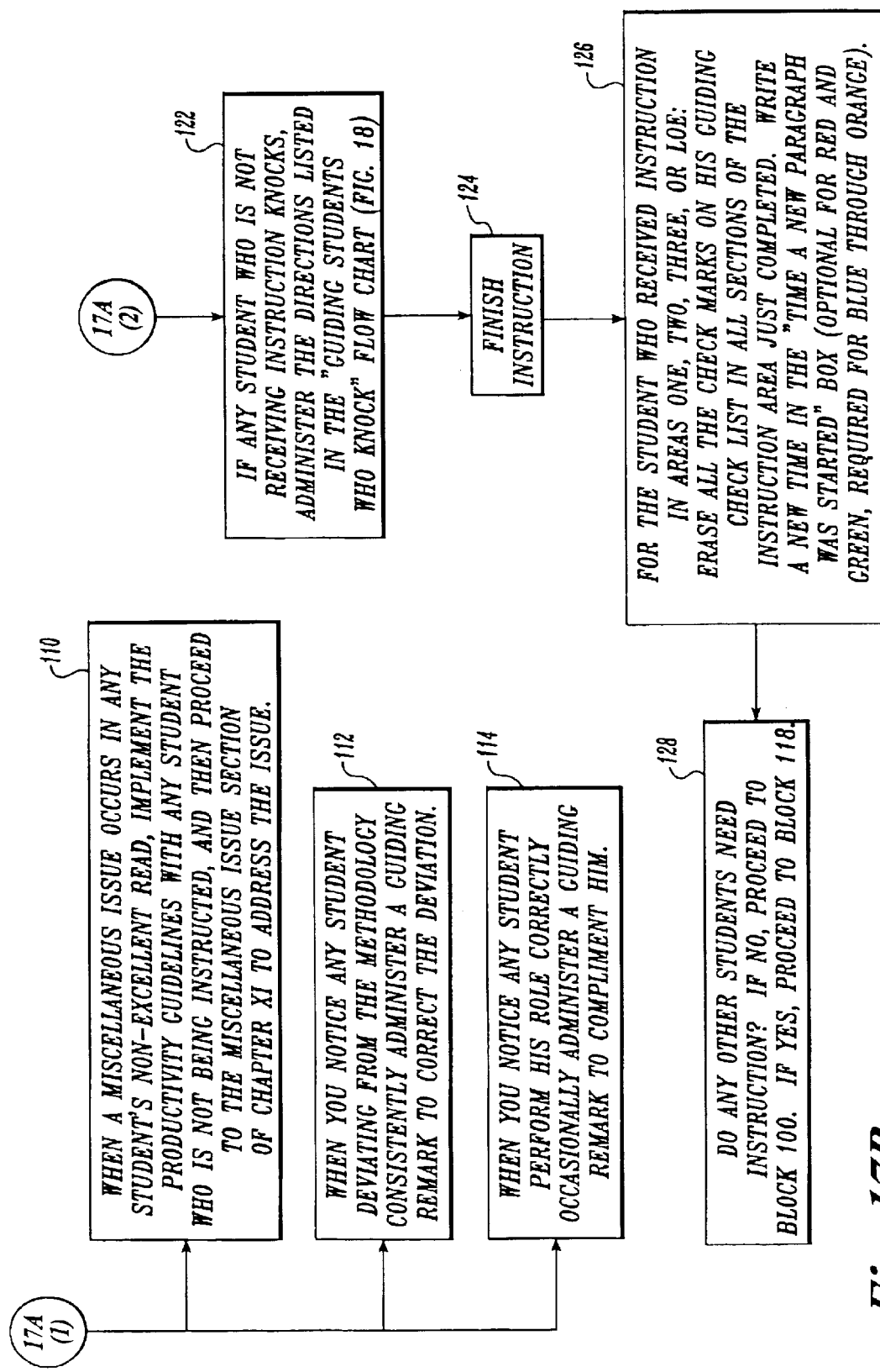

During the Excellent Reading Component of the method, as the student cycles through steps one through six described above, the tutor must both "guide" and "instruct" the student. FIG. 17 summarizes the tutor's responsibilities during the Excellent Reading Component, and is designed to be administered step-by-step. FIG. 17 should be kept easily accessible when you are tutoring. Also, you will always use the Guiding Check List, a sample of which is shown in FIG. 19, whenever you are implementing the Excellent Reading component.

GUIDING RESPONSIBILITIES

Your guiding responsibilities include:

1. Making the required adjustments to the Guiding Check List each time a student achieves excellence. (See block 101 of FIG. 17).

2. Identifying inconsistent judgements of excellence, not enough cycling, irresponsible behavior, or failing to achieve excellence in ten minutes (Blocks 102 and 108 of FIG. 17), placing check marks in the appropriate box on the Guiding Check List (FIG. 19) when inconsistencies are identified in Instruction areas One, Two, Three, or LOE (Lack of Efficiency) (Blocks 104 and 108 of FIG. 17), and offering guiding remarks or techniques to prevent a pattern of inconsistencies from developing (Blocks 106 and 108).

3. Addressing Miscellaneous Issues if they occur during non-excellent reads. (Block 110).

4. Identifying when the student is deviating from the methodology, and offering guiding remarks to correct the deviation (Block 112).

5. Identifying when the student is doing the process correctly, and offering guiding remarks confirming that he is (Block 114).

During guiding, the student must feel confident enough to judge excellence independently without being influenced by your judgement. It is imperative to use language that reflects your opinion of the read. We want you to say, "I agree; I disagree" or, when you're uncertain, "I'm not sure. Read it again." You should also explain this concept to the student by reinforcing that his judgement is his opinion, your judgement is your opinion, and both of you must be each other's safety net to insure accuracy.

Judging excellence is a team effort. Students who are treated as equals in the tutoring environment feel acknowledged and respected. They are more likely to have a strong intent to fully participate. When you and the student disagree, it doesn't really matter who is correct in the moment because the system requires both participants to agree on excellence before moving to the next paragraph. Sometimes you will judge excellence incorrectly (and not know it), and other times the student will judge excellence incorrectly (and not know it). Conceptualizing judgements as opinions will enable you and the student to learn from each other.

When the student's judgement is different from yours or when he is uncertain, he receives a check mark in Area One on the Guiding Check List (FIG. 19), and when he accumulates three of them in one section, he receives instruction because we assume he is the one having difficulty in judging. This may seem contradictory to the concept that each of your judgements is an opinion, but it really isn't. The tutor is statistically more likely to make correct judgements simply because she has significantly more training and experience judging. There is a possibility she could be incorrect on any given judgement, so the "safety net" of both participants agreeing on excellence is important. However, if a pattern of inconsistent judgements occurs, then there is a problem, and the least-trained and least-experienced member of the judging team is more likely to be incorrect.

INSTRUCTING RESPONSIBILITIES

Your instructing responsibilities include:

1. Proceeding to instruction when inconsistencies in the student's performance constitute a problem, as indicated by receiving three check marks in any one section of the Guiding Check List for Instruction Areas One, Two, or Three or by receiving one check mark for LOE. (Blocks 116 and 108 of FIG. 17).

2. Implementing the procedures for instruction step-by-step to insure the problem is properly addressed. Instruction procedures will be more fully described below.

During instruction, your judgement of excellent reading is no longer an opinion. The pattern of inconsistent judgements indicates that the student needs instruction to improve his judging ability. You will be telling the student whether or not the reading was excellent. You will say, "That was excellent; that wasn't excellent" or "I'm not sure. Read it again."

Although it happens infrequently, there is an "overlap possibility" among the Instruction Areas and LOE pertaining to what exactly is causing the patterns of check marks appearing on the Guiding Check List. This creates a potential for the cause of the problem to be misinterpreted. For example, maybe a student is not doing enough cycles to achieve excellence (Area Two) or is not achieving excellence within ten minutes (LOE) because he is confused about the concept of excellence (Area One). In this case, the check marks would accumulate in Area Two or LOE, but the instruction needed would be Area One Instruction. Or, if the student's negative behavior is resulting in his not having an intent to do the process correctly (Area Three), his check marks may accumulate in Area One, Area Two, or LOE even though the instruction is needed in Area Three. The methodology has a built-in safety net because the Guiding Check List (FIG. 19) will ultimately reveal the need for instruction in both the overlapping areas and the actual area that is causing the student problems. If the "overlapping possibility" occurs, it becomes an efficiency issue. To maximize the efficiency of the tutoring process, a tutor can choose to implement instruction in any area (or LOE) rather than the one indicated on the Guiding Check List. She should do so only if she knows (or has a strong hunch) that the actual cause of the problem is something other than what is showing on the Guiding Check List.

THE COACHED READING COMPONENT

Students in the red methodology alternate back and forth between the Excellent Reading component and the Coached Reading component, using a four-page set of text in the same book. For Coached Reading, the student reads out loud from pages he is familiar with. You read with the student silently and coach him as needed. Refer to "Alternating Coached and Excellent Reading" below and to the Coached Reading section (Chapter XVI) below to detail your coaching responsibilities.

Alternating Coached and Excellent Reading

Start with the Excellent Reading component. Read the book to the students and then cycle through the first four-page series. Shift to the Coached Reading component, returning to the beginning of the book, and coach through the same four-page series. Shift to Excellent Reading, cycling through the second four-page series. Shift to Coached Reading, returning to the beginning of the book, and coach through the second four-page series. This pattern continues until the book is finished and then have the students read the entire book coached.

Non-readers who have demonstrated a deficiency in their knowledge of sound-symbol associations will be instructed in sound-symbol associations for the first 10–15 minutes of the tutoring session using the materials shown in FIGS. 9 and 10 described above.

The Standard Methodology for the Red Range

Begin a new book (for example, 12 pages long)

Read the book to the students to familiarize them with the story.

| Excellent | Coached | Excellent |
|---|---|---|
| Pages 1, 2, 3, 4 | 1, 2, 3, 4 | 5, 6, 7, 8 |
| Coached | Excellent | Coached |
| 1 through 8 | 9 through 12 | 1 through 12 |

Methodology B for the Red Range

If you detect a pattern of your student's struggling excessively during Coached Reading, use Red Methodology B. (If you are beginning a new book, read it to the students first.)

| Excellent | Coached | Excellent | Coached |
|---|---|---|---|
| Pages 1, 2, 3, 4 | 1, 2, 3, 4 | 5, 6, 7, 8 | 5, 6, 7, 8, 1, 2, 3, 4, 5, 6, 7, 8 |
| Excellent | Coached | | |
| 9 through 12 | 9 through 12 then 1 through 12 | | |

Methodology C for the Red Range

If you are using Red Methodology B, and your student is still struggling excessively in Coached Reading, use Red Methodology C. (If you are beginning a new book, read it to the students first.)

| Excellent | Coached | Excellent | Coached | Excellent |
|---|---|---|---|---|
| Page 1 | 1 | 2 | 2, 1, 2 | 3 |
| Coached | Excellent | Coached | Excellent | Coached |
| 3,1,2,3 | 4 | 4,1,2,3,4 | 5 | 5,1,2,3,4,5 |

THE INDEPENDENT READING COMPONENT

It is the student's responsibility to do Independent Reading outside the tutoring session. The student chooses any book he has completed reading during his tutoring sessions and checks it out.

At the beginning of each tutoring session, ask the student if he did any Independent Reading since the previous session. It is important to ask the student at the beginning of each session if he did Independent Reading in order to increase the likelihood that he will. If the student is not doing Independent Reading, encourage him to do so.

VII. Methodology for the Green Range the Excellent Reading Component

STEP ONE (BLOCKS 88 AND 89 IN FIG. 16A)

The student cycles the appropriate paragraph. He reads the paragraph silently while you read it out loud. He then reads it again silently. Some green books have long pages with substantial amounts of conversation. This creates a long sequence of very short paragraphs. In these cases, put several of these very short paragraphs together for a single cycle. In other books, there may be unusually long paragraphs. In these instances, you can choose to divide them for cycling.

STEP TWO (BLOCK 90 IN FIG. 16A)

The student judges whether the silent reading was excellent.

If he thinks it was excellent

The student puts his thumb up, signaling you that he is ready to attempt excellent reading out loud. Proceed to Step Three.

If he thinks it wasn't excellent

The student continues cycling on the same paragraph until he achieves excellence silently. The student taps his finger on the desk to signal each time he wants to do another cycle. After achieving excellence silently, the student puts his thumb up, signaling you that he is ready to attempt excellent reading out loud. Proceed to Step Three.

If he's uncertain

The student continues cycling on the same paragraph until he achieves excellence silently. The student taps his finger on the desk to signal each time he wants to do another cycle. After achieving excellence silently, the student puts his thumb up, signaling you that he is ready to attempt excellent reading out loud. Proceed to Step Three.

STEP THREE (Block 91)

The student reads the paragraph out loud. You don't normally read along silently with the student.

STEP FOUR (BLOCK 92)

The student and you independently judge if the reading was excellent.

STEP FIVE (BLOCK 93)

Ask the student, "Was it excellent?" After the student learns the cycling process, you don't have to ask him if the reading was excellent every time. He can immediately say "Yes" or "No" without waiting to be asked.

If the student says he's uncertain

Say, "We're going to continue cycling until you achieve excellence silently." Or, tell the student your opinion.

If you didn't think it was excellent

Say, "I didn't think that was excellent." Repeat Steps One through Five, using the same paragraph.

If you thought it was excellent

Say, "I thought that was excellent." Repeat Steps One through Five, using the next paragraph.

If the student says the reading was excellent

And you agree

Say, "I agree." Repeat Steps One through Five, using the next paragraph.

And you disagree

Say, "I disagree." Repeat Steps One through Five, using the same paragraph.

And you are uncertain (Don't put check marks on the Guiding Check List of FIG. 19.)

Say, "I'm not sure. Read it again." Repeat (without cycling) until your uncertainty is resolved. When you resolve your uncertainty, tell him your opinion.

If you didn't think it was excellent

Say, "I didn't think that was excellent." Repeat Steps One through Five, using the same paragraph.

If you thought it wasn't excellent

Say, "I thought that was excellent." Repeat Steps One through Five, using the next paragraph.

If the student says the reading was not excellent

And you agree

Say, "I agree." Repeat Steps One through Five, using the same paragraph.

And you disagree

Say, "Okay." Repeat Steps One through Five, using the same paragraph. Or, say, "I thought that was excellent. Move to the next paragraph, please", and repeat Steps One through Five, using the next paragraph.

And you are uncertain (Don't put check marks on the Guiding Check List of FIG. 19.)

Say, "I'm not sure. Read it again." Repeat (without cycling) until your uncertainty is resolved. When you resolve your uncertainty, tell him your opinion.

If you didn't think it was excellent

Say, "I didn't think that was excellent." Repeat Steps One through Five, using the same paragraph.

If you thought it was excellent

Say, "I thought that was excellent." Repeat Steps One through Five, using the next paragraph.

STEP SIX (Block 94)

Repeat Steps One through Five until a predetermined length of text is finished.

The tutor has the same guiding and instructing responsibilities, as described above for the red range.

THE COACHED READING COMPONENT

Students in the green methodology alternate back and forth between the Coached Reading component and the Excellent Reading component, using a four-page set of text in the same book For Coached Reading, the student reads out loud to you from both familiar and unfamiliar pages. You read with the student silently and coach him as needed. Refer to "Alternating Coached and Excellent Reading" below and to the Coached Reading section below (Chapter XVI) to detail your coaching responsibilities.

Alternating Coached and Excellent Reading

Start with the Coached Reading component, coaching through the first four-page series. Then shift to the Excellent Reading component, returning to the beginning of the book, and cycle through the same four-page series. Shift to Coached Reading, starting at the beginning of the book, and coach through the second four-page series. Shift to Excellent, returning to the beginning of the latest four-page series, and cycle through it. This pattern continues until the book is finished, and then the student reads the entire book coached.

Begin a new book (12 pages long). (Do not read a new book to the student.)

| Coached | Excellent | Coached | Excellent |
|---|---|---|---|
| Pages 1, 2, 3, 4 | 1, 2, 3, 4 | 1, 2, 3, 4, 5, 6, 7, 8 | 5, 6, 7, 8 |
| Coached | Excellent | Coached | |
| 1 through 12 | 9, 10, 11, 12 | Entire Book | |

THE INDEPENDENT READING COMPONENT

It is the student's responsibility to do Independent Reading outside the tutoring session. The student chooses a red book with an Independent Reading sticker on the spine and checks it out.

At the beginning of each tutoring session, ask the student if he did any Independent Reading since the previous session. It is important to ask the student at the beginning of each session if he did Independent Reading in order to increase the likelihood that he will. If the student is not doing Independent Reading, encourage him to do so.

VIII. Methodology for the Blue, Lime, Purple, Yellow, and Orange Ranges

THE EXCELLENT READING COMPONENT

STEP ONE

When beginning a new book or story, the student reads along silently with the tape for no longer than ten minutes or until the story is finished.

STEP TWO (BLOCKS 88 AND 89 IN FIG. 16A)

The student cycles the appropriate paragraph. He reads the paragraph silently with the tape recorder. He then pauses the tape and reads it again silently.

STEP THREE (BLOCK 90)

The student judges whether the silent reading was excellent.

If he thinks it was excellent

The student knocks, signaling to you that he is ready to attempt excellent reading out loud. Proceed to Step Four.

If he thinks it wasn't excellent

The student continues cycling on the same paragraph until he achieves excellence silently. After achieving excellence silently, the student knocks, signaling you that he is ready to attempt excellent reading out loud. Proceed to Step Four.

If he's uncertain

The student continues cycling on the same paragraph until he achieves excellence silently. After achieving excellence silently, the student knocks, signaling you that he is ready to attempt excellent reading out loud. Proceed to Step Four.

STEP FOUR (BLOCK 91)

The student reads the paragraph out loud. You don't normally read along silently with the student.

STEP FIVE (BLOCK 92)

You and the student independently judge if the reading was excellent.

STEP SIX (BLOCK 93)

Ask the student, "Was it excellent?" After the student learns the cycling process, you don't have to ask him if the reading was excellent every time. He can immediately say "Yes" or "No" without waiting to be asked.

If the student says he's uncertain

Say, "Continue cycling until you achieve excellence silently." Or, tell the student your opinion.

If you didn't think it was excellent

Say, "I didn't think that was excellent." Repeat Steps Two through Six, using the same paragraph.

If you thought it was excellent

Say, "I thought that was excellent." Repeat Steps Two through Six, using the next paragraph.

If the student says the reading was excellent

And you agree

Say, "I agree." Repeat Steps Two through Six, using the next paragraph.

And you disagree

Say, "I disagree." Repeat Steps Two through Six, using the same paragraph.

And you are uncertain (Don't put check marks on the Guiding Check List of FIG. 19.)

Say, "I'm not sure. Read it again." Repeat (without cycling) until your uncertainty is resolved. When you resolve your uncertainty, tell him your opinion.

If you didn't think it was excellent

Say, "I didn't think that was excellent." Repeat Steps Two through Six, using the same paragraph.

If you thought it was excellent

Say, "I thought that was excellent." Repeat Steps Two through Six, using the next paragraph.

If the student says the reading was not excellent

And you agree

Say, "I agree." Repeat Steps Two through Six, using the same paragraph.

And you disagree

Say, "Okay." Repeat Steps Two through Six, using the same paragraph. Or, say, "I thought that was excellent. Move to the next paragraph, please." and repeat Steps Two through Six, using the next paragraph.

And you are uncertain (Don't put check marks on the Guiding Check List of FIG. 19.)

Say, "I'm not sure. Read it again." Repeat (without cycling) until your uncertainty is resolved. When you resolve your uncertainty, tell him your opinion.

If you didn't think it was excellent

Say, "I didn't think that was excellent." Repeat Steps Two through Six, using the same paragraph.

If you thought it was excellent

Say, "I thought that was excellent." Repeat Steps Two through Six, using the next paragraph.

STEP SEVEN (Block 94)

Repeat Steps two through Six until the tutoring session is finished.

The tutor's guiding and instructing responsibilities are substantially the same as for the red and green ranges as described above in reference to FIG. 17.

THE COACHED READING COMPONENT

The student selects a book without an accompanying cassette tape for Coached Reading. He reads it aloud to you. You read with the student silently and coach him as needed. Refer to the Coached Reading section below (Chapter XVI) to detail your coaching responsibilities. In general, Coached Reading lasts one-fourth of the tutoring session for each student.

| Length of Session in Minutes | Length of Coached Reading |
| --- | --- |
| 60 | 15 |
| 55 | 13 |
| 50 | 12 |
| 45 | 11 |
| 40 | 10 |
| 35 | 8 |
| 30 | 7 |

THE INDEPENDENT READING COMPONENT

It is the student's responsibility to do Independent Reading outside the tutoring session. The student chooses a book from the Independent Reading library in any range below his current placement range and checks it out.

At the beginning of each tutoring session, ask the student if he did any Independent Reading since the previous session. It is important to ask the student at the beginning of each session if he did Independent Reading in order to increase the likelihood that he will. If the student is not doing Independent Reading, encouraged him to do so.

IX. Excellent Reading

In this section, the concept of "excellent reading" is described and defined in detail. A student with a reading problem cannot read excellently because the neural network that guides his reading has been improperly built. During the Excellent Reading component of the method's tutoring session, a clear goal is established for the student to produce excellent reading—reading that is comfortable and natural and results in understanding the author's message. By enhancing the predictability of the text through cycling the student can produce excellent reading even though he has a reading problem.

Enhancing the predictability of the text seduces the student's brain into utilizing prediction from prior knowledge as the major reading strategy. The reader must ultimately figure out (implicitly) how to use pre-existing knowledge of the world, knowledge of how language works, and graphophonic information in an appropriate mix to keep the predictions coming and then use those same systems to confirm or reject the predictions. It is the demand for excellence at each paragraph that contributes to the brain's eventually figuring out how the complex, integrative, interactive, largely implicit process of reading is accomplished. As the "puzzle" is solved, the brain remodels its guidance system to reflect the new discoveries thereby eliminating its reading problem.

Consistently holding the brain accountable to produce 100% excellent reading will eliminate the reading problem. You must enforce an uncompromising standard for excellence on every read.

JUDGING EXCELLENCE
STUDENT PERSPECTIVE

When a student with a reading problem reads a paragraph at his placement range, he literally feels uncomfortable. Conversely, when he cycles the same paragraph enough times to produce excellent reading, he literally feels comfortable as he reads.

When a student begins learning how to judge excellence, he is told to decide if the reading felt comfortable and natural. Whenever he feels a 'twinge' of discomfort or notices a symptom, he knows at that point the reading is not excellent. When the reading is excellent, he will have a sense of knowing it is because it feels comfortable and natural.

With enough training and tutoring experience, students will develop the ability to know when a reading is excellent, and their judgements will be consistently accurate.

TUTOR PERSPECTIVE

When a student with a reading problem reads a paragraph at his placement range out loud, it literally makes you feel uncomfortable. Conversely, when he cycles the same paragraph enough times to produce excellent reading, you literally feel comfortable, and you notice the reading sounds natural (similar to talking).

When you begin learning how to judge excellence, you will be told to decide if the reading felt comfortable and sounded natural. Whenever you feel a 'twinge' of discomfort or notice a symptom you will know at that point the reading is not excellent. When the reading is excellent you will have a sense of knowing it is because it sounds natural and "feels" right.

With enough training and tutoring experience, you will develop a sense of knowing when a reading is excellent, and your judgements will be consistently accurate.

THE JUDGING EXCELLENCE PARADOX

Your conscious mind will want to make the judging process as explicit as possible, but you must realize that judging excellence requires you to develop a "feel" for judging. To become an excellent judge, you have to rely on your brain's ability to learn many of the aspects of the judging process implicitly. In the same way students cannot consciously know all the aspects that are required to produce excellent reading, you cannot consciously know all the aspects that are required to judge excellence correctly. Over-analyzing symptoms'causes you to "zone into" the explicit aspects of judging excellence and neglect the implicit aspects reflected in your intuitive response.

THE HOLISTIC STRATEGY FOR JUDGING EXCELLENCE

Figure 20A:
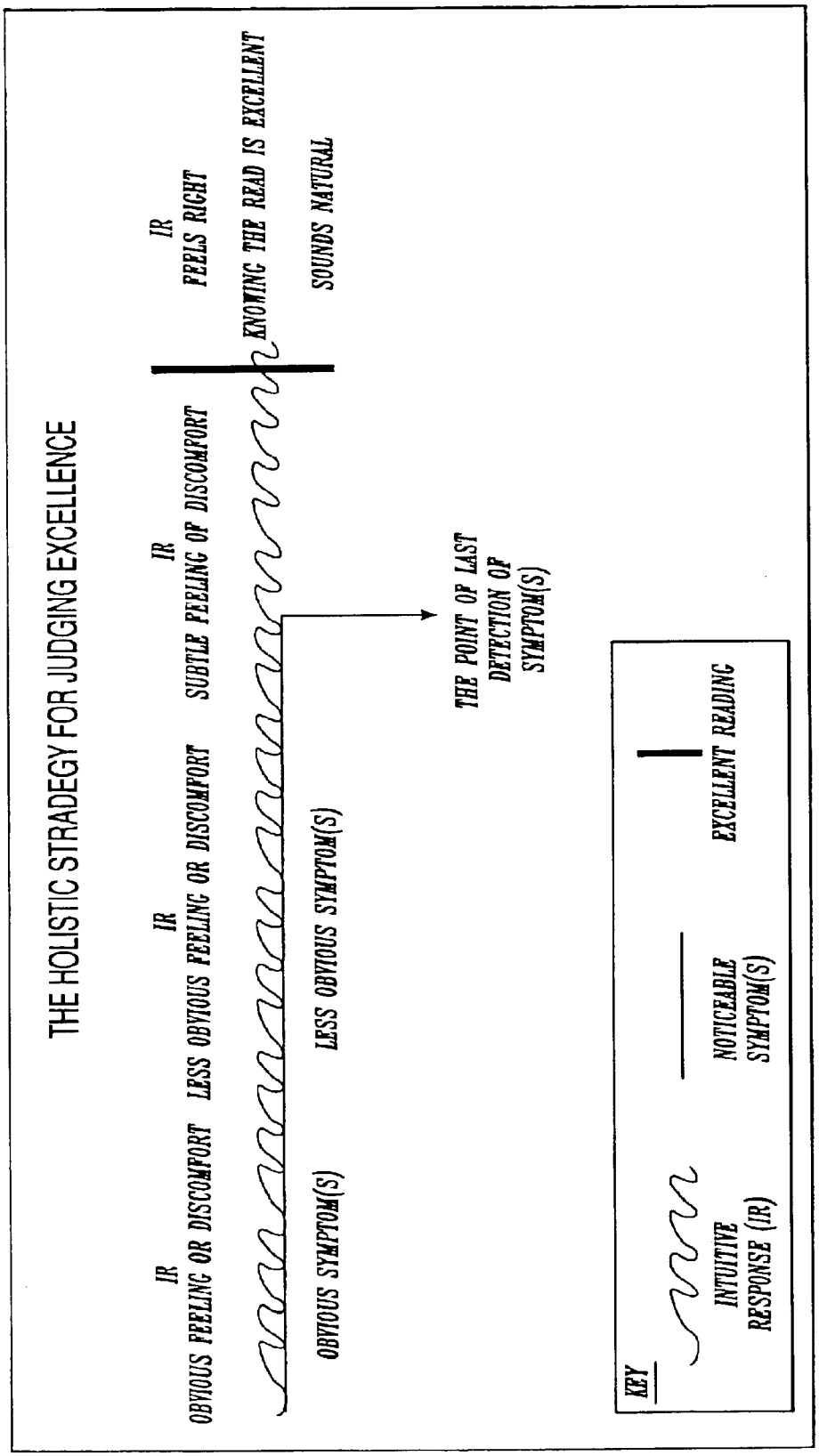
FIG. 20A is a graphic illustration of the holistic strategy for judging excellence.

The holistic strategy combines the explicit aspects of judging—listening to decide if the reading sounds natural (similar to talking)—and the implicit aspects of judging, using your intuitive response to help you decide whether or not the reading was natural. With experience, your intuitive response will also help you develop a "feel" for judging excellence. The diagram in FIG. 20A illustrates the holistic strategy.

MINIMIZING INACCURATE JUDGEMENTS

Reading is a complex, integrative, interactive, largely implicit process. Because you cannot see the implicit functioning of the neural network that guides reading to know if it is operating correctly, there is potential for an inaccurate judgment on any one read. Your challenge as a tutor is to minimize your percentage of inaccurate judgements. You will increase accuracy by setting an expectation to know when a reading is excellent, and by judging thousands of readings over periods of months. You must strive to internalize the holistic strategy and not limit yourself by hunting for symptoms in isolation.

INCREASING ACCURACY BY COMPARING INDEPENDENT JUDGEMENTS

During guiding, the student must feel confident enough to judge excellence independently without being influenced by your judgement. It is imperative to use language that reflects your opinion of the read. We want you to say, "I agree; I disagree" or, when you're uncertain, "I'm not sure. Read it again." You should also explain this concept to the student by reinforcing that his judgement is his opinion, your judgement is your opinion, and both of you must be each other's safety net to insure accuracy.

Judging excellence is a team effort. Students who are treated as equals in the tutoring environment feel acknowledged and respected. They are more likely to have a strong intent to fully participate. When you and the student disagree, it doesn't really matter who is correct in the moment because the system requires both participants to agree on excellence before moving to the next paragraph. Sometimes you will judge excellence incorrectly (and not know it), and other times the student, will judge excellence incorrectly (and not know it). Conceptualizing judgements as opinions will enable you and the student to learn from each other.

When the student's judgement is different from yours or when he is uncertain, he receives a check mark in Area One on the Guiding Check List, and when he accumulates three of them in one section, he receives instruction because we assume he is the one having difficulty in judging. This may seem contradictory to the concept that each of your judgements is an opinion, but it really isn't. The tutor is statistically more likely to make correct judgements simply because she has significantly more training and experience judging. There is a possibility she could be incorrect on any given judgement, so the "safety net" of both participants agreeing on excellence is important. However, if a pattern of inconsistent judgements occurs, then there is a problem, and the least-trained and least-experienced member of the judging team is more likely to be incorrect.

During instruction, your judgement of excellent reading is no longer an opinion. The pattern of inconsistent judgements indicates that the student needs instruction to improve his judging ability. You will be telling the student whether or not the reading was excellent. You will say, "That was excellent; that wasn't excellent" or "I'm not sure. Read it again."

THE IMPORTANCE OF ACCURACY WHEN JUDGING EXCELLENCE

Achieving the highest levels of accuracy in judging excellence can require several months of training and experience. Although students will dramatically improve their reading while you are learning to fully internalize the holistic strategy, they will improve even faster once you have become an excellent judge. The more fully you internalize the holistic strategy, the faster students' reading gains will be. If you judge excellence accurately a high percentage of the time, the student's brain will fine-tune and finesse its own implicit process.

UNCERTAINTY WHEN JUDGING EXCELLENCE

Although the expectation in judging is to know when a reading is excellent, experienced tutors will experience uncertainty when judging excellence. When you are uncertain, one of two scenarios has occurred.

The neural network that implicitly guides the process of reading was operating appropriately during the reading of the paragraph (excellent reading occurred) and you are unable to identify it.

OR

The neural network that implicitly guides the process of reading was not operating appropriately during the reading of the paragraph (excellent reading did not occur), and you are unable to identify it.

You experience uncertainty when: You don't know if what you heard was excellent; or your concentration is temporarily interrupted. An external interruption is, for example, excessive noise in the room. An internal interruption is; for example, your mind wanders. Alternatively, you experience uncertainty when you have under-developed skills for judging excellence.

Realizing the output expectation of knowing when a reading is excellent depends on your unwillingness to accept uncertainty.

Whenever you are uncertain, tell the student to re-read the same paragraph repeatedly without cycling until your uncertainty is resolved. Consistently resolving uncertainty in this way will contribute to developing a sense of knowing when the reading is excellent.

ACCOUNTING FOR INDIVIDUAL DIFFERENCES IN SPEECH

All students exhibit individual cadence and pronunciation differences to some degree. The challenge when learning to judge excellence is to recognize natural reading, which sounds similar to talking. Most people sound natural when they talk. Very rarely, unless there are developmental or physical issues, do people speak unnaturally.

A common example of tutors mistaking a reading issue for a speech characteristic is rushing. Although some people talk a little faster than others, no one talks rushed. If you are sensing the student is rushing, he is not reading excellently no matter how fast he talks. Sometimes you will need to familiarize yourself with the student's speech in order to help you judge excellence. When you choose to do so, stop the session and listen to him talk for a few minutes. Keep in mind that all students will sometimes pause and talk cautiously when they are trying to express their thinking or when they feel "put on the spot." Sometimes they will talk faster than normal in order to "prove to you" that they do talk rushed. You need to listen for brief interludes of natural speech. If they speak one sentence naturally, they can read a whole paragraph naturally.

X. Administering Guiding Remarks and Techniques

Guiding remarks and techniques are brief and precise interventions designed to be administered during the Excellent Reading component, when you want to reinforce the student's performance, clear confusion, strengthen the student's intent to fully participate, or, in the case of LOE, investigate and/or resolve problems with the text. If guiding remarks and techniques are successful, they may prevent a pattern of inconsistencies from occurring. If they are unsuccessful, the Guiding Check List (FIG. 19) will reveal that instruction is needed to solve the problem.

You must strike a balance between assisting the brain and letting it proceed on its own. If guiding remarks and techniques are over-administered, you increase the likelihood of giving the brain unneeded information which can, at worst, cause confusion and, at best, waste time. If they are under-administered, you will miss opportunities to save the brain time.

DIRECTIONS

Do not put additional check marks on the Guiding Check List (FIG. 19) when administering Guiding remarks or Guiding techniques.

When the Guiding and Instructing Responsibilities flow chart (FIG. 17) refers you to administering guiding remarks and techniques, usually administer Guiding Remarks first. Guiding Remarks should not be expanded to last longer than about ten seconds. Guiding Techniques usually take longer to administer.

When you begin tutoring, you can create new Guiding Remarks if necessary. Keep them brief.

If you notice a problem developing as you tutor, you can use the bold headings to find the Guiding Technique you need to resolve the issue before it becomes a problem. Read it silently, and then administer it to your student virtually verbatim, referencing the procedures as needed.

INSTRUCTION AREA ONE: Inconsistent Judgements of Excellence or Student Uncertainty Guiding Remarks Occasionally administer guiding remarks when you disagree with the student's judgement or if he is uncertain.

Usually refer to feelings

"Did the read feel comfortable and natural? That's how you know if it's excellent."

"I was comfortable."

"I didn't think that was excellent because I felt a little uncomfortable."

"Your reading felt uncomfortable to me. Continue cycling, please."

"I didn't think that was excellent. It just didn't feel right."

"I thought it was excellent. It felt right."

Name symptoms only after you have first referenced feelings

"You were rushing. Slow it down next time."

"There's a funny tonal pattern in your reading. Back to the tape."

"You're reading slightly cautiously, speed it up next time."

"I'm hearing a 'reading voice.' It sounds unnatural. Back to the tape, please."

"It didn't seem natural to me."

Guiding Techniques

Occasionally administer guiding techniques—usually after you have first administered guiding remarks.

If the student is trying to sound excellent rather than achieve excellence

Draw the student's attention to the author's message and away from trying to control the process of reading in order to sound excellent.

Say, "You will not achieve excellence if you try to sound excellent when you read out loud. Think about the author's message even when reading out loud. Then after you finish the read, decide if you were 100% comfortable with it. Let me worry about how it sounds." Then return to cycling.

If the student has trouble knowing when a reading is excellent

Have him read the first sentence and label it excellent or not excellent. Repeat in a fast-paced manner until he gets the first sentence excellent. Use the same technique with each successive sentence until you finish the paragraph. Then return to cycling.

If you think the student doesn't understand key vocabulary and/or concepts

Explain the paragraph to him, or ask him to explain it to you. If he summarizes it poorly, explain it to him. Then return to cycling. Alternatively, say, "Tell me what [Do you know what]__means." If he doesn't know, engage in a language acquisition discussion. Specifically, (1) define the vocabulary word or the concept, (2) explain the vocabulary word or the concept outside the author's context, and (3) tie the vocabulary word or concept back into the author's context by explaining its use in the paragraph. You can choose to expand your explanation to include a brief summary of the paragraph, or in some cases a summary of more than the paragraph.

If the student continuously displays one of the following unnatural cadence characteristics or is confused about the concept of excellence: ♦ Unnatural Tone ♦ Rushing ♦ "Blowing Through" Punctuation ♦ Slightly Cautious Reading Interrupt the student's reading to help him achieve excellence on one, two, or three sentences by naming the symptom identified and then modeling it if necessary.

Say, "You're__. Read these sentences again." (Point to the sentences.) If he continues to display the characteristic, interrupt the reading, naming the symptom and telling him to re-read the sentence. If he still displays the characteristic (or is still confused), model how he sounds, and then have him re-read the sentences. Whenever he achieves excellence, say, "That's excellent." If you choose, have him re-read the same sentences when he achieves excellence (labeling the reading again) to reinforce the concept of excellence. Repeat all or parts of this technique until you think you have addressed the issue sufficiently. Then return to cycling.

You can administer guiding remarks described above on non-excellent reads.

A similar technique is to ask the student to re-read the entire paragraph rather than one, two, or three sentences.

If the student is displaying a 'reading voice' by intentionally changing the volume or tone in the same way Interrupt the student's reading and get him to 'talk excellently' by modeling how he sounded and then how 'excellent talking' should sound.

Tell the student you're going to model both his reading voice and excellent reading. Take the book from the student and read the sentence out loud to model. Then have the student attempt to 'talk' the sentence 'excellently.' Say, "Again" each time the student does not say the sentence excellently, and say, "That's excellent." when he talks excellently. If you choose, have him repeat the sentence when he 'talks excellently' (labeling the 'talking' again) to reinforce a connection between excellent talking and excellent reading. Then return to cycling A similar technique is to make up your own words and/or phrases instead of using sentences from the book.

If a red or green student is 'locked into' reading word-for-word, making it difficult to achieve excellence Interrupt the student's reading and get him to 'talk excellently'.

Tell the student you're going to say a sentence from his book out loud and you want him to say it back to you. Then take the book from the student, memorize a sentence, say it to him, and have the student repeat it back. Say, "Again" each time the student does not say the sentence excellently, and say, "That's excellent" when he talks excellently. If you choose, have him repeat the sentence when he 'talks excellently' (labeling the 'talking' again) to reinforce a connection between excellent talking and excellent reading. Then return to cycling.

You can administer guiding remarks described above.

A similar technique is to make up your own words and/or phrases instead of using sentences from the book.

OR

Draw the student away from word identification and into concentrating on what the author is saying. Immerse the student in the author's message by summarizing the story for him, asking him to summarize it, and/or asking him questions about the text. This will cause him to think about the author's message and pull him away from identifying words. Then return to cycling.

INSTRUCTION AREA TWO: The student didn't do enough cycles to achieve excellence

Guiding Remarks

Occasionally administer guiding remarks when you think they may help the student make better judgments about how many cycles to do.

"Continue cycling until you're 100% comfortable with the silent read."

"Remember, you have to achieve excellence silently before you read it out loud."

"Achieving excellence silently does not guarantee that you'll achieve excellence out loud."

"Don't get so upset when you do not achieve excellence. Your brain got the reading lesson it needs."

"Were you 100comfortable?"

"Think about what the author is saying even when reading out loud. With enough cycling, everything else will fall into place."

Guiding Techniques

Occasionally administer guiding techniques—usually after you have first administered guiding remarks.

If the student isn't doing enough cycles

Say, "I want you [We're going] to do__cycles." Then return to cycling.

OR

For blue, lime, purple, yellow, or orange range students, say, "How many cycles did you do?" If you don't think he completed enough cycles, decide how many you think he should do, and then say, "This time I want you to do__cycles."

OR

Say, "How many cycles do you think you need to do?" If the student's response is reasonable, let him go for it. If it isn't reasonable, say, "I don't think that's enough. I want you to do [We're going to do]__cycles."

If the student is extremely close to achieving excellence (95%)

Sometimes tell the student to re-read the paragraph without cycling. If he doesn't achieve excellence on the next read, return to cycling. You may choose to have students re-read the paragraph more than once. Be cautious of over-using this technique. It should be used very sparingly.

If the student is continuously achieving excellence on all the sentences except one Isolate that sentence, cycle it multiple times and then have the student read it out loud.

Repeat until excellence is achieved, and then have the student read the whole paragraph.

Be cautious of over-using this technique. It should be used very sparingly.

If the student believes his silent reading is excellent but is having problems achieving excellence out loud Say, "You probably did achieve excellence silently, but I want you to try something different anyway. Cycle until you achieve excellence again, and then do two more cycles before you read it out loud." Then return to cycling.

OR

Say, "Read the paragraph silently without cycling." After the student finishes, ask him if it was excellent. If he says, "No," tell him to read it silently again. Repeat until he says, "Yes." Then ask him to read the paragraph out loud. If the next attempt at excellence fails, decide how many cycles you think it will take him to achieve excellence and then say, "This time I want you to do [we're going to do]__cycles."

If the student thinks reading silently is different from reading out loud

Say, "It's true there are differences between reading out loud and reading silently. When you read out loud, your brain must produce the language, so it feels different. You also have to read more slowly out loud because of the time it takes to produce the language. Reading out loud can also cause you to be nervous, and that makes it more difficult to read comfortably. But because the brain drives all reading—whether it's silent or out loud—the basic process is the same. That is why I must insist that both the silent reading and the out loud reading has to be excellent. Your brain needs that kind of feedback to improve." Then return to cycling.

If the student seems to be cycling enough but is "hung up" on a paragraph

Say, "I want you to cycle this paragraph once more, and whether or not you get it excellent, we'll move on. You seem to be stuck on it for some reason." Then return to cycling.

Don't use this Guiding Technique more than once in a session with any student.

INSTRUCTION AREA THREE: The student displayed inappropriate behavior or comments Guiding Remarks Consistently administer guiding remarks when the student displays inappropriate behavior or comments. The behavior or comments of the student will largely determine the nature of the guiding remark; therefore, few Area Three Guiding Remarks are listed below.

"Sit up and focus on what you're doing."

"I know cycling can be frustrating. It's okay to get mad sometimes. I want you to hang in there. You will have better days."

"I'm sorry you don't feel like working today, but you're here, so it makes more sense to work anyway, right?"

"You're not on task. It is frustrating to see you wasting time when there are so many other kids in this school with reading problems who want to participate."

"Achieving excellence is what will improve your reading. The only way to achieve excellence is to do multiple cycles. The tape is your friend—not an enemy."

"I can see that you aren't serious about participating in the method. That isn't acceptable."

"Quit talking to your neighbor and get back to work."

Guiding Techniques

Occasionally administer guiding techniques—usually after you have first administered guiding remarks.

If the student is impatient, bored, or frustrated

"I can see that you're__with this class. I know that cycling and striving for excellence is not always fun or entertaining; however, you have to remember where you are. You are at school, and it's your responsibility to be productive and make yourself, in a sense, proceed with good intentions. You need to build a positive work ethic. Most adults have to go to work to provide for their families even though they might not want to on a daily basis. Students'jobs are to go to school, and in Excellent Reading your job is to stay on task and achieve excellence." Then return to cycling.

If the student doesn't like to cycle

Have the student read unassisted from the current placement range until he reads non-excellently for about ten seconds. After you stop the student, tell him, "Cycling is the tool that enables you to read excellently. Attempting excellence and not achieving it and then cycling until you do is the only way you will improve your reading. When you understand this, you will be a much happier student." Then return to cycling.

OR

Say, "If you don't work hard and do what I ask you to, you will keep on being a poor reader. Becoming an excellent reader requires many cycles. Trying to read it excellently and not getting it is part of the process. It doesn't matter if it takes a long time. If you keep working at it, you will get it." Then return to cycling.

If the student is off-task

Say, "You may have been in other reading programs that didn't work very well. I understand why you may feel that this program is no different. But I can promise you it will work if you agree to stay on task. Establishing your own rigid criteria for excellence and demanding that you cycle until you achieve it is the key to success. Some days you will not want to participate in the program, but you must force yourself to do it anyhow. I want you to work hard for eight sessions so you will understand what I'm talking about. Do we have an agreement?" Then return to cycling.

If the student consistently judges his reading excellent when it is not and you think he knows better Say, "Your most important responsibility is to judge excellence correctly. I think you've been saying some of your reads were excellent when you knew they were not. This type of behavior is unacceptable." Then return to cycling.

If the inappropriate behavior continues, take the locus of control away from the student by telling him whether or not a reading is excellent instead of asking, "Was it excellent?" Continue assuming the locus of control until you think he will judge excellence correctly.

If the student refuses to start the program

If the student won't cooperate sufficiently to get him started in the program, have him watch a group of readers that are the same age and range as he is. After he observes for awhile ask him if he wants to participate. If he does, start him immediately. If he does not, return to cycling.

LACK OF EFFICIENCY IN ACHIEVING EXCELLENCE (LOE): The student did not achieve excellence in the last ten minutes Administer guiding techniques as described below if you believe a student will not achieve excellence within ten minutes. They are designed to be administered only after you demonstrate a holistic understanding of the tutoring process. There are no Guiding Remarks for this section.

Guiding Techniques

If the paragraph is unusually long compared to other paragraphs in the book

Divide it in half. Divide the paragraph in half only if it is obvious that the particular paragraph is unusually long. Dividing a normal-length paragraph is counter productive. The author's message is fractured, which interferes with the predictive strategy. The student can over rely on memory rather than develop his predictive strategy. Return to cycling.

If the student needs an easier book due to language or conceptual issues Move the student to a different book in the same range, or move him down one range.

If the student's current placement range is too high due to text complexity

Proceed to the Solutions section in Chapter XV, the Lack of Efficiency in Achieving Excellence section. Use the solution described therein for your student based on his range.

If you think the student's current placement range is too high due to text complexity, but you aren't certain Proceed to Question 5 in the Lack of Efficiency in Achieving Excellence section below in Chapter XV.

If you think the student is not attempting excellence out loud even though he is ready to do so Interrupt the student's cycling and say, "Excuse the interruption. I want you to read the paragraph out loud, please."

If the student achieves excellence, encourage him to attempt excellence before ten minutes elapse. Return to cycling.

If you have two or more red or green students in the group and one is consistently slower in achieving excellence Implement the Alternative Cycling Technique (ACT). Conduct the first half of the cycling process normally for all students. Instruct all students to read silently along with you as you read the entire paragraph out loud. Conduct the second half of the cycling process normally for the successful student but differently for the unsuccessful student. Instruct the successful student to read the entire page silently. Instruct the unsuccessful student to read silently only a portion of the paragraph. Instruct all students to signal you normally when they are ready to read out loud. The successful student reads the whole paragraph out loud, and the unsuccessful student reads only a portion of the paragraph. When the unsuccessful student achieves excellence on a portion of the paragraph he moves to the next portion of the paragraph and continues the ACT as described above. When the successful student achieves excellence on the entire paragraph he becomes a student reader, which will be described in Chapter XVII below.

Continue the ACT until the unsuccessful student has achieved excellence on each portion of the paragraph and the successful student has achieved excellence on the entire paragraph.

In the unusual circumstance when the unsuccessful student has achieved excellence on every portion of the paragraph and the successful student has not yet achieved excellence on the entire paragraph, the unsuccessful student should cycle the entire paragraph. If he achieves excellence first, he becomes the student reader. If the successful student achieves excellence first, both students move to the next paragraph and continue the ACT.

INSURING THE PROCESS IS DONE CORRECTLY: The student deviated from the methodology (block 112 in FIG. 17)

Consistently administer a guiding remark when the student deviates from the methodology. There are no Guiding Techniques for this section.

Guiding Remarks

"You forgot to read it silently."

"You need to be an appropriate distance from the text. Then you won't have to move your head back and forth as you are reading."

"Don't use your finger [thumb]."

"Read with your mind, not your mouth."

"Are you reading silently with the tape?"

"After you knock, read the same paragraph silently until I'm ready to judge your read."

"When I leave you to judge another student's read, you need to re-read paragraphs you've already worked on until I return."

"Read silently with the tape. I don't want to see you looking around the room while you should be cycling."

"Keep your eyes on the sentences when you are reading, or your brain isn't getting a reading lesson."

ACKNOWLEDGING WHEN THE STUDENT DOES WELL: The student performed his role correctly (block 114 in FIG. 17)

Occasionally administer guiding remarks when you notice the student is performing his role correctly, especially when the reading was not excellent. This is so because judging excellence correctly provides the brain with the information it needs to implicitly experiment with the reading process. Achieving excellence verifies explicitly that the implicit experiment was successful, and not achieving excellence reveals that the brain needs to keep experimenting. Both are essential and equally important in eliminating the reading problem. There are no Guiding Techniques for this section.

Guiding Remarks

"I'm so happy you knew it wasn't excellent. You're doing the process just right."

"I agree that it wasn't excellent. Good job."

"I also knew that was excellent because it felt right. I'm very proud of you."

"You're judging cycles very nicely."

"I like how you're staying on task and working hard. That's why you're making such good progress."

"Your reading has improved so dramatically! Awesome, Dude!"

"See what a smart kid you are. Look at how well you're reading!"

"Thank you for being so respectful to me. I respect you very much also."

"What a bright kid you are! You've moved up_ranges in two months!"

XI. Addressing Miscellaneous Issues—in a Nonexcellent Reading (Block 110 in FIG. 17)

The interventions for Miscellaneous Issues are designed to be administered step-by-step. When the Guiding and Instructing Responsibilities flow chart (FIG. 17) refers you to this section, proceed to the appropriate intervention and administer it virtually verbatim.

A. Overview

TEXT-RELATED ISSUES THAT CAUSE A NONEXCELLENT READ

When an excellent reader encounters unknown vocabulary words and concepts or poorly written text, he experiences a sense of discomfort even though his brain is doing the implicit process of reading correctly. If he reads out loud, the reading may not be smooth and fluent, and he may have to self-correct or re-read if the disturbance is sufficiently distracting.

The same thing can happen to a student with a reading problem, and when it does, the resulting disturbance can potentially cause a problem for you when judging excellence because you may mistake the disturbance for a symptom. You must be alert to the possibility that the student's failure to achieve excellence could be resulting from confusion with the text rather than from the reading problem. In these cases, continued cycling will have limited beneficial effect until the student's confusion is addressed. Familiarize yourself with the issues listed below and be alert to the possibility that these issues, although they occur infrequently, can cause disturbances that prevent the reader from achieving excellence.

1. Unknown vocabulary words and concepts

2. Unknown language conventions: How words are pronounced; how punctuation is read; or how numbers are read 3. Poorly written text: The author's message is unclear; or the author's sentence structure or vocabulary sounds funny.

DISTURBANCES THAT EXCELLENT READERS SOMETIMES DISPLAY

Excellent Readers occasionally exhibit the disturbances listed below, but they would not do so in the supportive environment of the Excellent Reading component.

1. Self-Corrections
2. Re-Starts

When students display these same disruptions even though they are operating in a supportive environment, there is a strong potential that they are symptoms of the reading problem. That is why they are not allowed.

DEVIATIONS FROM THE TEXT

Deviations from the text that work are always permitted but are limited in the red and green ranges. Deviations that don't work are never permitted in any range.

UNUSUAL SPEECH CHARACTERISTICS

All students exhibit individual cadence and pronunciation differences to some degree. The challenge when learning to judge excellence is to recognize natural reading. In those rare instances when a student's speech characteristics are perceived as "abnormal," familiarizing yourself with the characteristics will enable you to differentiate them from symptoms.

B. Addressing the Issues

ADDRESSING TEXT-RELATED ISSUES

Limited time is spent addressing text-related issues because they are unrelated to the reading problem. The student will eliminate his problem faster if he is working on paragraphs where text-related issues are not present.

1. UNKNOWN VOCABULARY AND CONCEPTS

If the student is confused about the meaning of a paragraph because of unknown vocabulary and concepts, he is unlikely to achieve excellence. It is important to remove this potential source of difficulty so you can be certain that any "non-excellent" reading in the Excellent Reading component is a result of the faulty operation of the implicit reading process and not a result of confusion over meaning.

When addressing problems pronouncing a word with one student, implement the Productivity Guidelines, described below in Chapter XVII, with the other students, if any, in the group.

You may suspect that the student isn't "getting" the meaning from his body language, facial expression, or strange inflections as he is reading. If this occurs, ask the student if he knows the meaning of each vocabulary word or concept you think he may not know.

If he knows

Have the student cycle the same paragraph.

If he doesn't know

A. Conduct a Language Acquisition Discussion (LAD):
1. Define the vocabulary word or the concept.
2. Explain the vocabulary word or the concept outside the author's context.
3. Tie the vocabulary word or concept back into the author's context by explaining its use in the paragraph. You can choose to expand your explanation to include a brief summary of the paragraph, or in some cases a summary of more than the paragraph.

B. Have the student cycle the same paragraph.

NOTE:

If you are spending too much time on Language Acquisition Discussions, move the student to a new book in the same range. If the pattern continues, move him to the next lower range. If the student is moved down a range due to vocabulary and/or conceptual difficulties, do not move him back up. The new range will be his graduation range. His reading problem will be eliminated faster if his brain is not confronted with issues unrelated to the reading problem such as unknown vocabulary and concepts.

2. UNKNOWN LANGUAGE CONVENTIONS PROBLEMS PRONOUNCING A WORD

If you are reading silently and come across a word you cannot pronounce, you most likely "slide" over it. But if you are reading out loud and you come to a word you cannot pronounce, you become very uncomfortable because you are expected to do something you cannot. This is quite disruptive to reading and can be a source of anxiety for the student. Therefore, if you can spend a little time helping students pronounce words they are having trouble with, you decrease their anxiety.

Limited time is spent addressing pronunciation issues because it is unrelated to the reading problem. If the student doesn't learn how to pronounce the word in a reasonable time, it is better to move him to the next paragraph even though he hasn't learned how to pronounce it. The student will eliminate his reading problem faster if he is working on paragraphs that do not contain pronunciation issues.

When addressing problems pronouncing a word, implement the Productivity Guidelines described in Chapter XVII below with the other students in the group.

If your student asks you how to pronounce a word or if he encounters unusual proper nouns or a known vocabulary word that he is unable to pronounce, help him learn to pronounce it by using the following process.

A. Pronounce the word and then briefly discusses the meaning of the word, or if it's a proper noun, ask the student if he has ever heard of the person or place. If not, and if you have, tell him briefly about the person or place. If you don't know how to pronounce the proper noun, say so, and agree on an easier pronunciation. An example of an easier pronunciation for a proper noun is Pete or even P instead of Piaget.

B. Pronounce the word again.

C. Say to the student, "Say it."

If he pronounces the word correctly

Say, "Again" until he has pronounced the word correctly three times consecutively.

On the student's third consecutive successful attempt, proceed to step "D".

If he mispronounces the word

Repeat steps B and C until he has mispronounced the word three times consecutively.

On the student's third consecutive unsuccessful attempt, proceed to step "D".

D. Say to the student "[We're going to] Do__more cycles on this paragraph. Whether or not you pronounce the word correctly or fail to achieve excellence for some other reason, you'll move to the next paragraph."

After the student attempts excellence, judge excellence, move him to the next paragraph, and begin cycling.

PROBLEMS READING PUNCTUATION MARKS

Students who have avoided reading because of reading problems have not had an opportunity to become familiar with the convention of punctuation marks in written language. They don't understand that punctuation marks help convey the meaning, so they fail to "read" them. The result will often be a failure on the part of the student to fully understand the meaning, which is often made obvious by erroneous tonal patterns in the oral reading, indicating the reader didn't correctly interpret hierarchical relationships between and among clauses and phrases. Reading excellently depends on successful communication between the reader and the author. You will not return to cycling until the student reads the punctuation correctly.

You will know the student is reading the punctuation mark incorrectly if his tone is off or if he neglects to pause appropriately. In the example below, drop your tone to "read" the dashes successfully.

When addressing problems reading punctuation marks, implement the Productivity Guidelines, described below in Chapter XVI, with the other students in the group.

A. Correct the student by modeling.

Say to the student, "I'm going to model how you misread the punctuation mark. 'Judging by your appearance which is very nice I would say you're going to church.'"

Then say, "Now I'm going to model how it should sound. 'Judging by your appearance—which is very nice—I would say you're going to church.'"

B. Say, "Read the sentence again."

If the student misreads the punctuation mark

Repeat steps A and B until he reads it correctly, and then proceed to step C.

If the student reads the punctuation mark correctly

Proceed to step C.

C. Return to cycling.

PROBLEMS READING NUMBERS

A reader sometimes has trouble knowing how numbers should be said. We wouldn't expect this to be the case in most instances, but if the numbers are outside the reader's range of familiarity it can happen. This will cause disruptions in the reading and will prevent the reader from achieving excellence. It is important to teach the student how to say the number correctly, thereby eliminating this disturbance that is unrelated to the implicit process of reading. You will not return to cycling until the student reads the number correctly.

The student may not know how to properly read large numbers, decimals, fractions, or, in the example below, Major League baseball batting averages.

When addressing problems reading numbers, implement the Productivity Guidelines, described below in Chapter XVII, with the other students in the group.

A. Correct the student by modeling.

Say to the student, "I'm going to model how you misread the numbers. 'Mitch Meluskey hit fifty-five six this spring for the Houston Astros.'"

Then say, "Now I'm going to model how it should sound. Mitch Meluskey hit five fifty-six this spring for the Houston Astros."

B. Say, "Now I want you to read the sentence again."

If the student misreads the number

Repeat steps A and B until he reads it correctly, and then proceed to step C.

If the student reads the number correctly

Proceed to step C.

C. Return to Cycling.

3. ADDRESSING POORLY WRITTEN TEXT

If the text is unclear or sounds funny, the reader may experience difficulty in achieving excellence. It is important to remove this potential source of difficulty so we can be certain that any "non-excellent" reading in the Excellent Reading component is a result of the faulty operation of the implicit reading process and not a result of confusion over meaning caused by awkwardness or lack of clarity in the text.

Limited time is spent addressing poorly written text because it is unrelated to the reading problem. After briefly addressing the problem the student should move to the next paragraph even if he doesn't achieve excellence. The student will eliminate his reading problem faster if he is working on paragraphs that do not contain poorly written text.

You may suspect that a failure to achieve excellence is caused by problems in the text if the rest of the paragraph is excellent, but there is a persistent external symptom in the same place.

When addressing poorly written text, implement the Productivity Guidelines described in Chapter XVII below, with the other students in the group.

A. Silently read the text that you think is poorly written.

B. Ask yourself, "Is there a lack of clarity or awkward language here?"

If the answer is no

Proceed with cycling.

If the answer is yes

Help the student with the problems in the text as described below. Published authors usually communicate clearly and precisely. There is a tendency to make excuses for the student when he is not easily achieving excellence. Be cautious of a decision that the text is responsible rather than the student's reading problem.

C. If the author's message is unclear, say, "The author is unclear in this sentence." And then read the portion of the text that is unclear to the student. (You can choose to clarify the sentence.)

Then say, "Unfortunately, you'll have to read the paragraph the way he wrote it. [We're going to] do__more cycles on this paragraph. Whether or not you achieve excellence, you'll move to the next paragraph."

After the student attempts excellence, judge excellence, move him to the next paragraph, and begin cycling.

D. If the author's sentence structure or vocabulary is awkward, say, "This sentence sounds funny." And then read the portion of the text that sounds funny to the student. (You can choose to clarify the sentence.)

Then say, "Unfortunately, you'll have to read the sentence the way the author wrote it. Do [We're going to do]__more cycles on this paragraph. Whether or not you achieve excellence, you'll move to the next paragraph."

After the student attempts excellence, judge excellence, move him to the next paragraph, and begin cycling.

ADDRESSING DISTURBANCES THAT EXCELLENT READERS DISPLAY

SELF-CORRECTIONS

Although excellent readers sometimes make self-corrections, the supportive environment provided in the Excellent Reading component should prevent the occurrence of self-corrections. The combination of the enhanced predictability of the text coupled with the fact that reading out loud creates enough time to confirm virtually all predictions makes self-corrections highly unlikely. Therefore, a self-correction means the reading was not excellent.

If you haven't already done so, place a check mark on the appropriate place on the Guiding Check List of FIG. 19 (Area Two if you both agreed the reading was not excellent or Area One if you disagreed).

Tell the student the reading is not excellent because he self-corrected, and instruct him to continue cycling the same paragraph.

RE-STARTS

Although excellent readers sometimes make re-starts, the supportive environment provided in the Excellent Reading component should prevent their occurrence. Therefore a re-start means the reading was not excellent.

If you haven't already done so, place a check mark on the appropriate place on the Guiding Check List (FIG. 19) (Area Two if you both agreed the reading was not excellent or Area One if you disagreed).

Tell the student the reading is not excellent because he re-started, and instruct him to continue cycling the same paragraph. If the student asks to re-start a paragraph without cycling, you can occasionally allow him to do so, but he should not re-start the same paragraph more than once. If he asks to re-start the paragraph and you agree to let him do it, do not initially place a check mark on the Guiding Check List. Place the check mark after the re-read.

ADDRESSING DEVIATIONS FROM THE TEXT

The purpose of Excellent Reading is to get the brain to implicitly make appropriate predictions and to confirm or reject them when necessary. Confirmation strategies, which are also implicit, are not employed if the brain is certain of its prediction. This accounts for text deviations. They are positive things that lead to increased speed of reading—as long as they work. If they don't work, they reveal a poor predictive strategy, which signifies a reading problem.

DEVIATIONS THAT DON'T WORK REQUIRE A JUDGEMENT OF 'NOT EXCELLENT' IN ALL RANGES

The challenge when you notice deviations from the text in Excellent Reading is to determine whether a particular deviation is acceptable. If the deviation doesn't work, the paragraph cannot be judged excellent in any range.

DEVIATIONS THAT DON'T MAKE SENSE

If the student produces language that doesn't make sense, the reading is not excellent.

If you haven't already done so, place a check mark on the appropriate place on the Guiding Check List (FIG. 19) (Area Two if you both agreed the reading was not excellent or Area One if you disagreed).

Tell the student the reading is not excellent because it didn't make sense.

Return to cycling.

If the student continues to make deviations that don't make sense, model what he read, then model excellent reading. Draw his attention to the difference between what the text says and what he read and have him cycle the same paragraph.

DEVIATIONS THAT ARE LINGUISTICALLY INCORRECT AND DO NOT REFLECT THE WAY THE STUDENT WOULD SAY IT IF HE WERE TALKING

There is a potential for confusion in identifying syntactic errors when you perceive a student's speech characteristics to be reflective of 'poor grammar' (linguistically incorrect). You may interpret the unusual speech patterns as external symptoms of the reading problem, causing you to judge the reading not excellent when you shouldn't. Familiarizing yourself with the student's speech characteristics will enable you to differentiate them from symptoms.

If the student produces language that is linguistically incorrect and does not reflect the way the student would say it if he were talking, the reading is not excellent.

If you haven't already done so, place a check mark on the appropriate place on the Guiding Check List (FIG. 19) (Area Two if you both agreed the reading was not excellent or Area One if you disagreed).

Tell the student the reading is not excellent because it sounded funny.

Return to cycling.

If the student continues to make deviations that are linguistically incorrect and do not reflect the way the student would say it if he were talking, model what he read, then model excellent reading. Draw his attention to the difference between what the text says and what he read and have him cycle the same paragraph.

DEVIATIONS THAT SIGNIFICANTLY CHANGE THE AUTHOR'S MESSAGE

The intervention is designed to prevent the student from making predictions that stray too far from the meaning in the paragraph. It is sending his brain a message that it needs to integrate a confirmation strategy into the reading process.

If the student produces language that significantly changes the author's message, the reading is not excellent.

If you haven't already done so, place a check mark on the appropriate place on the Guiding Check List (FIG. 19) (Area Two if you both agreed the reading was not excellent or Area One if you disagreed).

Tell the student the reading is not excellent because he changed the author's message.

Return to cycling.

If the student continues to make deviations that significantly change the author's message, model what he read, then model excellent reading. Draw his attention to the difference between what the text says and what he read and have him cycle the same paragraph.

Guidelines for judging whether a deviation significantly changed the author's message in the paragraph Typically a deviation seems unacceptable if you look at only the sentence, but if you consider the message in the paragraph, the deviation works. An example of this can be found in the green range assessment story, "The Singer." The last sentence says, "When he started again, she quietly left the room." Students frequently substitute quickly for quietly. That deviation changes the meaning of the sentence quite dramatically, but it has an insignificant effect on the meaning of the paragraph. The deviation, therefore, is acceptable.

Although it happens infrequently, the deviation sometimes significantly changes the meaning at the sentence level. If the text says, "She is a good person." And the student reads, "She is a bad person." It really doesn't matter what the paragraph says. We know that the change is significant.

DEVIATIONS THAT WORK SOMETIMES INFLUENCE JUDGING EXCELLENCE DEPENDING ON THE RANGE

Deviations that work are those that result in a sentence that makes sense, is linguistically correct (doesn't sound funny) or reflects the way the student would say it if he were talking, and does not significantly change the author's message.

To read excellently, the reader must predict the author's message, and he must confirm or reject the prediction when there is sufficient uncertainty by integrating additional information, usually from the phonics system. If he is certain he has predicted correctly, he does not confirm the prediction. This accounts for text deviations. The reader may not always use the same language the author did to express the predicted meaning.

Allowing deviations that work helps the student learn to trust his predictions without feeling a necessity to confirm each and every one. Readers who feel a need to confirm every prediction will read slowly because it takes time to integrate the phonics information needed to confirm or reject the prediction.

The unsophisticated nature of their predictive and confirming strategies can lead students in the red and green ranges to over-rely on memorization techniques. It is important to insist that they integrate phonics information into their strategies—not to figure out what words are, but to assist in predicting and confirming. Allowing limited deviations that work is the tool we use to force them to integrate phonics into their strategies.

Students in blue through orange ranges are working on paragraphs that are complex enough to prevent memorization from being a viable strategy. The danger for them is that they will over-confirm predictions because they think they are supposed to use the same language the author does. Allowing all deviations that work encourages them to confirm only when they need to and to deviate from the author's language while preserving the author's message.

JUDGING EXCELLENCE WHEN THE STUDENT DISPLAYS A TEXT DEVIATION THAT WORKS

For students in the blue, lime, purple, yellow, or orange ranges, accept all deviations that work.

For students in the red or green ranges, accept one deviation that works per paragraph. The second is excessive. When a deviation requires additional changes in the text to make the original deviation work, it is counted as one deviation. For example, the Text says, "The mallard ducks have beautiful feathers on their heads." and the Student reads, "The mallard duck has beautiful feathers on its head."

If a red or green student produces excessive text deviations that work, the reading is not excellent. If you haven't already done so, place a check mark on the appropriate place on the Guiding Check List (FIG. 19) (Area Two if you both agreed the reading was not excellent or Area One if you disagreed). Tell the student the reading is not excellent because he changed the text. Return to cycling.

If the student continues to make excessive deviations that work, model what he read, then model excellent reading. Draw his attention to the difference between what the text says and what he read and have him cycle the same paragraph.

ADDRESSING UNUSUAL SPEECH CHARACTERISTICS

All students exhibit individual cadence and pronunciation differences to some degree. The challenge when learning to judge excellence is to recognize natural reading, which sounds similar to talking. Most people sound natural when they talk. Very rarely, unless there are developmental or physical issues, do people speak unnaturally.

A common example of tutors mistaking a reading issue for a speech characteristic is rushing. Although some people talk a little faster than others, no one talks rushed. If you are sensing the student is rushing, he is not reading excellently no matter how fast he talks. Sometimes you will need to familiarize yourself with the student's speech in order to help you judge excellence. When you choose to do so, stop the session and listen to him talk for a few minutes. Keep in mind that all students will sometimes pause and talk cautiously when they are trying to express their thinking or when they feel "put on the spot." Sometimes they will talk faster than normal in order to "prove to you" that they do talk rushed. You need to listen for brief interludes of natural speech. If they speak one sentence naturally, they can read a whole paragraph naturally.

When addressing unusual speech characteristics, implement the Productivity Guidelines described in Chapter XVII below with the other students in the group.

A. Engage the student in a conversation.

Say, "Did you watch a half hour TV show last night? Start from the beginning and tell me about the entire show."

OR

"Think back to when you got out of bed this morning, and tell me about your day."

OR

Think of a question to ask the student that causes him to reflect on a recent experience. Do not ask short-answer questions.

B. Have the student continue talking until you feel familiar with the student's speech characteristics (normally within three minutes.)

C. Have the student cycle the same paragraph.

Ethnic and cultural backgrounds or geographic locations can result in structural, cadence or pronunciation differences in language that fall outside the tutor's experience. These differences are typically categorized as accents or dialects, and it may be useful for you to become familiar with these aspects of your student's language to facilitate judging excellence.

XII. Instruction Area One: Inconsistent Judgements of Excellence or Student Uncertainty The Instruction Sets are designed to be administered step-by-step. You will always use the Instruction Check List, Area One, a sample of which is shown in FIG. 21, whenever any student needs instruction in Area One.

Do not use the Guiding Check List (FIG. 19) with the student you are instructing. Use the Instruction Check List for Area One (FIG. 21).

PURPOSE OF THE INSTRUCTION SETS

When the student displays a pattern of inconsistent judgements, it is helpful to verbalize a quick synopsis of the student's responsibilities in judging excellence and clear confusion around fundamental aspects of the methodology. Instruction Set One: Verbal accomplishes this task.

When the verbal explanation does not suffice to clear the confusion, experiencing non-excellent reading and then excellent reading several times in a short period of time will clear the confusion. Instruction Set Two is designed to provide these experiences. The sequence of the strategies is calculated to allow the student to develop a sense of knowing when the reading is excellent.

SEQUENCE OF THE INSTRUCTION SETS

After you have completed Instruction Set One Verbal, every time you need to instruct in this area again, start with Instruction Set Two: Sequences. Whenever you need to conduct a language acquisition discussion (LAD), stop instruction and do so. When the LAD is finished, return to instruction.

INSTRUCTION SET ONE: Verbal

1. Acknowledge the problem to the student.

Choose one of the three remarks to say to the student based on the nature of his confusion:

"You are judging excellence incorrectly. You sometimes think the reading is excellent when it isn't."

"You are judging excellence incorrectly. You sometimes think the reading is not excellent when it is."

"You sometimes don't know if the reading is excellent."

2. Tell the student how you're going to solve the problem

Say, "I'm going to help you understand excellence."

3. Explain why it's important to do the methodology

A. Estimate how close to excellence the student's last reading was.

Say, "Your last reading was only__% excellent. It must be 100% excellent in order to improve your reading." and proceed to step B.

OR

Say, "Your last reading was 100% excellent, and you didn't know it was. You have to know when you're achieving excellence or your brain won't know it's doing it right.

B. Illustrate the 100% concept.

Figure 20B:
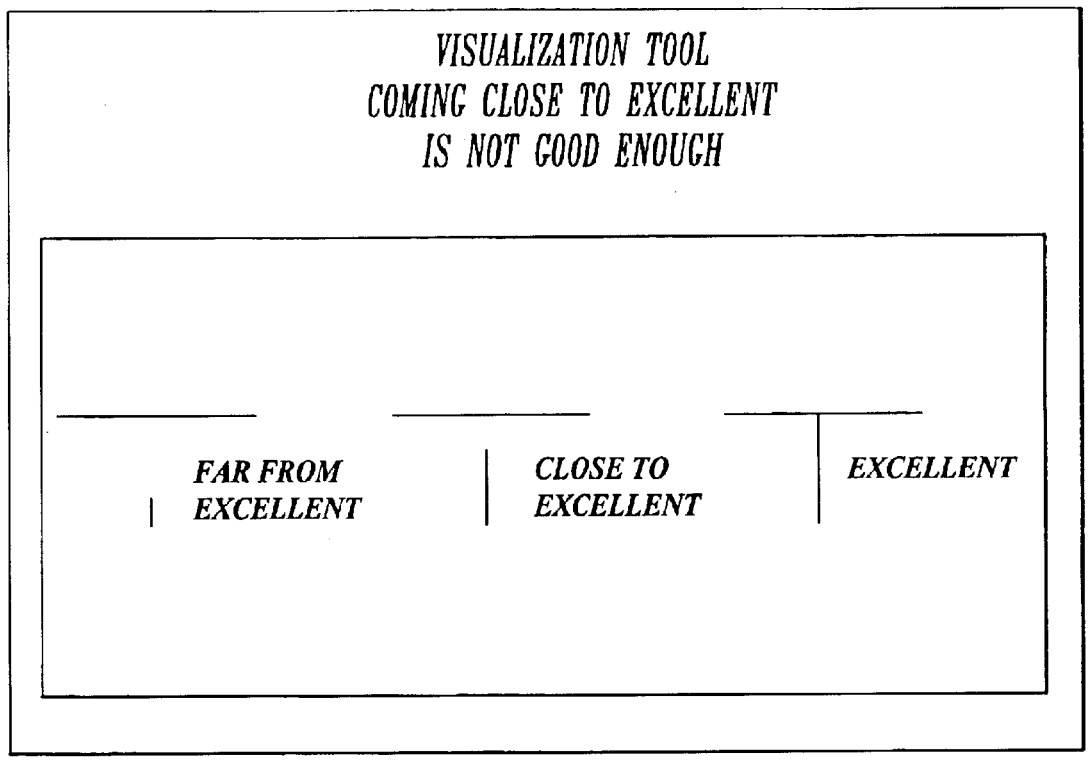
FIG. 20B is a visualization tool suitable for use in illustrating to a student the concepts of achieving excellence and that coming close to excellence is not good enough.
Figure 25:
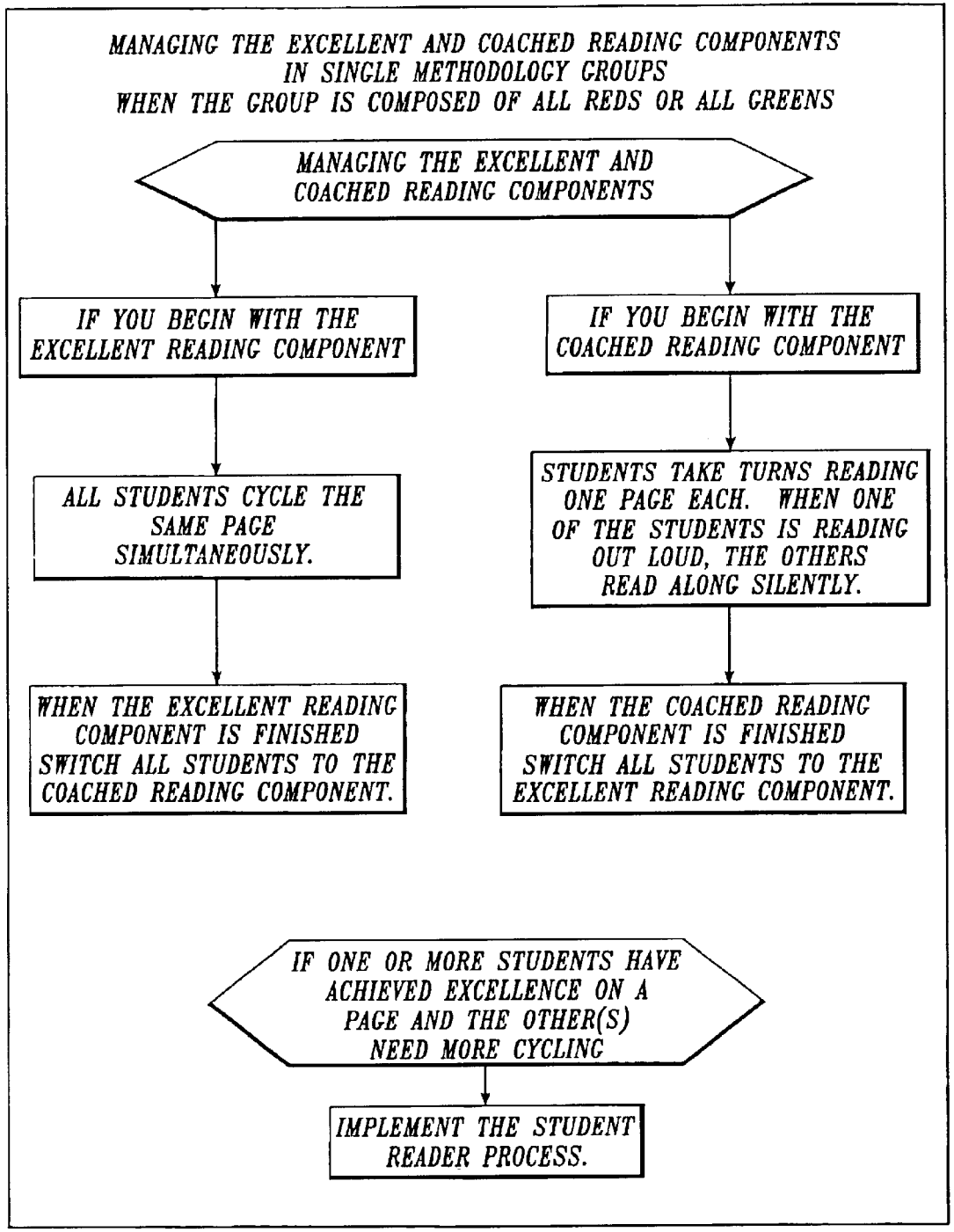
FIGS. 25–29B are flowcharts illustrating the steps of managing both Excellent Reading and Coached Reading components involving a plurality of students.
Figure 26:
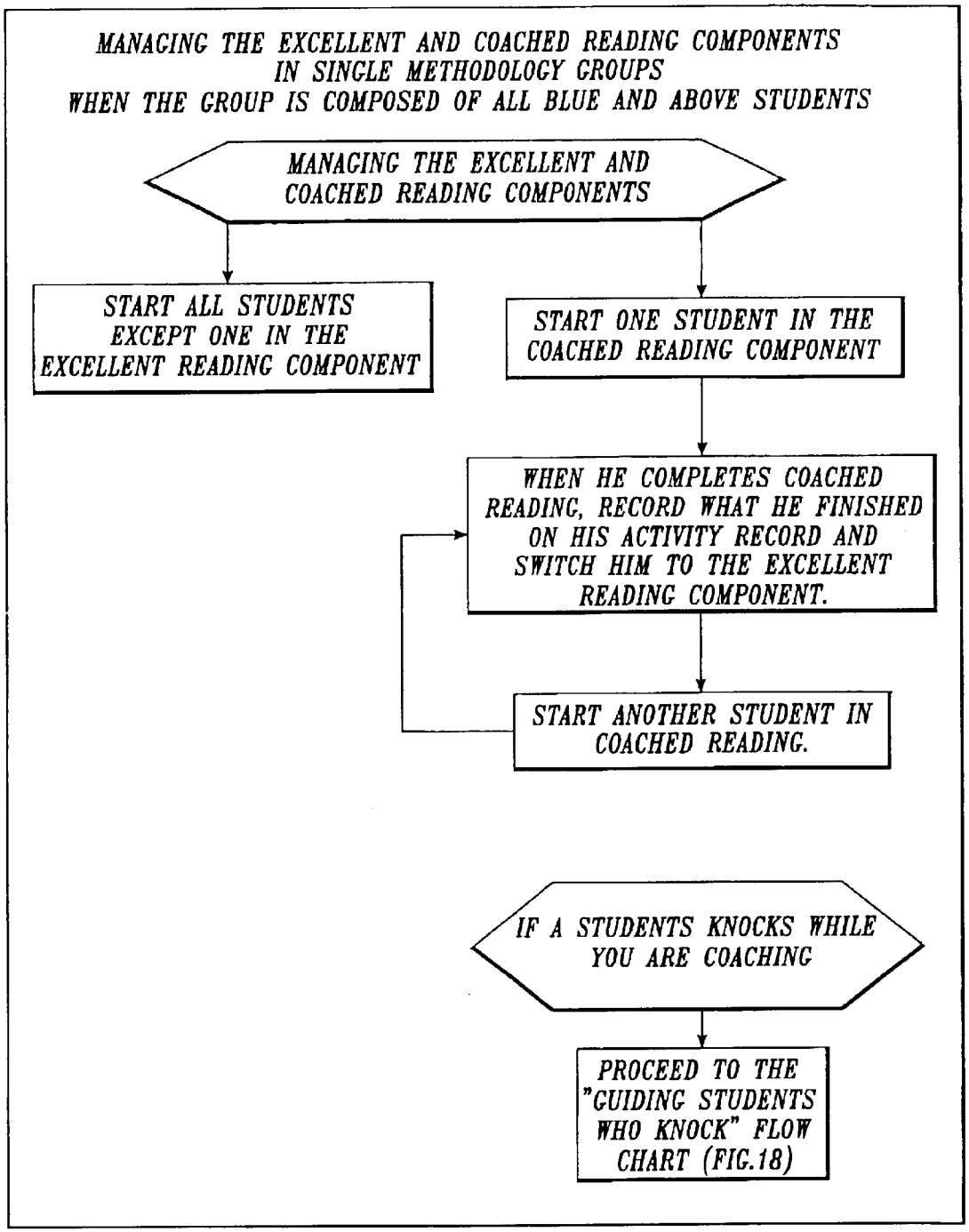
Figure 27:
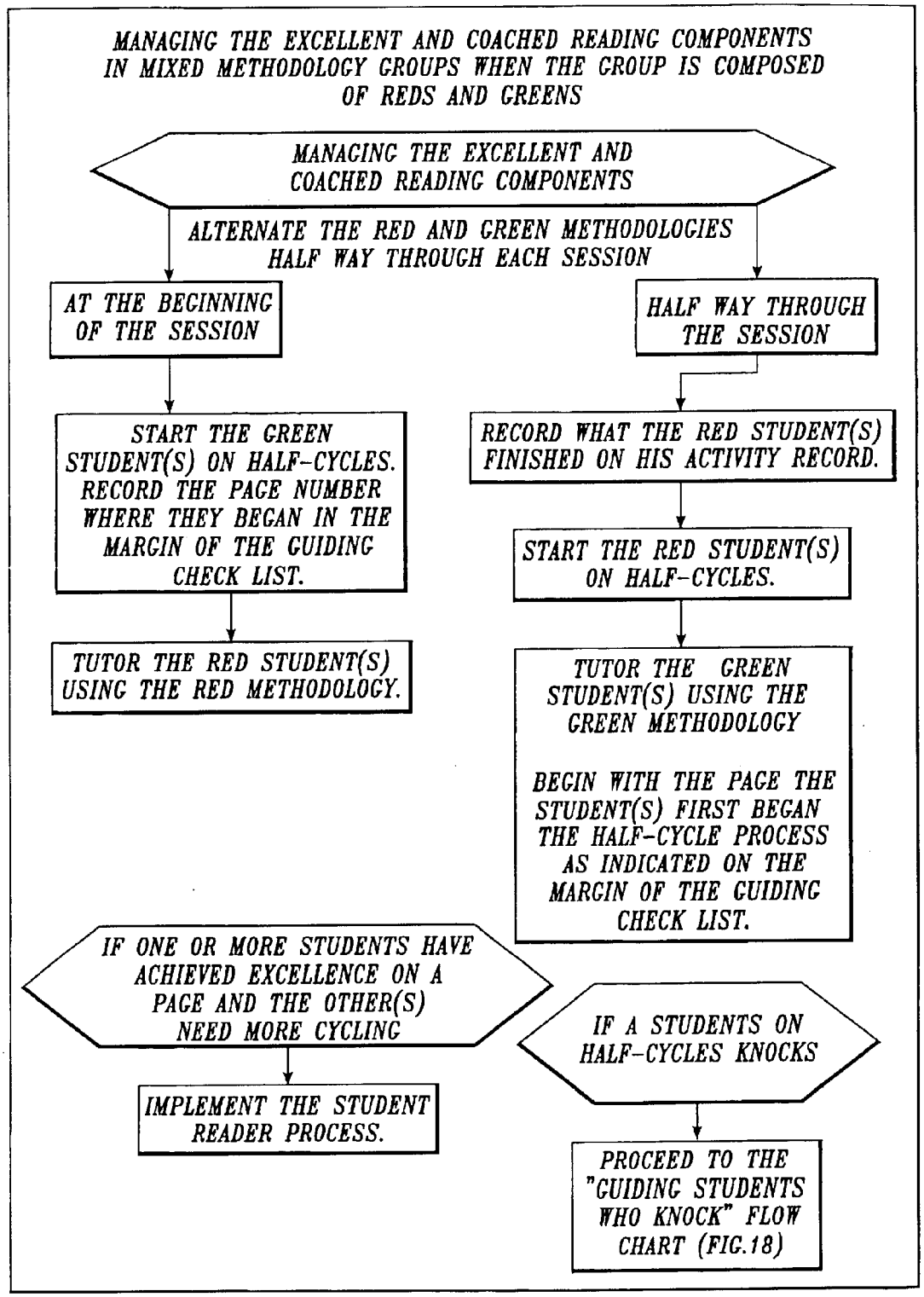

From the student's book read one sentence three times, modeling far from excellent, close to excellent, and excellent. Use the diagrams (such as shown in FIG. 20B) as a visualization tool to help the student understand that coming close to excellent is not good enough.

C. Explain the importance of reaching 100% excellence.

If your student is a sixth grader or older, say

"When you reach 100% excellence, your brain is doing the process of reading correctly."

"The methodology structures the environment in such a way that your brain must figure out how to read correctly."

"Demanding excellence is the tool that will make your brain do what it needs to do to figure out reading."

If your student is a fifth grader or younger, say

"I want reading to be real easy for you. It will be if you get it excellent when you read out loud after doing the cycles."

"I want you to know all by your self if it is excellent."

"I want you to tell me it's excellent only if you know it is."

D. Write the date in the "Date Completed" box 210, Instruction Set One on the Instruction Check List, Area One. (FIG. 21)

E. Go to "For the Student Who Received Instruction in Areas One, Two, Three or LOE" (Block 126) on the Guiding and Instructing Responsibilities flow chart of FIG. 17.

INSTRUCTION SET TWO: Sequences

1. Acknowledge the problem to the student

Choose one of the three remarks to say to the student based on the nature of his confusion:

"You are judging excellence incorrectly. You sometimes think the reading is excellent when it isn't."

"You are judging excellence incorrectly. You sometimes think the reading is not excellent when it is."

"You are judging excellence incorrectly. You sometimes don't know if the reading is excellent."

2. Tell the student how you're going to solve the problem

Say, "I'm going to help you understand excellence."

3. Explain why it's important to do the methodology

Say, "Your brain cannot figure out what it needs to do to achieve excellence if it doesn't know when it's achieving it and when it's not. In order to understand excellence, you need to experience non-excellent reading and excellent reading. That's what we're going to do next."

4. Implement the Label the Read and Choose the Feedback sequences as below to clear the student's confusion:

LABEL THE READ SEQUENCE

Proceed as described above in reference to FIG. 15A. Use the "Achieved Excellence" or "Not Achieved Excellence" box 211 in the Label the Read Sequence on the Instruction Check List, Area One (FIG. 21)

When the student accumulates three check marks (horizontally) in the "Achieved Excellence" box on the Instruction Check List, Area One (FIG. 21), erase all the check marks in the Label the Read Sequence on the Instruction Check List, Area One, and go to "For the Student Who Received Instruction in Areas One, Two, Three, or LOE" (Block 126) of FIG. 17.

When the student accumulates three check marks in the "Not Achieved Excellence" box in FIG. 21, erase all the check marks and proceed to the Choose the Feedback Sequence below.

Do not use guiding remarks or techniques during the Label the Read sequence.

CHOOSE THE FEEDBACK SEQUENCE

Proceed as described above in reference to FIG. 15B. Use the "Achieved Excellence" box 212 in the Choosing the Feedback Sequence on the Instruction Check List, Area One (FIG. 21).

When the student accumulates three check marks (horizontally) in the "Achieved Excellence" box, Choosing Instruction Sequence on the Instruction Check List, Area One, erase all the check marks and go to "For the Student Who Received Instruction in Areas One, Two, Three or LOE" (Block 126) of FIG. 17.

XIII. Instruction Area Two: The student didn't do enough cycles to achieve excellence The Instruction Sets are designed to be administered step-by-step. You will always use the Instruction Check List, Area Two, a sample of which is shown in FIG. 22, whenever any student needs instruction in Area Two.

Do not use the Guiding Check List (FIG. 19) with the student you are instructing. Use the Instruction Check List for Area Two (FIG. 22).

PURPOSE OF THE INSTRUCTION SETS

When the student is not doing enough cycles, a verbal explanation of the importance of holding oneself accountable for excellence during the silent reading is often all that is needed. Instruction Set One, Verbal offers such an explanation. Sometimes students report that their silent reading was excellent, but they are not achieving excellence out loud. Instruction Set Two: Does the Student Think His Silent Reading Was Excellent? instructs you to probe this question.

If the first two instruction sets do not suffice, telling the student to do multiple cycles will always ultimately work. Instruction Set three implements such a strategy.

SEQUENCE OF THE INSTRUCTION SETS

Proceed sequentially until you have completed Instruction Set Three. If you need to instruct in this area again, start with Instruction Set Two: Does the Student Think His Silent Reading Was Excellent? Whenever you need to conduct a language acquisition discussion (LAD), stop instruction and do so. When the LAD is finished, return to instruction.

INSTRUCTION SET ONE: Verbal

1. Acknowledge the problem to the student

Say, "You didn't do enough cycles because you made several attempts at excellence and did not achieve it."

2. Tell the student how you're going to solve the problem

Say, "I'm going to help you make good decisions about when to read out loud."

3. Explain why it's important to do the methodology

A. Say, "You must feel 100% comfortable with the paragraph when reading silently before you read out loud. At any moment during the silent reading if you feel a 'twinge' of discomfort or notice a symptom, you'll know at that point you have to do another cycle before you make an attempt to read the paragraph out loud."

B. Write the date in the "Date Completed" box 220, Instruction Set One on the Instruction Check List, Area Two in FIG. 22.

C. Go to "For the Student Who Received Instruction in Areas One, Two, Three or LOE" (Block 126) on the Guiding and Instructing Responsibilities flow chart of FIG. 17.

INSTRUCTION SET TWO: Does the student think his silent reading was excellent?

1. Acknowledge the problem to the student

Say, "You didn't do enough cycles because you made several attempts at excellence and did not achieve it."

2. Tell the student how you're going to solve the problem

Say, "I am going to help you make good decisions about when to read out loud."

3. Explain why it's important to do the methodology

A. Say, "Did you feel 100% comfortable when reading the paragraph silently before you read it out loud?"

If the student says yes

Proceed to step B.

If the student says no or is uncertain

Say, "You must feel 100% comfortable with the paragraph when reading silently before you read out loud. At any moment during the silent reading if you feel a 'twinge' of discomfort or notice a symptom, you'll know at that point you have to do another cycle before you make an attempt to read the paragraph out loud."

Write the date in the "Date Completed" box 222, Instruction Set Two on the Instruction Check List, Area Two. (FIG. 22)

Go to "For the Student Who Received the Instruction Only" (Block 126) on the Guiding and Instructing Responsibilities flow chart of FIG. 17.

B. Say to the student:

"Becoming 100% comfortable with the text before you read it out loud is the reason for cycling. You told me you were 100% comfortable before you read out loud, but you did not achieve excellence."

"I want you to cycle until you are 100% comfortable and then cycle an additional two times. Let's see what happens."

Write the date in the "Date Completed" box 222, Instruction Set Two on the Instruction Check List, Area Two. (FIG. 22)

Go to "For the Student Who Received Instruction in Areas One, Two, Three or LOE" (Block 126) on the Guiding and Instructing Responsibilities flow chart of FIG. 17.

INSTRUCTION SET THREE: Telling the student how many cycles to complete

1. Acknowledge the problem to the student

Say, "You didn't do enough cycles because you made several attempts at excellence and did not achieve it."

2. Implement strategies that clear the student's confusion:

A. Decide how many cycles you think it will take the student to achieve excellence on the current set of text.

If the student is in the red or green range

Say, "We are going to do __ cycles. Tap your finger on the desk each time you finish the silent reading so I'll know you're done.

If the student is in the blue lime, purple, yellow, or orange range

Say, "I want you to do __ cycles. When you're ready to read out loud, signal me by knocking on the desk."

B. Proceed with cycling.

C. After the cycling is completed, say

"Read the paragraph [sentence(s)] out loud."

D. After the student finishes the read, decide if it was excellent.

If it wasn't excellent

Say, "That wasn't excellent. I need to have you do more cycles". You can choose to offer a guiding remark or technique.

Proceed to step E, using the same paragraph (sentence[s]).

If it was excellent

Say, "That was excellent. The reason you were able to achieve excellence is because you completed enough cycles before reading out loud. The key to achieving excellence out loud is doing enough cycles." (When you repeat step "D", you may choose to leave out the second and/or third sentences.)

Put a check mark in the "Excellent" box 226, Instruction Set Three on the Instruction CheckList, Area Two. (FIG. 22)

Proceed to step E, using a new paragraph.

If you are uncertain

Say, "I'm not sure. Read it again."

Repeat (without cycling) until your uncertainty is resolved. When you resolve your uncertainty, tell him your conclusion.

If you conclude it wasn't excellent

Say, "That wasn't excellent. I need to have you do more cycles." You can choose to offer a guiding remark or technique.

Proceed to step E, using the same paragraph.

If you conclude it was excellent

Say, "That was excellent. The reason you were able to achieve excellence is because you completed enough cycles before reading out loud. The key to achieving excellence out loud is doing enough cycles." (When you repeat step "D", you may choose to leave out the second and/or third sentences.)

Put a check mark in the "Excellent" box 226, Instruction Set Three on the Instruction Check List, Area Two. (FIG. 22)

Proceed to step E, using a new paragraph.

E. Repeat steps A, B, C, and D until:

The student accumulates three check marks in the "Excellent" box 226, Instruction Set Three on the Instruction Check List, Area Two (FIG. 22). Then, erase all three check marks in the "Excellent" box 226 (so that the Instruction Check List Area Two can be reused later when you implement Instruction Set Three again), and go to "For the Student Who Received Instruction in Areas One, Two, Three or LOE" (Block 126) on the Guiding and Instructing Responsibilities flow chart of FIG. 17.

XIV. Instruction Area Three: The student is displaying inappropriate behavior or comments The Instruction Sets are designed to be administered step-by-step initially. You will always use the Instruction Check List, Area Three, a sample of which is shown in FIG. 23, whenever any student needs instruction in Area Three.

Do not use the Guiding Check List (FIG. 19) with the student you are instructing. Use the Instruction Check List for Area Three (FIG. 23).

PURPOSE OF THE INSTRUCTION SETS

In order for the methodology's tutoring to result in the elimination of a student's reading problem, the student must assume control of his own learning by participating responsibly in the tutoring process. Inappropriate behavior significantly slows improvement, which is not acceptable when there are many other students in the school with reading problems who want to participate.

Inappropriate behavior and refusal to fully participate in the tutoring process rarely occurs if you consistently implement the instruction sets presented in this section. When students understand what is expected of them, know why they are being asked to do the things you are requesting, and have reason to believe that their full participation will yield success in eliminating their reading problems, they usually maintain a positive attitude and stay engaged in the process.

SUMMARY OF THE INSTRUCTION SETS

If a pattern of inappropriate behavior emerges, Instruction Set One explains why it is important for the student to participate responsibly in the tutoring process. If he understands why this is necessary, he is more likely to cooperate. A pattern is defined as three check marks on the Guiding Check List for Area Three (FIG. 19). The check marks are erased at the end of each session, giving the uncooperative student many opportunities to participate responsibly.

If a pattern of inappropriate behavior emerges again, Instruction Set Two warns the student that if he continues to misbehave, you will stop working with him.

If a pattern of inappropriate behavior emerges again, Instruction Set Three instructs you to stop working with the student for 15 minutes. After 15 minutes have elapsed the student is asked to participate again if he will do so cooperatively. This instruction set is repeated until you decide it is no longer effective.

If a pattern of inappropriate behavior emerges again, Instruction Set Four sends the student to the principal or counselor to discuss the problem.

If a pattern of inappropriate behavior emerges again, Instruction Set Five instructs you to set up a meeting with the parents, teacher, principal, and/or counselor to discuss the problem.

If a pattern of inappropriate behavior emerges again, Instruction Set Six temporarily removes the student from the program in order to make room for a student who wants his reading problem eliminated. After serving the cooperative student(s), the original one can be brought back into the program.

We recognize that Instruction Set Six: Temporary Removal From The Program may encompass areas of school policy. The approach delineated could be in conflict with school procedures. For this reason, permission to employ the final strategy, temporary removal from the program, must be obtained in advance. If school personnel cannot support temporary removal, then a different strategy can be defined by the principal and the tutors.

The way of dealing with behavior issues reflected in the Instruction Sets for Area Three is congruent with the constructs of the interactive constructivist theory of learning upon which the present tutoring methodology is partially based. The procedures outlined in this section are highly successful and temporary removal from the program happens very rarely—even in juvenile detention centers!

SEQUENCE OF THE INSTRUCTION SETS

If the behavior transgression is severe, go directly to instruction set two, three, or four. Otherwise, complete Instruction Sets One, Two, and Three sequentially. Then, if you need to instruct in this area again, start with Instruction Set Three.

Repeat Instruction Set Three for one to three sessions and then complete Instruction Set Four.

Once you have completed Instruction Set Four and you need to instruct in this area again, use Instruction Set Five and then Instruction Set Six.

INSTRUCTION SET ONE: Verbal for sixth graders and older

1. Acknowledge the problem to the student

Acknowledge the reading problem, not the behavior problem.

Ask the student "Why are you participating in the method?"

If he tells you he's here to improve his reading Proceed to step 2.

If he says anything other than he's here to improve his reading

Say, "You're here to improve your reading."

Have the student read from the current placement range out loud, unassisted, until he reads non-excellently for about 10 seconds. After he reads non-excellently for about ten seconds, interrupt his read, saying to the student "You are here to improve your reading, which will happen if you cooperate."

2. Tell the student how you're going to solve the problem

Say, "I can improve your reading if you accept responsibility for your role as a student. In other words, you need to stay on task, cycle until you achieve excellence silently, signal me that you're ready to read out loud, and then judge excellence correctly."

3. Explain why it's important to do the methodology

A. Give the student an overview of what they can expect and why it is necessary.

Say to the student "Becoming an excellent reader requires the completion of hundreds, and perhaps thousands, of cycles over periods of months. It is the cycling that enables you to become an excellent reader."

"Improving your reading requires you to cognitively engage in each stage of the process; everything from reading silently when you're supposed to, to honestly judging excellence." Explain what 'cognitively engage' means when necessary.

"The method provides a system that will improve your reading if you decide to participate fully. If it is to be successful, this system requires you to meet us half way by cooperating."

B. Establish the expectation that the student must be productive.

Say, "Not everything in life is entertaining and fun. This method is designed to improve your reading, which requires work on your end. Being completely happy with the class at all times would be nice, but it isn't realistically possible. Whether you are happy or not, you must be productive. That is a requirement. There are far too many kids with reading problems in this school for you to be wasting their time staying off task."

C. Write the date in the "Instruction Set One, Verbal" box 230 on the Instruction Check List, Area Three and your initials in the "Tutor Initials" column (FIG. 23). Have the student initial the "Student Initials" column.

D. Go to "For the Student Who Received Instruction in Areas One, Two, Three or LOE" (Block 126) on the Guiding and Instructing Responsibilities flow chart of FIG. 17.

INSTRUCTION SET ONE: Verbal for fifth graders and younger

1. Acknowledge the problem to the student

Acknowledge the reading problem, not the behavior problem.

Ask the student "Why are you in this method?"

If he says he's here to improve his reading

Proceed to step 2.

If he says anything other than he's here to improve his reading

Say, "You are here because you need to improve your reading."

Have the student read from the current placement range out loud, unassisted, until he reads non-excellently for about 10 seconds. After about ten seconds elapse, interrupt the student's read, saying "You are here to improve your reading, which will happen if you cooperate."

2. Tell the student how you're going to solve the problem

Say, "I can help you become an excellent reader, but not unless you do what I ask you to do."

3. Explain why it's important to do the methodology

A. Say, "It is unacceptable for you to act like you have been acting."

B. Give the student an overview of what they can expect and why it is necessary. Say, "If you don't work hard and do what I ask you to, you will keep on being a poor reader. Becoming an excellent reader requires many cycles. Trying to read it excellently and not getting it is part of the process. It doesn't matter if it takes a long time. If you keep working at it, you will get it."

C. Establish the expectation that the student must be productive. Say, "You have to work hard. If you do, you'll become an excellent reader."

D. Write the date in the "Instruction Set One, Verbal" box 230 on the Instruction Check List, Area Three and your initials in the "Tutor Initials" column. (FIG. 23) Have the student initial the "Student Initials" column.

E. Go to "For the Student Who Received Instruction in Areas One, Two, Three or LOE" (Block 126) on the Guiding and Instructing Responsibilities flow chart of FIG. 17.

INSTRUCTION SET TWO: Warning of refusal to work with a non-cooperating student

1. Acknowledge the problem to the student

Say, "You are continuing to display inappropriate behavior [comments], which is simply unacceptable."

2. Implement the following strategies that encourage the student to participate responsibly:

Say to the student:

"There are far too many students in this school who need help in reading and want to participate in this class for you to be wasting their time".

"It's very frustrating for me when you refuse to do your part as a student. If you continue refusing to fully participate, I'm not going to work with you. If I have to do that, then I will be asking you to sit quietly and not disturb the students who are serious about improving their reading."

Write the date in the "Instruction Set Two, Warning of Refusal to Work With A Non-Cooperating Student" box 232 on the Instruction Check List, Area Three and your initials in the "Tutor Initials" column. (FIG. 23). Have the student initial the "Student Initials" column.

Go to "For the Student Who Received Instruction in Areas One, Two, Three or LOE" (Block 126) on the Guiding and Instructing Responsibilities flow chart of FIG. 17.

INSTRUCTION SET THREE: Refusing to work with a non-cooperating student for fifteen minutes (Repeat Instruction Set Three for one to three sessions, and then proceed to Instruction Set Four. Give the principal of counselor a "head up" that you my have to send the student to see him or her.)

1. Acknowledge the problem to the student

Say, "Your behavior [comments] is unacceptable."

2. Implement the following strategies that encourage the student to participate responsibly:

A. Quit working with the student. He should sit quietly, doing nothing. If he is disruptive, ask him to put his head down so he is less likely to disturb the other students or separate him physically from where you are working. Try to do this without anger to avoid a power struggle. You should be in a mindset of merely acknowledging the reality of his refusal to engage in the process.

B. Write the date in the "Instruction Set Three, Refusing to Work With A Non-Cooperating Student" box 234 on the Instruction Check List, Area Three and your initials in the "Tutor Initials" column. (FIG. 23) Have the student initial the "Student Initials" column.

C. Familiarize yourself with step "D" below (and work with the other students, if any, following the flowchart of FIG. 17 as more fully described below).

D. After 15 minutes, ask the uncooperative student if he wants to participate under the condition that he cooperates.

If he chooses to participate

Go to "For the Student Who Received Instruction in Areas One, Two, Three or LOE" (Block 126) on the Guiding and Instructing Responsibilities flow chart of FIG. 17.

If he chooses not to participate

Ignore him for the remainder of the session. He should sit quietly, doing nothing. If he is disruptive, ask him to put his head down so he is less likely to disturb the other students or separate him physically from where you are working. Try to do this without anger to avoid a power struggle. You should be in a mindset of merely acknowledging the reality of his refusal to engage in the process.

Work with the other students, if any. (Begin tutoring the non-cooperating student in the next session.)

INSTRUCTION SET FOUR: Sending the student to the principal or counselor

1. Acknowledge the problem to the student

Say, "Your behavior [comments] is unacceptable."

2. Implement the following strategies that encourage the student to participate responsibly:

A Write the date in the "Instruction Set Four, Sending the Student to the Principal or Counselor" box 236 on the Instruction Check List, Area Three and your initials in the "Tutor Initials" column. (FIG. 23) Have the student initial the "Student Initials" column.

B. Send the student to the principal's or counselor's office. Either accompany the student or notify the office personnel that he is on his way. (While you're gone, blue students continue cycling, and red and green students read silently.)

C. Work with the other students, if any.

INSTRUCTION SET FIVE: Parents, teacher, principal and/or counselor meeting

1. Acknowledge the problem to the student

Say, "Your behavior [comments] is unacceptable."

2. Implement the following strategies that encourage the student to participate responsibly:

A Quit working with the student, and ignore him for the rest of the session. He should sit quietly, doing nothing. If he is disruptive, ask him to put his head down so he is less likely to disturb the other students or separate him physically from where you are working. Try to do this without anger to avoid a power struggle. You should be in a mindset of merely acknowledging the reality of his refusal to engage in the process. Work with other students, if any.

B. Set up a meeting with the principal, counselor, teacher, and/or parents to try to solve the behavior problems.

A solution must be found, or the student will be in danger of being temporarily removed from the class.

Write the date the meeting was held in the "Instruction Set Five, Parents, Teacher, and Principal Meeting" box 238 on the Instruction Check List, Area Three and your initials in the "Tutor Initials" column. (FIG. 23) Have the student initial the "Student Initials" column.

INSTRUCTION SET SIX: Temporary removal from the program

1. Acknowledge the problem to the student

Say, "Your behavior [comments] is unacceptable."

2. Implement the following strategies that encourage the student to participate responsibly:

A. Quit working with the student, and ignore him for the rest of the session. He should sit quietly, doing nothing. If he is disruptive, ask him to put his head down so he is less likely to disturb the other students or separate him physically from where you are working. Try to do this without anger to avoid a power struggle. You should be in a mindset of merely acknowledging the reality of his refusal to engage in the process. Work with other students, if any.

B. Our recommendation is to temporarily remove the student from the class and bring in a student who wants his reading problem eliminated.

This should never be done without prior permission from school authorities.

Bring the student back into the program after the students who are proactively seeking to eliminate their reading problems have been served.

Write the date of the removal in the "Instruction Set Six, Temporary Removal from The Program" box 239 on the Instruction Check List, Area Three and your initials in the "Tutor Initials" column. (FIG. 23) Have the student initial the "Student Initials" column.

XV. Lack of efficiency in Achieving Excellence

The following Questions are designed to be administered step-by-step. You will always use the Instruction Check List, LOE (Lack Of Efficiency), a sample of which is shown in FIG. 24, whenever any student needs instruction in LOE (i.e., he hasn't achieved excellence in the last 10 minutes). When you are instructing, use the Instruction Check List for LOE (FIG. 24).

PURPOSE OF THE QUESTIONS

Taking too much time to achieve excellence slows progress and frustrates the student. There are five potential reasons for not achieving excellence before ten minutes have elapsed.

1. The student is able to achieve excellence on the paragraph. He just hasn't knocked.

2. The student is off task.

3. The paragraph is unusually long as compared to other paragraphs in the book.

4. The student doesn't understand vocabulary or concepts in the paragraph.

5. The text is too complex for the current state of the student's guidance system.

Asking the following five questions in this section to a student will reveal what caused the problem in LOE and will provide a solution.

SEQUENCE OF THE QUESTIONS

Beginning with Question One, proceed sequentially.

If you need to instruct in this area again, start with Question One.

QUESTION ONE

If the student read the paragraph out loud just prior to switching to Instruction in LOE, don't ask him to read it out loud again. Proceed to Question Two and continue probing for the problem.

If you interrupted the student while he was cycling because he hadn't achieved excellence in the last ten minutes, follow the process below.

IS THE STUDENT ABLE TO ACHIEVE EXCELLENCE ON THE PARAGRAPH?

Say, "Excuse the interruption. I want you to read the paragraph out loud because ten minutes has elapsed since you last achieved excellence."

When the student finishes reading out loud, judge if it was excellent, and then ask him, "Was it excellent?"

If you agree that the reading, was excellent
Say, "I agree."

If you think the student may need encouragement to attempt excellence before ten minutes elapse, encourage him to do so.

Go to "For the Student Who Received Instruction in Areas One, Two, Three or LOE"(Block 126) on the Guiding and Instructing Responsibilities flow chart of FIG. 17.

If you agree that the reading was not excellent
Say, "I disagree." Proceed to Question Two and continue probing for the problem.

If you disagree with the student's judgement
And you think the reading was not excellent
Say, "I didn't think that was excellent."
Proceed to Question Two and continue probing for the problem.

And you think the reading was excellent
Say, "I thought that was excellent." Go to "For the Student Who Received Instruction in Areas One, Two, Three or LOE" (Bock 126) on the Guiding and Instructing Responsibilities flow chart of FIG. 17.

QUESTION TWO

WAS THE STUDENT OFF TASK?

If the student has been off task

Say to the student "You have been off task, which isn't acceptable. You need to cooperate and work hard in this class." Address other inappropriate behavior if you choose.

Put a check mark in the "Inappropriate Behavior" box on the Guiding Check List in Area Three. (FIG. 19).

Go to "For the Student Who Received Instruction in Areas One, Two, Three or LOE"(Block 126) on the Guiding and Instructing Responsibilities flow chart of FIG. 17.

If the student has not been off task

Proceed to Question Three and continue probing for the problem.

If you are uncertain

Say to the student, "Estimate the total number of cycles you completed in the last ten minutes before we went into instruction."

If the total number of cycles completed is 8 or more, the student was on task

Proceed to Question Three and continue probing for the problem.

If the total number of cycles completed is 7 or fewer, the student was off task

Say, "You are not doing enough cycles. I want you to work harder in this class." Address other inappropriate behavior if you choose.

Put a check mark in the "Inappropriate Behavior" box on the Guiding Check List in Area Three. (FIG. 19)

Go to "For the Student Who Received Instruction in Areas One, Two, Three or LOE" (Block 126) on the Guiding and Instructing Responsibilities flow chart of FIG. 17.

QUESTION THREE

IS THE PARAGRAPH UNUSUALLY LONG?

If the paragraph is unusually lone relative to other paragraphs in the text

Divide the paragraph in half. Go to "For the Student Who Received Instruction in Areas One, Two, Three or LOE" (Block 126) on the Guiding and Instructing Responsibilities flow chart of FIG. 17

If the paragraph is an appropriate length relative to other paragraphs in the text Proceed to Question Four and continue probing for the problem.

QUESTION FOUR

DOES THE PARAGRAPH CONTAIN UNKNOWN VOCABULARY OR CONCEPTS?

A. If you think the paragraph contains vocabulary or concepts the student may not know, ask the student if he knows the meaning of each vocabulary word you think he may not know or concepts you think may be unfamiliar.

If he knows

Proceed to Question Five and continue probing for the problem.

If he doesn't know

Conduct a Language Acquisition Discussion (LAD). Specifically, define the vocabulary word or the concept, explain the vocabulary word or the concept outside the author's context, and tie the vocabulary word or concept back into the author's context by explaining its use in the paragraph. You can choose to expand your explanation to include a brief summary of the paragraph, or in some cases a summary of more than the paragraph.

Go to "For the Student Who Received Instruction in Areas One, Two, Three or LOE" (Block 126) on the Guiding and Instructing Responsibilities flow chart of FIG. 17.

B. If you know the paragraph does not contain unknown vocabulary or concepts, proceed to Question Five and continue probing for the problem.

QUESTION FIVE

IS THE TEXT TOO COMPLEX?

Say to the student, "I need to decide if it's in your best interest to change books. I'll need the next thirty to fifty minutes to make my decision. You're going to be cycling as usual starting with the next paragraph, and I'll be gathering information I need to make a decision. Remember to signal me when you're ready to read out loud."

Proceed to the next paragraph and follow the following steps 1, 2, 3, and 4 using the Lack Of Efficiency (LOE) Instruction Check List, Question Five (FIG. 24) to determine if the text is too complex.

1. If the paragraph is unusually long compared to other paragraphs in the text, divide the paragraph in half.

2. If the paragraph is unusually short compared to other paragraphs in the text, move to the next average size paragraph.

3. If you think the paragraph contains vocabulary the student may not know, ask the student if he knows the meaning of each vocabulary word you think he may not know.

If he knows

Proceed to step 4.

If he doesn't know

Engage in a Language Acquisition Discussion (LAD). Specifically, define the vocabulary word or the concept, explain the vocabulary word or the concept outside the author's context, and tie the vocabulary word or concept back into the author's context by explaining its use in the paragraph. You can choose to expand your explanation to include a brief summary of the paragraph, or in some cases a summary of more than the paragraph.

Proceed to step 4.

Write the time in the "Time Started New Paragraph" box 246 on the LOE Instruction Check List, Question Five and proceed with cycling.

A. If the student attempts excellence out loud before ten minutes elapse

When the student finishes reading out loud, judge if it was excellent and then ask, "Was it excellent?"

If you both agree the reading was not excellent or if you disagree

Continue cycling the same paragraph.

If you both agree the reading was excellent

Check the "Excellence Was Achieved Before Ten Minutes Elapsed" box 244 on the LOE Instruction Check List, Question Five. (FIG. 24).

Proceed to the next paragraph and repeat 1, 2, 3, and 4 until:

The student accumulates three check marks in the "Excellence Was Achieved Before Ten Minutes Elapsed" box on the LOE Instruction Check List, Question Five, then, erase all the check marks and times on the LOE Instruction Check List, Question Five. Go to "For the Student Who Received Instruction in Areas One, Two, Three or LOE" (Block 126) on the Guiding and Instructing Responsibilities flow chart of FIG. 17.

And you are uncertain

Resolve your uncertainty and tell the student your conclusion. Follow the above procedures depending on whether you concluded the reading was excellent or not excellent.

B. If the student has not achieved excellence out loud and ten minutes have elapsed If the student is cycling, interrupt him and say, "Excuse the interruption. I want you to read the paragraph out loud."

If you both agree the reading was excellent

Proceed as in "If you both agree the reading was excellent" described immediately above.

If you both agree the reading was not excellent or if you disagree

Check the "Excellence Was Not Achieved, And Ten Minutes Elapsed" box 244 on the LOE Instruction Check List, Question Five. (FIG. 24)

Proceed to the next paragraph and repeat 1, 2, 3, and 4 until:

The student accumulates three check marks in the "Excellence Was Not Achieved, And Ten Minutes Elapsed" box on the LOE Instruction Check List, Question Five, then, erase all the check marks and times on the LOE Instruction Check List, Question Five.

Proceed to the "Solutions" section described below.

And you are uncertain

Resolve your uncertainty and tell the student your conclusion. Follow the above procedures depending on whether you concluded the reading was excellent or not excellent.

SOLUTIONS

When a student demonstrates a pattern of not achieving excellence in ten minutes, as represented by acquiring three check marks in the "Excellence Was Not Achieved, and Ten Minutes Elapsed" box on the LOE Instruction Check List, Question Five (FIG. 24), something has to change in his tutoring environment to enable him to achieve excellence in a timely manner. This section will help you identify what has to be changed.

Use the headings below to locate the range of the student receiving LOE instruction (or an LOE Guiding Technique) and the total number of students in the group. Once you have found the appropriate heading, locate the subheading for a single methodology group or a mixed methodology group, depending on your group configuration, and implement the solution. (In instances where there is only one student in the group, there are no sub-headings.)

RED RANGE, ONE STUDENT

Tutoring one student is not cost effective. Many students in the school have reading problems. Try to keep your tutoring slots filled.

If the student is having problems only on multiple-sentence pages

Move the student to a book containing mostly single sentences on a page.

Divide the multiple sentences into single sentences. Discontinue dividing the sentences as soon as the student's reading improves enough to allow him to achieve excellence on the multiple-sentence pages in ten minutes.

Go to "For the Student Who Received Instruction in Areas One, Two, Three or LOE" (Block 126) on the Guiding and Instructing Responsibilities flow chart of FIG. 17.

If the student is having problems on single-sentence pages

Hold the student accountable for achieving excellence on a meaning phrase(s) rather than the entire sentence. Discontinue holding him accountable only for a meaning phrase(s) as soon as the student's reading improves enough to allow him to achieve excellence on the entire sentence in ten minutes.

Go to "For the Student Who Received Instruction in Areas One, Two, Three or LOE" (Block 126) on the Guiding and Instructing Responsibilities flow chart of FIG. 17.

If necessary, discontinue the "Lack of Efficiency in Achieving Excellence" until the student improves his reading problem sufficiently to warrant your holding him accountable for efficiency.

RED RANGE STUDENT, TWO- OR THREE-STUDENT GROUP

Try to keep your tutoring slots filled. Many students in the school have reading problems

SINGLE METHODOLOGY GROUP

If the student is having problems only on multiple-sentence pages

For all single sentence pages

Cycle normally with all students.

For all multiple sentence pages

Conduct the first half of the cycling process normally for all students. Instruct all students to read silently along with you as you read the entire paragraph out loud.

Conduct the second half of the cycling process normally for the successful students but differently for the unsuccessful student. Instruct the successful students to read the entire paragraph silently. Instruct the unsuccessful student to read silently only a portion of the paragraph. Instruct all students to signal you normally when they are ready to read out loud. The successful students read the whole paragraph out loud, and the unsuccessful student reads only a portion of the paragraph. When the unsuccessful student achieves excellence on a portion of the paragraph he moves to the next portion of the paragraph and continues the ACT as described above. When the successful student achieves excellence on the entire paragraph he becomes the student reader.

Continue the ACT until the unsuccessful student has achieved excellence on each portion of the paragraph and the successful student has achieved excellence on the entire paragraph.

Go to "For the Student Who Received Instruction in Areas One, Two, Three or LOE" (Block 126) on the Guiding and Instructing Responsibilities flow chart of FIG. 17. Use this technique only until the unsuccessful student can cycle normally with the group. In the unusual circumstance when the unsuccessful student has achieved excellence on every portion of the paragraph and the successful student has not yet achieved excellence on the entire paragraph, the unsuccessful student should cycle the entire paragraph. If he achieves excellence first, he becomes the student reader. If the successful student achieves excellence first, both students move to the next paragraph and continue the ACT.

If the student is having problems on single-sentence pages

Move the student to a group that has students displaying similar reading abilities or tutor him individually if possible by moving the other students to different groups.

Go to "For the Student Who Received Instruction in Areas One, Two, Three or LOE" (Block 126) on the Guiding and Instructing Responsibilities flow chart of FIG. 17.

OR if changing groups is not possible

Hold the student accountable for achieving excellence on a meaning phrase(s) rather than the entire sentence.

Conduct the Alternative Cycling Technique as described immediately above.

Go to "For the Student Who Received Instruction in Areas One, Two, Three or LOE" (Block 126) on the Guiding and Instructing Responsibilities flow chart of FIG. 17. Use this technique only until the unsuccessful student can cycle normally with the group.

If necessary, discontinue the "Lack of Efficiency in Achieving Excellence" until the student improves his reading problem sufficiently to warrant your holding him accountable for efficiency.

MIXED METHODOLOGY GROUP

If the student is having problems e on multiple-sentence pages

And there is only one red student in the group

Move the red student to a book containing mostly single-sentence pages.

On pages containing multiple sentences, hold the student accountable for achieving excellence on only one sentence at a time.

Go to "For the Student Who Received Instruction in Areas One, Two, Three or LOE" (Block 126) on the Guiding and Instructing Responsibilities flow chart of FIG. 17. Use this technique only until the unsuccessful student can achieve excellence within ten minutes on paragraphs containing multiple sentences.

And there are two red students in the group

Move the student to a group that has students displaying similar reading abilities or tutor him individually if possible by moving the other students to different groups. Go to "For the Student Who Received Instruction in Areas One, Two, Three or LOE" (Block 126) on the Guiding and Instructing Responsibilities flow chart of FIG. 17.

Or if changing groups is not possible, implement the Alternative Cycling Technique as described above.

Go to "For the Student Who Received Instruction in Areas One, Two, Three or LOE" (Block 126) on the Guiding and Instructing Responsibilities flow chart of FIG. 17. Use this technique only until the unsuccessful red student can cycle normally with the successful one.

If the student is having problems on single-sentence pages

And there is one red student in the group

Hold the student accountable for achieving excellence on a meaning phrase(s) rather than the entire sentence.

Go to "For the Student Who Received Instruction in Areas One, Two, Three or LOE" (Block 126) on the Guiding and Instructing Responsibilities flow chart of FIG. 17.

And there are two red students in the group

Move the unsuccessful student to a group that has students displaying similar reading abilities or tutor him individually if possible by moving the other students to different groups.

Go to "For the Student Who Received Instruction in Areas One, Two, Three or LOE" (Block 126) on the Guiding and Instructing Responsibilities flow chart of FIG. 17.

OR if changing groups is not. possible, implement the Alternative Cycling Technique as described above.

Go to "For the Student Who Received Instruction in Areas One, Two, Three or LOE" (Block 126) on the Guiding and Instructing Responsibilities flow chart of FIG. 17. Use this technique only until the unsuccessful student can cycle normally with the successful student.

If necessary, discontinue the "Lack of Efficiency in Achieving Excellence" until the student improves his reading problem sufficiently to warrant your holding him accountable for efficiency.

GREEN RANGE, ONE STUDENT

Tutoring one student is not cost effective. Many students in the school have reading problems. Try to keep your tutoring slots filled.

If the student is having problems only on long paragraphs or small print

Move the student to a book containing mostly short paragraphs or large print.

Divide the longer paragraphs in half. Discontinue dividing the paragraph as soon as the student's reading improves enough to allow him to achieve excellence on the whole paragraph in ten minutes.

Go to "For the Student Who Received Instruction in Areas One, Two, Three or LOE" (Block 126) on the Guiding and Instructing Responsibilities flow chart of FIG. 17.

If the student is having problems on short paragraphs or large print

Move the student to the red range.

Go to "For the Student Who Received Instruction in Areas One, Two, Three or LOE" (Block 126) on the Guiding and Instructing Responsibilities flow chart of FIG. 17.

GREEN RANGE STUDENT, TWO- OR THREE-STUDENT GROUP

Try to keep your tutoring slots filled. Many students in the school have reading problems.

SINGLE METHODOLOGY GROUP

If the student is having problems only on long paragraphs or small print

Move the student to a group that has student displaying similar reading abilities.

Go to "For the Student Who Received Instruction in Areas One, Two, Three or LOE" (Block 126) on the Guiding and Instructing Responsibilities flow chart of FIG. 17.

OR if changing groups is not possible, implement the Alternative Cycling Technique as described above.

Go to "For the Student Who Received Instruction in Areas One, Two, Three or LOE" (Block 126) on the Guiding and Instructing Responsibilities flow chart of FIG. 17. Use this technique only until the unsuccessful student can cycle normally with the group.

If the student is having problems on short paragraphs or large print

Change the tutoring group so the unsuccessful student can join a group with a red-range student that displays similar reading abilities.

Go to "For the Student Who Received Instruction in Areas One, Two, Three or LOE" (Block 126) on the Guiding and Instructing Responsibilities flow chart of FIG. 17.

OR if changing the group is not possible

Leave the student in his current group and move him to the red range. Refer to the "Managing . . . in Mixed Methodology Groups When the Group Is Composed of Reds and Greens" flow chart (FIG. 27), which will be described below.

Go to "For the Student Who Received Instruction in Areas One, Two, Three or LOE" (Block 126) on the Guiding and Instructing Responsibilities flow chart of FIG. 17.

MIXED METHODOLOGY GROUP

If the student is having problems only on long paragraphs or small print

And there is only one green student in the group

Move the green student to a book containing mostly short paragraphs or large print.

Divide any long paragraphs in half. Discontinue dividing long paragraphs as soon as the student's reading improves enough to allow him to achieve excellence on the whole paragraph in ten minutes.

Go to "For the Student Who Received Instruction in Areas One, Two, Three or LOE" (Block 126) on the Guiding and Instructing Responsibilities flow chart of FIG. 17.

And there are two green students in the group

Move the student to a group that has students displaying similar reading abilities.

Go to "For the Student Who Received Instruction in Areas One, Two, Three or LOE" (Block 126) on the Guiding and Instructing Responsibilities flow chart of FIG. 17.

OR if changing groups is not possible, implement the Alternative Cycling Technique as described above.

Go to "For the Student Who Received Instruction in Areas One, Two, Three or LOE" (Block 126) on the Guiding and Instructing Responsibilities flow chart of FIG. 17. Use this technique only until the unsuccessful green student can cycle normally with the successful one.

If the student is having problems on short paragraphs or large print

And there is a red student(s) in the group

Move the green student to the red range.

Go to "For the Student Who Received Instruction in Areas One, Two, Three or LOE" (Block 126) on the Guiding and Instructing Responsibilities flow chart of FIG. 17.

And there are one or two blue-orange students and one green student in the group Move the green student to the red range.

Go to "For the Student Who Received Instruction in Areas One, Two, Three or LOE" (Block 126) on the Guiding and Instructing Responsibilities flow chart of FIG. 17.

And there is one blue-orange student and two green students in the group

Change the tutoring group so the unsuccessful student can join a group with a red-range student that displays similar reading abilities.

Go to "For the Student Who Received Instruction in Areas One, Two, Three or LOE" (Block 126) on the Guiding and Instructing Responsibilities flow chart of FIG. 17.

OR if changing the group is not possible

Implement the Alternative Cycling Technique as described above.

Go to "For the Student Who Received Instruction in Areas One, Two, Three or LOE" (Block 126) on the Guiding and Instructing Responsibilities flow chart of FIG. 17. Use this technique only until the unsuccessful student can cycle normally with the successful one.

BLUE RANGE, ONE STUDENT

Tutoring one student is not cost effective. Many students in the school have reading problems. Try to keep your tutoring slots filled.

If the student is having problems only on long paragraphs or small print

Move the student to a book at the current range that has shorter paragraphs or larger print.

Divide the longer paragraphs in half. Discontinue dividing the paragraph as soon as the student's reading improves enough to allow him to achieve excellence on the whole paragraph in ten minutes.

Go to "For the Student Who Received Instruction in Areas One, Two, Three or LOE" (Block 126) on the Guiding and Instructing Responsibilities flow chart of FIG. 17.

If the student is having problems on short paragraphs or large print

Move the student to the green range.

Go to "For the Student Who Received Instruction in Areas One, Two, Three or LOE" (Block 126) on the Guiding and Instructing Responsibilities flow chart of FIG. 17.

BLUE RANGE, TWO- OR THREE-STUDENT GROUP

Try to keep your tutoring slots filled. Many students in the school have reading problems.

SINGLE METHODOLOGY GROUP

If the student is having problems only on long paragraphs or small print

Move the student to a book at the current range that has shorter paragraphs or larger print.

Divide any long paragraphs in half. Discontinue dividing long paragraphs as soon as the student's reading improves enough to allow him to achieve excellence on the whole paragraph in ten minutes.

Go to "For the Student Who Received Instruction in Areas One, Two, Three or LOE" (Block 126) on the Guiding and Instructing Responsibilities flow chart of FIG. 17.

If the student is having problems on short paragraphs or large print

Change the tutoring group so the student can join a group with a green-range student that displays similar reading abilities.

OR if changing the tutoring group is not possible

Leave the student in his current tutoring group and move him to the green range.

Figure 28A:
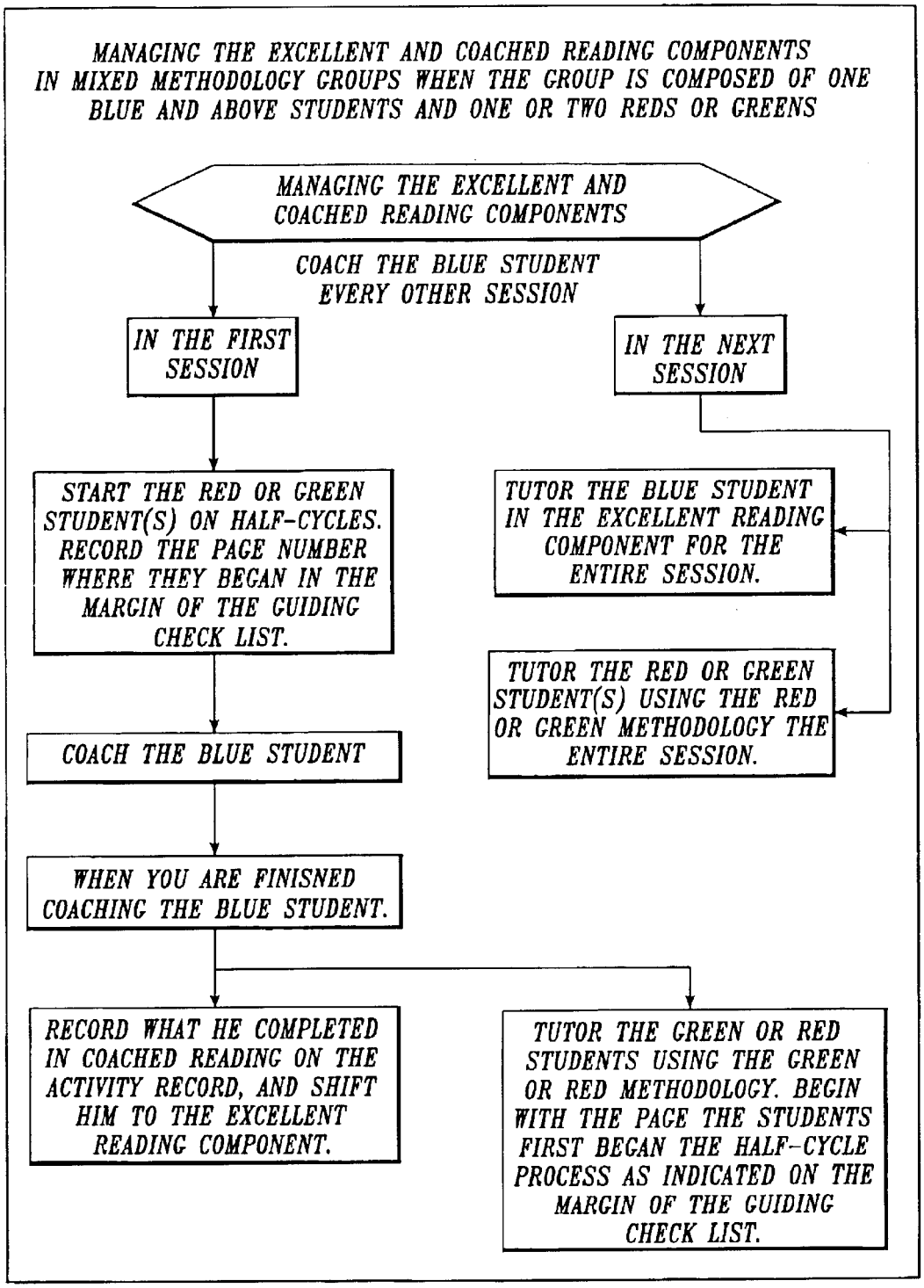
Figure 28B:
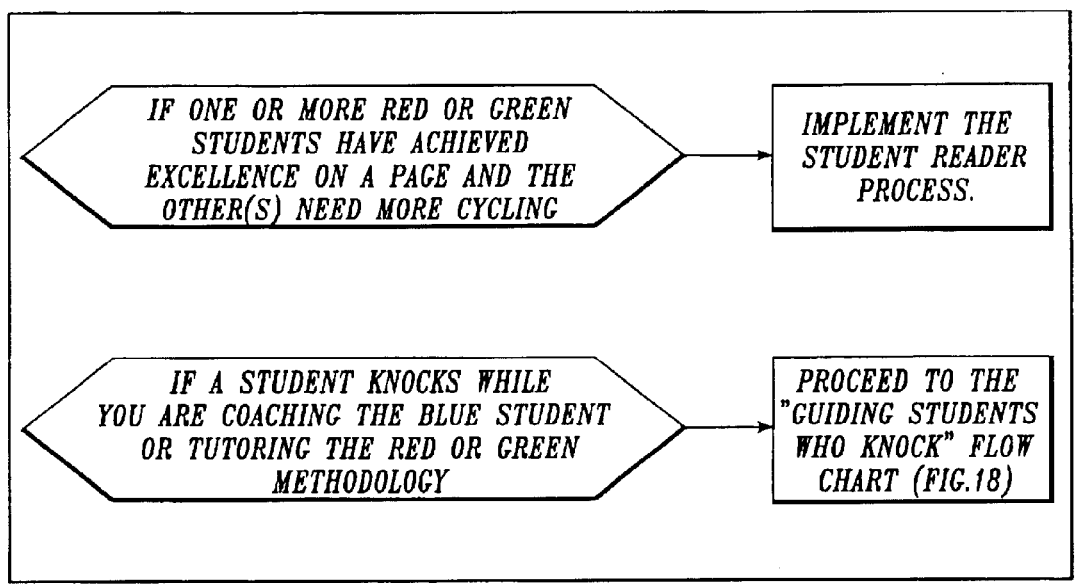
Figure 29A:
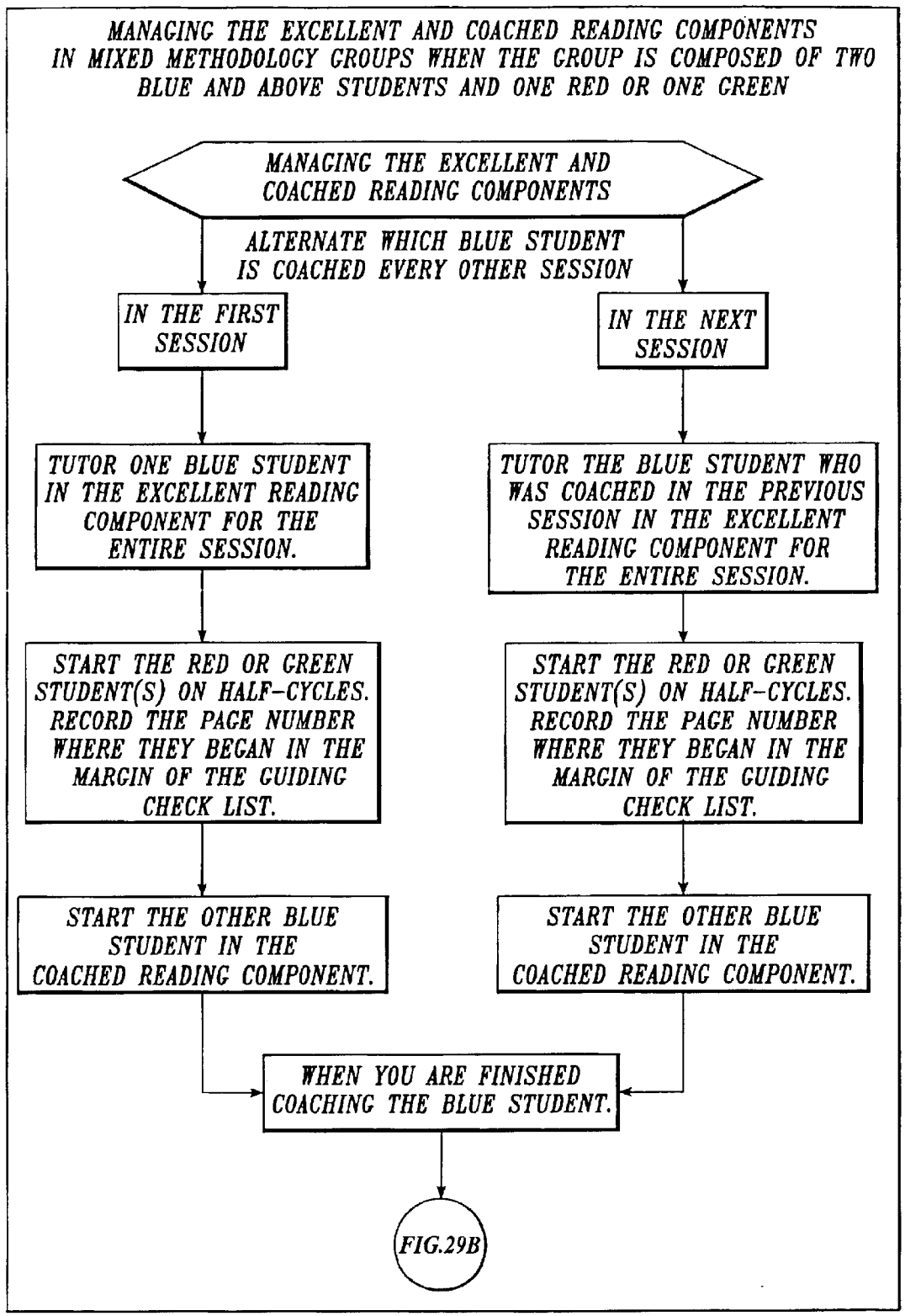
Figure 29B:
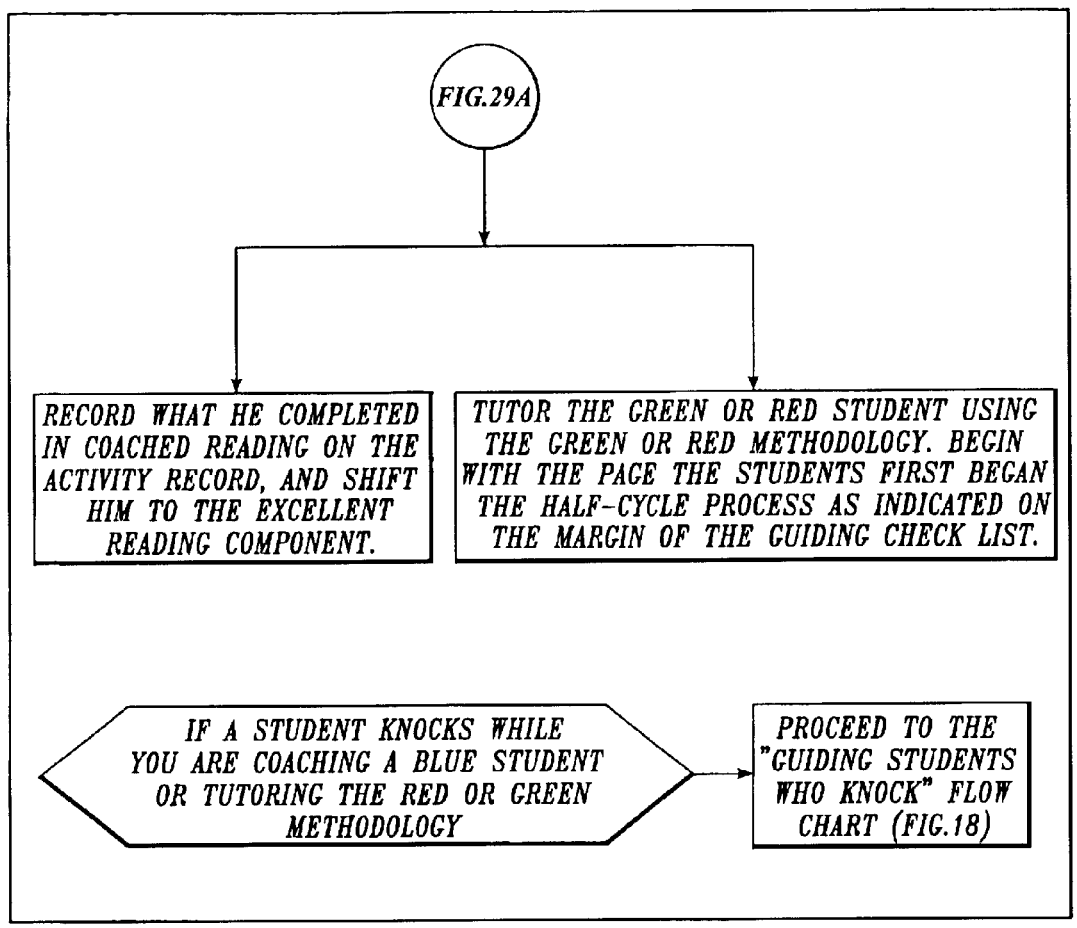

Refer to the appropriated flowcharts "Managing . . . in Mixed Methodology Groups (FIGS. 28 and 29).

Go to "For the Student Who Received Instruction in Areas One, Two, Three or LOE" (Block 126) on the Guiding and Instructing Responsibilities flow chart of FIG. 17.

MIXED METHODOLOGY GROUP

If the student is having problems only on long paragraphs or small print

Move the student to a book at the current range that has shorter paragraphs or larger print.

Divide any long paragraphs in half. Discontinue dividing long paragraphs as soon as the student's reading improves enough to allow him to achieve excellence on the whole paragraph in ten minutes.

Go to "For the Student Who Received Instruction in Areas One, Two, Three or LOE" (Block 126) on the Guiding and Instructing Responsibilities flow chart of FIG. 17.

If the student is having problems on short paragraphs or large print

And there is a green student in the group

Move the student to the green range.

Go to "For the Student Who Received Instruction in Areas One, Two, Three or LOE" (Block 126) on the Guiding and Instructing Responsibilities flow chart of FIG. 17

And there are, besides the blue student you are working with, one or two red students, and no lime-orange students in the group Move the blue student to the green range.

Go to "For the Student Who Received Instruction in Areas One, Two, Three or LOE" (Block 126) on the Guiding and Instructing Responsibilities flow chart of FIG. 17.

And there are, besides the blue student you are working with, one red student, and one blue-orange student Change the tutoring group so the student can join a group with a green-range student that displays similar reading abilities.

OR if changing the tutoring group is not possible

Divide the paragraph in half for the blue student. Dividing the paragraph should be used only if you can't change groups and should be discontinued as soon as the student's reading improves enough to allow him to achieve excellence on the whole paragraph in ten minutes.

Go to "For the Student Who Received Instruction in Areas One, Two, Three or LOE" (Block 126) on the Guiding and Instructing Responsibilities flow chart of FIG. 17.

BLUE RANGE STUDENT, FOUR-STUDENT GROUP

SINGLE METHODOLOGY GROUP

If you have a four-student group, you cannot convert it to a mixed methodology group because such groups are limited to three students.

If the student is having problems only on long paragraphs or small print

Move the student to a book at the current range that has shorter paragraphs or larger print.

Divide any long paragraphs in half. Discontinue dividing long paragraphs as soon as the student's reading improves enough to allow him to achieve excellence on the whole paragraph in ten minutes.

Go to "For the Student Who Received Instruction in Areas One, Two, Three or LOE" (Block 126) on the Guiding and Instructing Responsibilities flow chart of FIG. 17.

If the student is having problems on short paragraphs or large print

Change the tutoring group so the student can join a group with a green-range student that displays similar reading abilities.

Go to "For the Student Who Received Instruction in Areas One, Two, Three or LOE" (Block 126) on the Guiding and Instructing Responsibilities flow chart of FIG. 17.

OR if changing the tutoring group is not possible

Divide each paragraph in half for the blue student. Dividing the paragraph should be used only if you can't change groups and should be discontinued as soon as the student's reading improves enough to allow him to achieve excellence on the whole paragraph in ten minutes.

Go to "For the Student Who Received Instruction in Areas One, Two, Three or LOE" (Block 126) on the Guiding and Instructing Responsibilities flow chart of FIG. 17.

LIME, PURPLE, YELLOW, AND ORANGE RANGES, ONE-, TWO-, THREE-, OR FOUR-STUDENT GROUP

Try to keep your tutoring slots filled. Many students in the school have reading problems.

SINGLE METHODOLOGY GROUP

If the student is having problems only on long paragraphs or small print

Move the student to a book at the current range that has shorter paragraphs or larger print.

Divide any long paragraphs in half. Discontinue dividing long paragraphs as soon as the student's reading improves enough to allow him to achieve excellence on the whole paragraph in ten minutes.

Go to "For the Student Who Received Instruction in Areas One, Two, Three or LOE" (Block 126) on the Guiding and Instructing Responsibilities flow chart of FIG. 17.

If the student is having problems on short paragraphs or large print

Move the student to the next lower range.

Go to "For the Student Who Received Instruction in Areas One, Two, Three or LOE" (Block 126) on the Guiding and Instructing Responsibilities flow chart of FIG. 17.

XVI. Coached Reading

During the Coached Reading component of the method's tutoring session, the student reads out loud while you read along silently. Symptoms emerge because the neural network built specifically to guide the process of reading is operating inappropriately. You need to respond to them as they occur. The method's feedback is designed to:

1. Let the brain know that its current reading strategies are not producing the desired results.

2. Give the brain information that will influence the direction of its experimentation as it seeks to discover how the process of reading should be conducted.

3. Keep the brain accountable to a high standard of performance even though its own guidance system for reading is instructing it to do otherwise.

SYMPTOMS

Figure 16B:
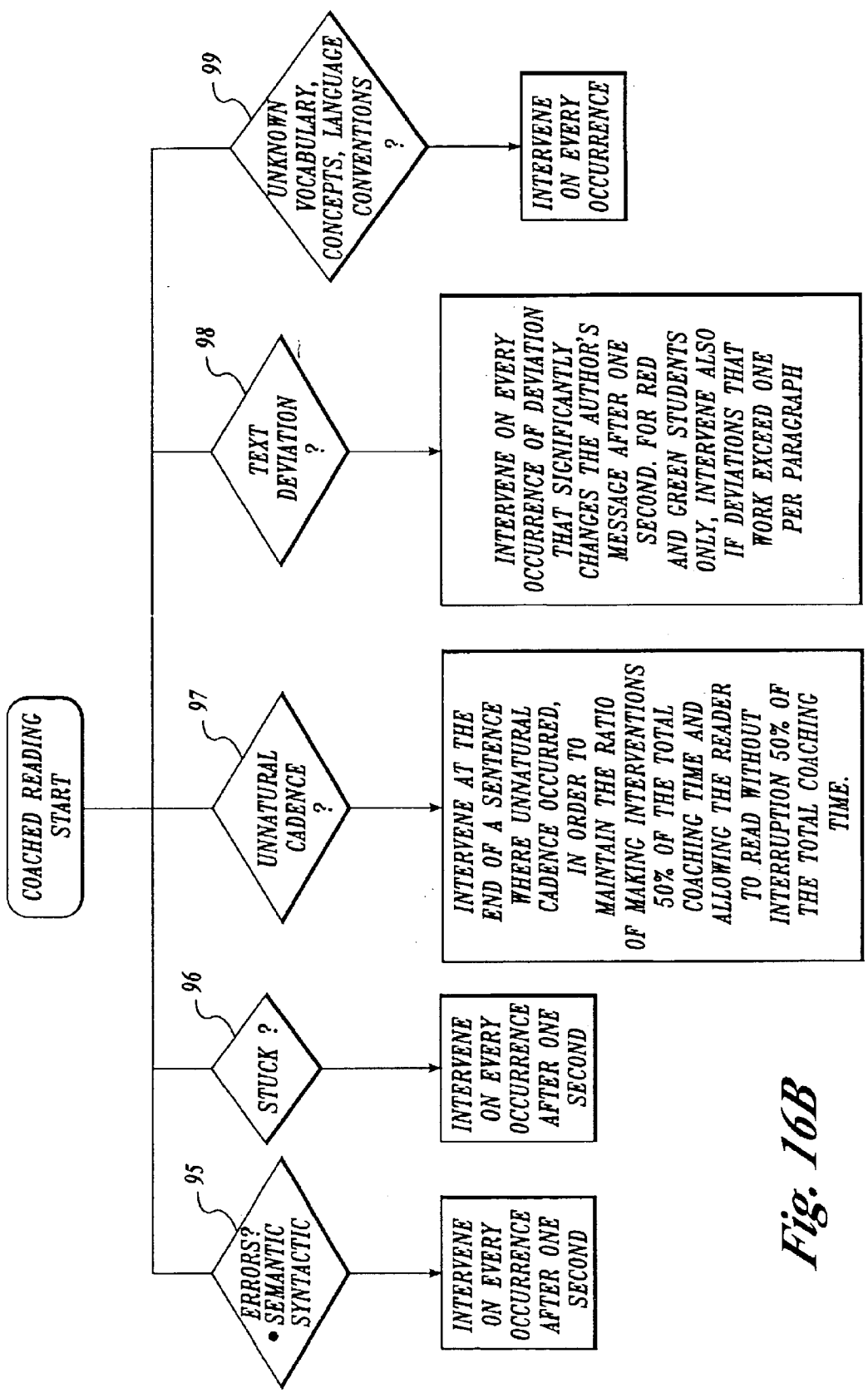
FIG. 16B is a flowchart illustrating the Coached Reading component of the present invention.

Referring to FIG. 16B, during the Coached Reading component of the method there are four categories of symptoms of a reading problem that must be addressed for all readers.

1. Errors—Semantic and Syntactic (coached every occurrence) (block 95)

2. Becoming Stuck (coached every occurrence) (block 96)

3. Unnatural Cadence (coached as needed to regulate the total coaching time) (block 97)

4. Text Deviations That Work (coached only when excessive in the red and green ranges) (block 98)

The procedures for addressing these categories are described below.

ADDRESSING UNKNOWN VOCABULARY, CONCEPTS, AND LANGUAGE CONVENTIONS (Block 99)

Unknown vocabulary, concepts, and language conventions are not symptoms of a reading problem. Nonetheless, they need to be addressed for a student to excellently read text. The interventions for unknown vocabulary words and concepts or unknown language conventions including difficulty in pronouncing a word, misreading punctuation marks, and misreading numbers are described below. For blue through orange students, time spent addressing unknown vocabulary, concepts, and language conventions is counted as part of the student's total Coached Reading time.

THE IMPORTANCE OF TIMING

Correct timing in Coached Reading is vitally important. This is true not only for the tutor's interventions but also for the student's response. The student's brain is guiding the process of reading incorrectly. To get it to change, we must structure an environment where it is not allowed to do things the way it normally does. Quick intervention and demanding a quick response to the intervention is the major tool available in Coached Reading to achieve this goal.

Intervene

One second after the student produces semantic or syntactic errors.

One second after the student becomes stuck.

One second after the student reads to the end of a sentence that you have decided to coach for unnatural cadence.

One second after the student produces excessive text deviations that work. (red and green ranges only)

The student should respond

One second after being told to begin reading the page at the beginning of Coached Reading.

One second after being told to skip a word.

One second after being instructed to re-read a sentence.

If the student does not respond after one second, immediately administer the Stuck Strategy (even if you know the student is not really stuck), which will be described below. This will help him get away from identifying words and into reading correctly based on a predictive strategy.

SEMANTIC ERRORS (Block 95)

Semantic errors cause the text to not make sense. As the student is reading, ask yourself, "Does the reading make sense?" If the answer is, "No," the student has made a semantic error.

The intervention for semantic errors is designed to make the student aware that he has produced language that doesn't make sense. It is sending his brain a message that it needs to integrate what it already knows to be true about the world into the reading process.

WHEN TO INTERVENE

On every occurrence of semantic errors, intervene after one second elapses.

HOW TO INTERVENE

Administer the feedback verbatim.

The Student Reads; "The boy bounced the bell."

A. Tutor Feedback: "That doesn't make sense. Read it again."

B. If the student does not correct the error, repeat step "A". On the student's third unsuccessful attempt proceed to step "C".

C. Correct the error. "You read, 'The boy bounced the bell.'—that doesn't make sense. The text says, 'The boy bounced the ball.' Read it again."

D. Repeat step "C" until the error is corrected.

SYNTACTIC ERRORS (Block 95)

Syntactic errors cause the text to sound funny because they are linguistically incorrect. As the student is reading, ask yourself, "Does the reading sound funny?"If the answer is, "Yes," the reader may have made a syntactic error. Then ask yourself a second question, "Is that the way the reader Would say it if he were talking?" If the answer is, "No," the student has made a syntactic error. If the answer is, "Yes," he has not made a syntactic error.

The intervention for syntactic errors is designed to make the student aware that he has produced language that is incorrect from his own point of view. It is sending his brain a message that it needs to integrate what it already knows, about language into the reading process.

There is a potential for confusion in identifying syntactic errors when you perceive a student's speech characteristics to be reflective of 'poor grammar.' You may interpret the unusual speech patterns as external symptoms of the reading problem, causing you to intervene when you should not. Familiarizing yourself with the student's speech characteristics will enable you to differentiate them from external symptoms.

WHEN TO INTERVENE

On every occurrence of syntactic errors, intervene after one second elapses. If the error reflects the way the reader talks, do not intervene.

HOW TO INTERVENE

Administer the feedback verbatim.

The Student Reads: "The boy bounces ball."

A. Tutor Feedback: "That sounds funny. Read it again."

B. If the student does not correct the error, repeat step "A". On the student's third unsuccessful attempt proceed to step "C".

C. Correct the error. "You read, 'The boy bounces ball.'—that sounds funny. The text says, 'The boy bounced the ball.' Read it again."

D. Repeat step "C" until the error is corrected.

THE STUCK STRATEGY (Block 96)

Becoming stuck is defined as a silence during the reading that lasts for one second or sounding out a word that lasts for one second.

The intervention is designed to prevent the student from using phonics to figure out what words are. It is sending his brain a message that, to read appropriately, it needs to rely on a predictive strategy based on its own prior knowledge.

WHEN TO INTERVENE

Every time the student is stuck, intervene after one second elapses.

HOW TO INTERVENE

Administer the feedback verbatim.

STEP 1

Tell the student, "Skip it and go on." (once per sentence)

When he reaches the first punctuation mark, say, "Read it again."

If you say "Skip it and go on," and the student is silent for more than one second Point to the word he should have skipped to and say, "Start here."

If the student doesn't start reading within one second after you pointed

Proceed to Step 2.

If the student starts reading within one second after you pointed

When he reaches the first punctuation mark, tell him to re-read the sentence.

If you say "Skip it and go on" and the student reads the word instead of skipping it Immediately interrupt his reading. Point to the word the student should have skipped to, and say, "Start here." When he reaches the first punctuation mark, tell him to re-read the sentence.

If you say, "Skip it and go on" at the same time the student says the word

Tie goes to the reader; he should continue reading.

STEP 2

Give meaning based hints

If the student gets the word, say, "Read it again"

If the word is syntactic, proceed to Step Three.

If you can't think of hints within three seconds, proceed to Step Three.

If the student doesn't get the word from your hints in three seconds, proceed to Step Three.

STEP 3

Tell the student the word.

Then say, "Read it again."

NECESSARY DEVIATIONS FROM THE STUCK STRATEGY

Normally, start with Step One of the Stuck Strategy and progress sequentially through Step Three. This is not always possible, as evidenced by the scenarios below. In these situations, do as follows:

SCENARIO #1

The student is stuck a second time or more in the same sentence.

Proceed immediately to Step Two (give meaning-based hints).

SCENARIO #2

The student is stuck on the last word of a sentence.

Proceed immediately to Step Two (give meaning-based hints).

SCENARIO #3

The student skips a word and continues to read but before he reaches the first punctuation mark, he makes an error.

The feedback for the error has precedence. Correct the error using semantic or syntactic feedback one second after the error occurred.

SCENARIO #4

The student may not be stuck—you may know or suspect he has encountered an unknown vocabulary word.

If you know he doesn't know the vocabulary word

Stop coaching and proceed to Unknown Vocabulary and Concepts in the "Addressing Unknown Vocabulary, Concepts, and Language Conventions" section below.

If you suspect he doesn't know the vocabulary word

Ask the student if he knows, and if he doesn't, stop coaching and proceed to Unknown Vocabulary and Concepts in the "Addressing Unknown Vocabulary, Concepts, and Language Conventions" section below.

A SPECIAL COACHING TECHNIQUE FOR RED AND GREEN RANGE STUDENTS WHO ARE FREQUENTLY STUCK AND/OR READING WORD-BY-WORD

Productive coaching is not possible if the student is unable to integrate information for predicting and confirming. When a red or green range student is reading word-by-word and/or is frequently stuck, follow the process below.

Prior to the student's reading the page for Coached Reading, engage the student in a conversation about one or more of the following: the picture; what has happened thus far in the story; and what is happening in the 4-page set Sometimes transition back to the page by saying: "Now on this page, the author will tell you__". Generalize about the specific content of the page.

UNNATURAL CADENCE (Block 97)

Unnatural cadence interrupts the natural flow of language and includes inappropriate tonal quality, enunciation irregularities, unnatural pausing, repeating correctly read text, effort-full reading, rushed reading, cautious reading, and inappropriate rhythm.

The intervention for coaching unnatural cadence is designed to enhance the predictability of the text so the cadence symptom will diminish. The brain is held accountable to produce reading that does not generate a substantial feeling of discomfort. The more comfortable the read, the closer the brain is to doing the implicit process correctly.

Every student with a reading problem, no matter how severe or how mild, will display unnatural cadence characteristics in his reading. The last symptom of the reading problem to disappear will be a cadence characteristic—usually either pausing or a tonal discrepancy. The pervasiveness of unnatural cadence requires you to regulate the total coaching time.

The combination of your feedback and the student's self-correcting should be occurring approximately half of the Coached Reading time. The student should be reading freely, without instruction or self-correction, the other half of the time. Choosing whether to coach cadence on any given sentence to maintain this balance requires you to know when you're over-coaching or under-coaching.

WHEN TO INTERVENE

Intervene at the end of a sentence where unnatural cadence has occurred according to the criteria explained below.

Intermittently coach unnatural cadence on different sentences until the combination of your total coaching feedback and the student's self corrections constitute 50% of the Coached Reading time. Give priority to sentences where the unnatural cadence falls below the student's normal performance standard. As the student's reading problem diminishes, there will be fewer incidents of errors, being stuck, and text deviations that change the meaning of text, and there will be more time (up to 50% of the Coached Reading time) available for the tutor to intervene on unnatural cadence. Eventually, the tutor will intervene at every incident of unnatural cadence and still will be interrupting the student's reading for far less than 50% of the Coached Reading time.

USING A STUDENT'S "NORMAL" UNNATURAL CADENCE STANDARD TO DETERMINE WHICH SENTENCE TO COACH

When a student is reading in the Coached Reading component, you need to identify what his "normal" unnatural cadence characteristics are in order to know what particular sentence to coach. Whenever the student reads below his norm, you should coach cadence—but only if you can do so without over-coaching. To prevent under-coaching, you may have to coach unnatural cadence in sentences that are equal to the student's norm.

As the student's reading problem diminishes, the amount of unnatural cadence he normally displays will decrease. When this occurs, your concept of what constitutes "normal" cadence for that reader will shift, and your decisions about which sentence to coach will be based on the new concept of "normal." Eventually you will have to coach unnatural cadence every time it occurs in order to maintain the guideline of coaching 50% of the time. Soon after, you will find that you can no longer meet the guideline because your student is not displaying enough unnatural cadence. The concept of over- and under-coaching will no longer apply, and your decision of when to coach unnatural cadence will be simplified. You will intervene on occurrence—just as you do for errors and for becoming stuck.

HOW TO INTERVENE

Do not expect (or require) your student to read the sentence excellently. Coach unnatural cadence repeatedly on the same sentence until the student reaches his normal performance standard. If you are coaching a sentence that was equal to his normal performance standard, coach repeatedly on the same sentence until you notice improvement.

Tutor Feedback

"Read it again so it's more comfortable." (Use this feedback verbatim.)

On the student's third unsuccessful attempt to decrease the unnatural cadence, name symptoms.

A. Use additional feedback for symptoms as below. Tutors may create other appropriate feedback remarks as needed.

"You're rushing. Slow it down."

"You're blowing through the punctuation."

"Speed it up a little."

"I'm hearing a tonal issue. Read the sentence again."

"You're saying__unnaturally."

OR

B. Model symptoms. Use this feedback verbatim. "You read like this, '__.' You should read like this, '__.' Read it again."

DEVIATIONS FROM THE TEXT (Block 98)

One challenge when dealing with deviations from the text during the Coached Reading Component is to determine whether a particular deviation is acceptable.

DEVIATIONS THAT DON'T WORK REQUIRE COACHING IN ALL RANGES

A deviation that doesn't work is one that results in a sentence that doesn't make sense (semantic error), sounds funny because it is linguistically incorrect and doesn't reflect the way the student talks (syntactic error), or significantly changes the author's message in the paragraph.

The intervention for a deviation that significantly changes the author's message is designed to prevent the student from making predictions that stray too far from the meaning in the paragraph. It is sending his brain a message that it needs to integrate a confirmation strategy into the reading process.

WHEN TO INTERVENE

To know when to intervene on deviations that result in a semantic or syntactic error, see the Semantic Errors or Syntactic Errors sections above.

On every occurrence of a deviation that significantly changes the author's message in the paragraph, intervene after one second elapses.

Guidelines for judging whether a deviation significantly changed the meaning of the paragraph.

Typically a deviation seems unacceptable if you look at only the sentence, but if you consider the message in the paragraph, the deviation works.

An example of this can be found in the green range assessment story, "The Singer." The last sentence says, "When he started again, she quietly left the room." Students frequently substitute quickly for quietly. That deviation changes the meaning of the sentence quite dramatically, but it has an insignificant effect on the meaning of the paragraph. The deviation, therefore, is acceptable.

Although it happens infrequently, the deviation sometimes significantly changes the meaning at the sentence level.

If the text says, "She is a good person." And the student reads, "She is a bad person." It really doesn't matter what the paragraph says. We know that the change is significant.

HOW TO INTERVENE

Semantic and Syntactic Errors

Refer to the Semantic Errors or Syntactic Errors sections above.

Significant Change in the Meaning of the Paragraph

Administer the feedback verbatim.

A. Tutor Feedback

"You changed the text. Read it again."

B. If the student does not correct the deviation or makes another deviation in the same sentence, repeat A. On the student's third unsuccessful attempt, proceed to C.

C. Correct the deviation

"You read, '__'. The text says, '__'. Read it again." Read in a normal tone without emphasizing the place where the deviation occurred in the sentence. Continue until the student no longer deviates.

DEVIATIONS THAT WORK SOMETIMES REQUIRE COACHING DEPENDING ON THE RANGE

Deviations that work are those that result in a sentence that makes sense, is linguistically correct (doesn't sound funny) or reflects the way the student would say it if he were talking, and does not significantly change the author's intended meaning.

To read excellently, the reader must predict the author's message, and he must confirm or reject the prediction when there is sufficient uncertainty by integrating additional information, usually from the phonics system. If he is certain he has predicted correctly, he does not confirm the prediction. This accounts for text deviations. The reader may not always use the same language the author did to express the predicted meaning.

Allowing deviations that work helps the student learn to trust his predictions without feeling a necessity to confirm each and every one. Readers who feel a need to confirm every prediction will read slowly because it takes time to integrate the phonics information needed to confirm or reject the prediction.

The unsophisticated nature of their predictive and confirming strategies can lead students in the red and green ranges to over-rely on memorization techniques. It is important to insist that they integrate phonics information into their strategies—not to figure out what words are, but to assist in predicting and confirming. Allowing limited deviations that work is the tool we use to force them to integrate phonics into their strategies.

Students in blue through orange ranges are working on paragraphs that are complex enough to prevent memorization from being a viable strategy. The danger for them is that they will over-confirm predictions because they think they are supposed to use the same language the author does. Allowing all deviations that work encourages them to confirm only when they need to and to deviate from the author's language while preserving the author's message.

WHEN TO INTERVENE

On every occurrence of excessive deviations that work for red and green range students, intervene after one second elapses.

If your student is in the red or green range

Accept one deviation that works in each paragraph. The second is excessive. When a deviation requires additional changes in the text to make the original deviation work, it is counted as one deviation. For example: The Text says, "The mallard ducks have beautiful feathers on their heads," and the student reads, "The mallard duck has beautiful feathers on its head."

If your student is in the blue, lime, purple, yellow, or orange range

Accept all deviations that work.

HOW TO INTERVENE

Administer the feedback verbatim.

A. Tutor Feedback (for the red and green ranges only)

"You changed the text. Read it again."

B. If the student does not correct the deviation or makes another deviation in the same sentence, repeat step "A". On the student's third unsuccessful attempt, proceed to step "C".

C. Correct the deviation

"You read,'__'. The text says, '__'. Read it again." Read in a normal tone without emphasizing the place where the deviation occurred in the sentence. Continue until the student no longer deviates.

ADDRESSING UNKNOWN VOCABULARY, CONCEPTS AND LANGUAGE CONVENTIONS (Block 99)

The interventions for unknown vocabulary words and concepts or unknown language conventions are designed to be administered step-by-step. When they occur during Coached Reading, immediately stop coaching, find the intervention that you need to use, as described below, and administer it virtually verbatim.

For blue through orange students, time spent addressing unknown vocabulary, concepts, and language conventions is counted as part of the student's total Coached Reading time.

UNKNOWN VOCABULARY AND CONCEPTS

If the student is confused about the meaning of a paragraph because of unknown vocabulary or concepts, he is unlikely to read his best. It is important to remove this potential source of difficulty so you can be certain that any symptoms that emerge is a result of the faulty operation of the implicit reading process and not a result of confusion over meaning.

You may suspect that the student isn't "getting" the meaning from his body language, facial expression, or strange inflections as he is reading. If so:

A. Stop coaching.

B. Ask the student if he knows the meaning of each vocabulary words or concept you think he may not know.

If he knows

Resume coaching.

If he doesn't know

1. Conduct a Language Acquisition Discussion (LAD). Specifically, define the vocabulary word or the concept, explain the vocabulary word or the concept outside the author's context, and tie the vocabulary word or concept back into the author's context by explaining its use in the paragraph. You can choose to expand your explanation to include a brief summary of the paragraph, or in some cases a summary of more than the paragraph.

2. Resume coaching.

When you respond to the student who needs the intervention, the other students immediately begin reading paragraphs they have already worked on and continue doing so until you resume working with all the students.

Note: If you are spending too much time on Language Acquisition Discussions, move the student to a new book in the same range. If the pattern continues, move him to the next lower range. If the student is moved down a range due to vocabulary and/or conceptual difficulties, do not move him back up. The new range will be his graduation range. His reading problem will be eliminated faster if his brain is not confronted with issues unrelated to the reading problem such as unknown vocabulary and concepts.

ADDRESSING UNKNOWN LANGUAGE CONVENTIONS PROBLEMS PRONOUNCING A WORD

If you are reading silently and come across a word you cannot pronounce, you most likely "slide" over it. But if you are reading out loud and you come to a word you cannot pronounce, you become very uncomfortable because you are expected to do something you cannot. This is quite disruptive to reading and can be a source of anxiety for the student. Therefore, if you can spend a little time helping students pronounce words they are having trouble with, you decrease their anxiety.

Limited time is spent addressing pronunciation issues because it is unrelated to the reading problem. If the student doesn't learn how to pronounce the word in a reasonable time, it is better to move him to the next paragraph even though he hasn't learned how to pronounce it. The student will eliminate his reading problem faster if he is working on paragraphs that do not contain pronunciation issues.

If your student asks you how to pronounce a word, or if he encounters unusual proper nouns or an unknown vocabulary word that he is unable to pronounce, help him learn to pronounce it by using the following process.

A. Stop coaching.

B. Pronounce the word and then briefly discusses the meaning of the word, or if it's a proper noun, ask the student if he has ever heard of the person or place. If not, and if you have, tell him briefly about the person or place. If you don't know how to pronounce the proper noun, say so, and agree on an easier pronunciation. For example, Pete or even P would be an easier pronunciation for Piaget.

C. Pronounce the word again.

D. Say to the student, "Say it."

If he pronounces the word correctly

Say, "Again" until he has pronounced the word correctly three times consecutively.

On the student's third consecutive unsuccessful attempt, proceed to step "E".

If he mispronounces the word

Repeat steps "C" and "D" until he has mispronounced the word three times consecutively. It may be helpful to help the student pronounce one syllable at a time and then put them together. Another helpful technique is to explain to the student where he should place his tongue to pronounce the word correctly.

On the student's third consecutive unsuccessful attempt, proceed to step "E".

E. Resume coaching. If the student mispronounces the same word in a different sentence, you can give a brief assist, disregard it, or agree on an easier pronunciation and then resume coaching.

PROBLEMS READING PUNCTUATION MARKS

Students who have avoided reading because of reading problems have not become familiar with the convention of punctuation marks in written language. They don't understand that punctuation marks help convey the meaning, so they fail to read them appropriately. The result will often be a failure on the part of the student to fully understand the meaning, which is often made obvious by erroneous tonal patterns in the oral reading, indicating the reader didn't correctly interpret hierarchical relationships between and among clauses and phrases. You will not return to coaching until the student reads the punctuation correctly.

You will know the student is reading the punctuation mark incorrectly if his tone is off or if he neglects to pause appropriately. In the example below, drop your tone to read the dashes successfully.

A. Stop coaching.

B. Correct the student by modeling.

Say to the student, "I'm going to model how you misread the punctuation mark. 'Judging by your appearance which is very nice I would say you're going to church.'"

Then say, "Now I'm going to model how it should sound. 'Judging by your appearance—which is very nice—I would say you're going to church.'"

C. Say, "Now I want you to read the sentence again."

If the student misreads the punctuation mark

Repeat steps "B" and "C" until he reads it correctly, and then proceed to step "D".

If the student reads the punctuation mark correctly Proceed to step "D".

D. Resume coaching.

When addressing problems reading punctuation marks, implement the Productivity Guidelines, described below in Chapter XVII, with the other students in the group.

PROBLEMS READING NUMBERS

A reader sometimes has trouble knowing how numbers should be said. We wouldn't expect this to be the case in most instances, but if the numbers are outside the readers range of familiarity it can happen. This will cause disruptions in the reading that could be interpreted as a cadence issue. It is important to teach the student how to say the number correctly, thereby eliminating this disturbance that is unrelated to the implicit process of reading. You will not return to coaching until the student reads the number correctly.

The student may not know how to properly read large numbers, decimals, fractions, or, in the example below, Major League baseball batting averages.

A. Stop coaching.

B. Correct the student by modeling.

Say to the student, "I'm going to model how you misread the numbers. 'Mitch Meluskey hit fifty-five six this spring for the Houston Astros.'"

Then say, "Now I'm going to model how it should sound. Mitch Meluskey hit five fifty-six this spring for the Houston Astros.'"

C. Say, "Now I want you to read the sentence again."
If the student misreads the number
Repeat steps "B" and "C" until he reads it correctly, and then proceed to step "D".
If the student reads the number correctly
Proceed to step "D".
D. Return to coaching.
When addressing problems reading numbers, implement the Productivity Guidelines, described below in Chapter XVII, with the other students in the group.

XVII. Managing the Session

FORMING TUTORING GROUPS

Once the consultations are completed, the students are organized into tutoring groups.

Experienced tutors can tutor three students per group for the red and green ranges and four students for the blue through orange groups. Groups requiring mixed methodologies are limited to three students.

Less experienced tutors should have one fewer student than the normal number. This means red, green, and mixed methodology groups will be limited to two students, and blue through orange groups will be limited to three students.

A. Schedule any combination of blues, limes, purples, yellows, or oranges together without any greens or reds in a single group. This way, the session is much easier to manage, and the productivity of the students will be maximized.

B. Schedule all reds or all greens in a single group. Keep lower reds in one group and higher reds in another group. Keep lower greens in one group and higher greens in another group.

C. Sometimes scheduling constraints require you to combine different methodologies in the same group. In such case, never have more than two methodologies in a single group. If you have to mix two different methodologies in a single group, limit the group size to three students. When this occurs, special management techniques are required. Proceed to the "Managing the Excellent and Coached Reading Components in Mixed Methodology Groups" flow charts (FIGS. 27–29) for directions.

MANAGING THE GUIDING CHECK LIST WITH MULTIPLE STUDENTS

Administering the Guiding Check List (FIG. 19) for multiple students requires additional directions.

A. If more than one student is ready to read out loud at the same time, listen to each one successively until all the reads are judged. Implement the Productivity Guidelines described below.

B. If two or more students do not achieve excellence in ten minutes, proceed to LOE instruction (FIG. 24, paragraph XV above) with all of the students who need it simultaneously. Blue through orange range students each use their own book.

MINIMIZING DOWN TIME

It is your responsibility to keep all the students productively engaged at all times during the tutoring session. This section offers you guidelines for doing so by providing four management techniques—efficiency guidelines, productivity guidelines, the student reader process, and the half cycle process.

EFFICIENCY GUIDELINES

The instructions for maximizing efficiency will result in serving more students during the school-year. Familiarize yourself with the guidelines.

Students' wasting time by being off-task during a session cannot be tolerated. Many students are waiting to come into the methodology's program. and it isn't fair to them if students aren't maximizing their tutoring time.

A. The students must quickly get to work at the beginning of each session.

B. If the student takes longer than three minutes to choose a new book, choose three books from the library, and let him make the final selection.

C. If the student has selected a book for the Excellent Reading component that has several selections within one book, have the student work on them sequentially. (Skipping selections takes too long to find the right place on the tape.) He may choose another book any time he finishes a selection.

D. Do not waste the students' time by excessively chatting with them.

PRODUCTIVITY GUIDELINES

When you must interact individually with a student in the tutoring group, all students need to be productively involved in activity that will contribute to eliminating their reading problems. The productivity guidelines describe how to keep them involved.

The productivity guidelines are to be implemented whenever:

Two or more students knock simultaneously

Then, pick one student to listen to, and ask the other(s) to re-read silently the paragraph he is ready to read out loud until you return to judge his read. If the wait is going to be short, you can choose to have him wait quietly for your return.

OR

A student knocks while you're coaching a blue student, or tutoring the red or green methodology in a mixed methodology group Then, decide whether to immediately respond to the knock or to wait a few moments (no more than two minutes) for a more appropriate place to interrupt the student(s) you are working with.

When you turn away from the student you have been working with to respond to the knock, he should begin re-reading paragraphs he has already worked on and continue doing so until you resume working with him. If the wait is going to be short, you can choose to have him wait quietly for your return.

As soon as the student who knocks knows you are not immediately going to respond to his knock, he should begin re-reading silently the same paragraph he is going to read out loud. He continues doing so until you tell him to read out loud. If the wait is going to be short, you can choose to have the student wait quietly for your return.

OR

You need to address unknown vocabulary, concepts, or language conventions in the coached reading component with red and green students Then, decide whether to immediately address the vocabulary, concept, or language conventions or to wait a few moments for a more appropriate place to interrupt the group.

When you turn away from the group to address the unknown vocabulary, concept, or language conventions, the students should begin re-reading paragraphs they have already worked on and continue doing so until you resume working with them. If the wait is going to be short, you can choose to have the students wait quietly for your return.

THE STUDENT READER PROCESS (FOR RED AND GREEN STUDENTS)

When students in the red or green range do not achieve excellence at the same time, a student reader is appointed.

Scenario #1

One student achieves excellence and the others need more cycling

The student who achieved excellence becomes the student reader, reading the first cycle. You read the next one. Instruct the student reader to read silently with you every time you read out loud.

Repeat until one or both students achieve excellence. If one student achieves excellence before the other one, proceed to Scenario #2.

Immediately after the student reader finishes reading out loud for the other student, he needs to judge his own read and signal his conclusion. (The Guiding Check List, FIG. 19, is not used with the student reader.) If he thinks it wasn't excellent, the student reader shakes his head no, quietly says, "no," or displays a "thumb down." _If the student doesn't quickly give the signal, ask, "Was it excellent?"

If he thinks it was excellent, the student reader nods his head yes, quietly says, "yes," or displays a "thumb up." _If the student doesn't quickly give the signal, ask, "Was it excellent?"

After the student reader signals, tell him if you agree. If you agree, quietly say, "I agree." You can quietly administer a guiding remark but not a technique. If you disagree, quietly say, "I disagree." You can quietly administer a guiding remark but not a technique. If you are uncertain quietly say, "I'm not sure." Do not have the student reader re-read the paragraph.

By judging his own reading and knowing whether the tutor agrees with him, the student reader is held partially accountable for his read even though the outcome of the judgment (either excellent or not excellent) will not influence his role as a student reader.

If a student gets a third check mark in Areas One, Two, or Three or a single check mark in LOE in Guiding Check List (FIG. 19), proceed to the "For Students who Do Not Need Instruction" (Block 118) on the Guiding and Instructing Responsibilities flow chart of FIG. 17 to implement the "half-cycle" process for the rest of the students (in red and green ranges), as more fully described below. For the student who needs instruction, go to block 120 and administer the corresponding instruction set as described above in Chapters XII–XV.

Scenario #2

Two students achieve excellence and the other needs more cycling

Choose one student who achieved excellence to become the student reader, reading the first cycle. The other student takes the next cycle, and you read the third cycle. When it is not a student reader's turn to read, instruct him to read silently with you or the other student reader.

Repeat until the one student who hasn't achieved excellence achieves it.

If the student gets a third check mark in Areas One, Two, or Three or a single check mark in LOE in the Guiding Check List (FIG. 19), proceed to the "For Students who Do Not Need Instruction" (Block 118) for the rest of the students, and proceed to block 120 for the student who needs the instruction, on the Guiding and Instructing Responsibilities flow chart of FIG. 17.

THE HALF-CYCLE PROCESS

The half-cycle process is implemented with red and green students when you need to administer instruction during the Excellent Reading component. It is also used when you coach a blue through orange student in a mixed methodologies group, or when tutoring the red or green methodology in a red/green mixed methodologies group.

DIRECTIONS FOR THE HALF-CYCLE PROCESS

A student silently reads a paragraph (or sentence) over and over until excellence is achieved. He then knocks, signaling that he is ready to read out loud. After he reads out loud, ask him if it was excellent. Then tell him whether you agree. If you both agree the reading was not excellent or if you disagree with the student's judgement, have him continue half-cycling the same paragraph. If you both agree the reading was excellent, have him half-cycle the next paragraph. (If you are uncertain, ask the student to read the paragraph out loud until your uncertainty is resolved.) Students continue half-cycling until instruction, coaching, or tutoring red or green students in a mixed methodologies group is finished.

Beginning the Half-Cycle Process

A. Begin the half-cycle process on the same paragraph (or sentence) that the group is on when you stop tutoring to put them on half-cycles. If one of the student(s) has already achieved excellence on the paragraph, begin the half-cycle process with all students in the group who need it on the next paragraph. Cycle the paragraph (or sentence) one time only if you think the student(s) need help reading it.

B. Note in the margin of the Guiding Check List (FIG. 19) the page number where the students first started half-cycling so you will know where to begin tutoring all red or green students in the group when you finish instructing, coaching a blue student in a mixed methodology group, or tutoring the red or green methodology with students in a red/green mixed methodologies group.

C. Proceed to instruction, coaching a blue-orange student in a mixed methodology group, or tutoring the red or green methodology with students in a red/green mixed methodologies group.

MANAGING THE EXCELLENT AND COACHED READING COMPONENTS IN A SINGLE OR MIXED METHODOLOGY GROUP

FIGS. 25–29 are flow charts for Managing the Excellent and Coached Reading Components in a Single or Mixed Methodology Group, and are designed to be administered step-by-step. When you begin tutoring a new group, select the appropriate Managing the Excellent and Coached Reading Components in a Single or Mixed Methodology Group flow charts (FIGS. 25–29) and position it where it will be easily accessible for reference as you are tutoring.

Figure 18A:
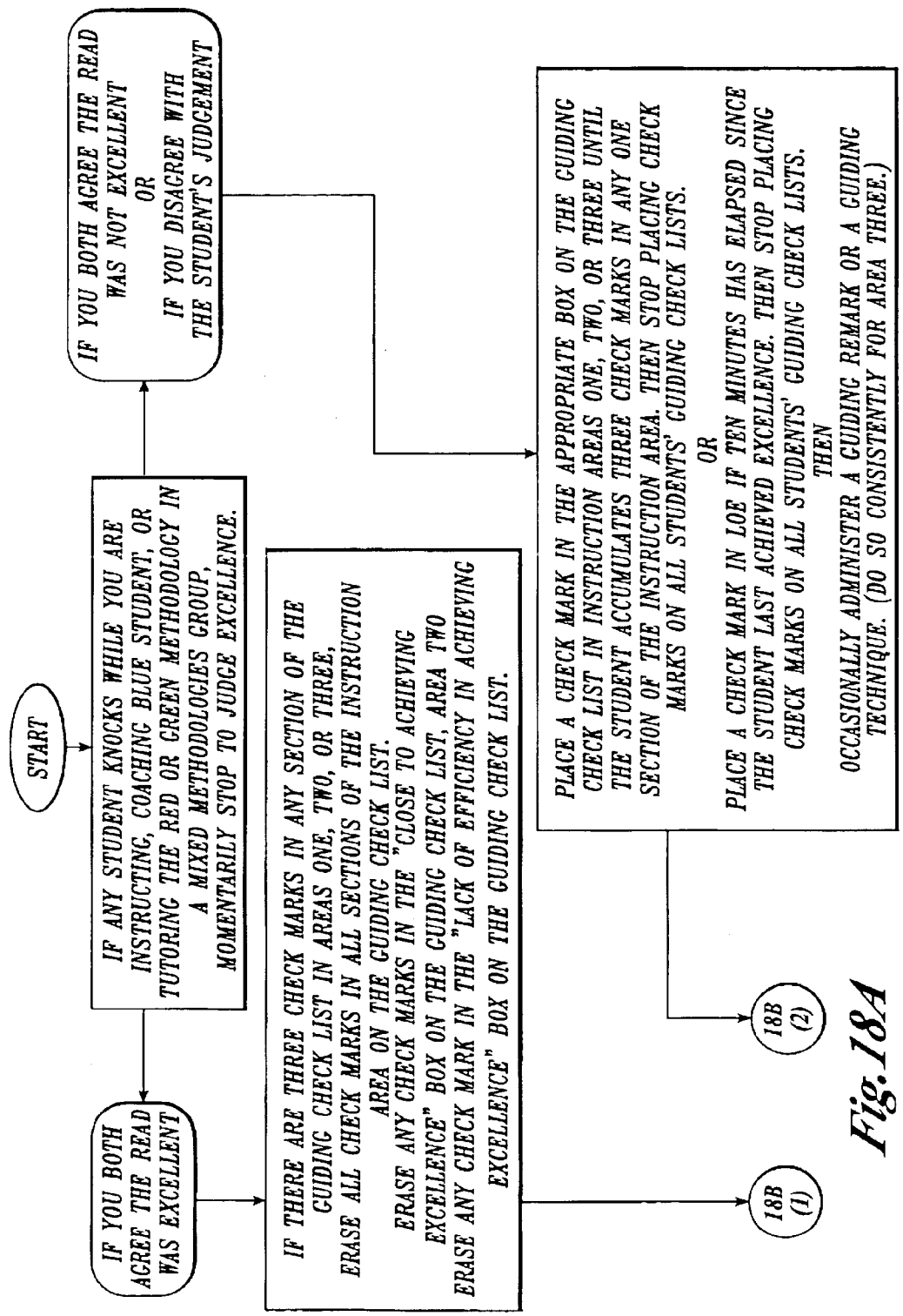
FIGS. 18A and 18B are flowcharts illustrating the steps a tutor follows when tutoring a plurality of students, specifically when one student indicates by knocking that he is ready to try reading excellently out loud while the tutor is engaged in tutoring another student (hereinafter collectively referred to as FIG. 18)
Figure 18B:
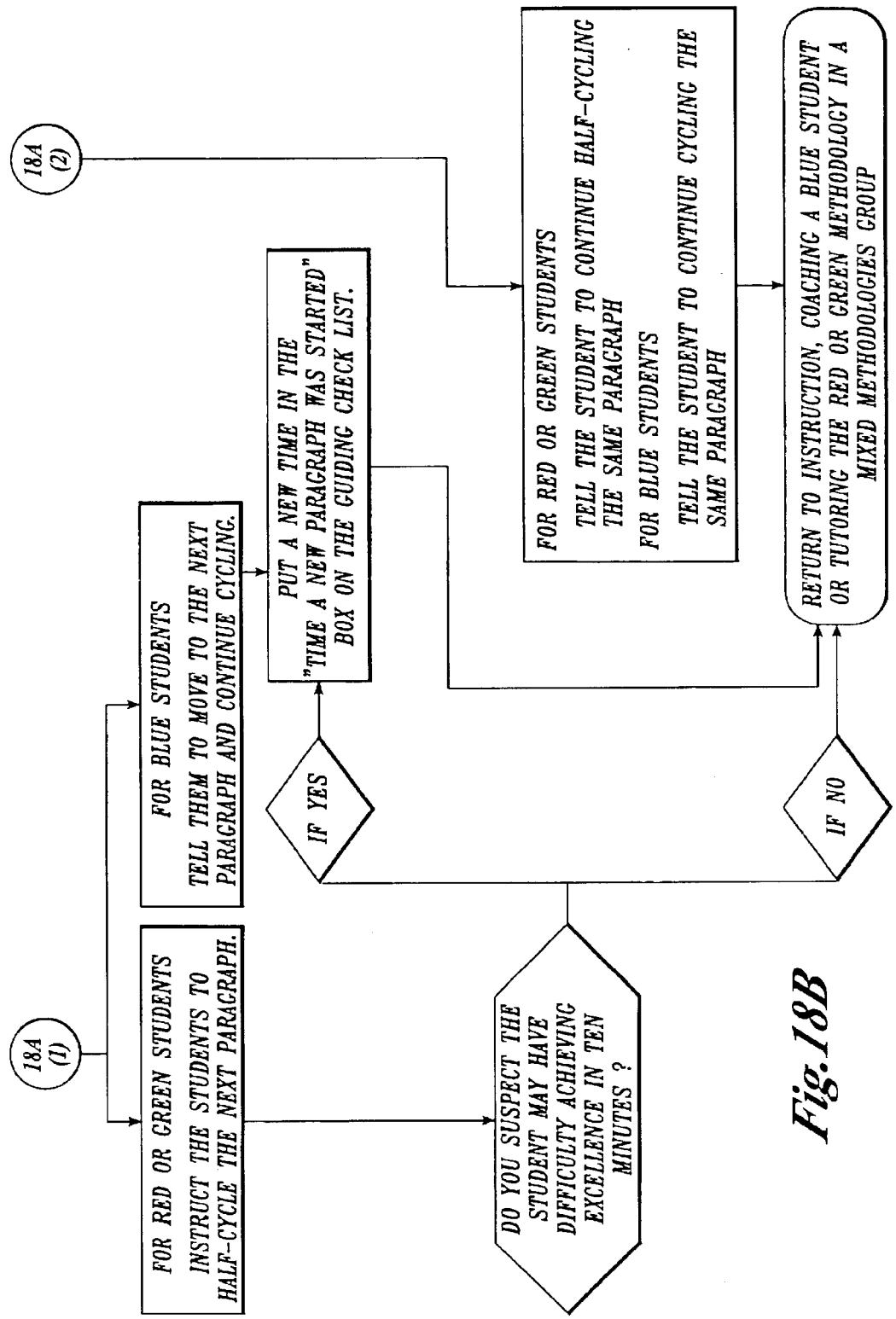

Referring to FIG. 17, when a student receives a third check mark in Areas One, Two, or Three or a single check mark in LOE in the Guiding Check List (blocks 116 and 108), start red and green students who do not need instruction in the half-cycle process (described above) and have any blue-orange students who do not need instruction continue cycling undisturbed (Block 118). While you are instructing the student (block 120), any of the students who is not receiving instruction may indicate that he is ready to read excellently out loud (block 122). In such a case, proceed to the flow chart of FIG. 18 titled "Guiding Students Who Knock" and momentarily stop your instruction to listen to the reading by the student who knocked. Proceed as illustrated in FIG. 18.

Still referring to FIG. 17, once you finish instructing the student (block 124), proceed to block 126 and erase all the Check Marks on his Guiding Check List (FIG. 19) in all sections of the Instruction Area just completed. Write a new time in the "Time a New Paragraph Was Started" box in the Guiding Check List. Thereafter, in block 128, if any other students need instruction, return to block 118 and proceed to administer instruction to the student (block 120). Otherwise, return to "Begin Guiding" (block 100).

XVIII. Moving the Student

The methodologies are designed to promote the appropriate degree of struggle for the participants involved. If the struggle is too severe, the brain tends to retreat to the comfort zone of its old strategies even though they aren't working very well. As a result, progress is slowed. If the struggle is too mild, the brain is less likely to perform radical experiments in its attempts to figure out reading, and progress is also slowed. As the student becomes a better reader, the degree of struggle in the current range diminishes and eventually becomes inadequate for challenging the brain. Moving the student to an appropriate level of text complexity will re-establish the best environment for the brain to quickly do the work of remodeling its guidance system for reading.

A. ADVANCING TO A HIGHER RANGE

In order to advance the student to the next range, the student must pass the criteria in Excellent Reading, Coached Reading, and the Symptom Reduction Analysis (SRA).

Excellent Reading

The student is consistently achieving excellence after one or two cycles. This criterion must be met with harder books in the range (longer paragraphs or smaller print)

Coached Reading

The frequencies of the student's symptoms have decreased. This criterion must be met with harder books in the range (longer paragraphs or smaller print) Some categories of symptoms may have disappeared altogether.

Symptom Reduction Analysis (SRA)

The tutor administers a Symptom Reduction Analysis to the student in his current range. Analyze the results as if this were an initial consultation. If necessary, reference the "Symptom Reduction Analysis" section (in Chapter III above) to assist you in analyzing the results.

If the results indicate his current level is too difficult for a placement, keep him where he is.

If the results indicate anything else, use your experience and judgment to make the decision. If you think he should be moved up, move him up. If you are uncertain, try him at the next higher range and see how he does. Make sure the student understand it is a trial.

Choosing Books for Excellent Reading and Coached Reading after Advancement

Care should be taken to insure that your student's first few tutoring experiences at the new range are conducted in books that have larger print or shorter paragraphs than some of the others at the same range. This will "ease" the student into the increased complexity of the text at the new range.

B. RETREATING TO A LOWER RANGE

Excellent Reading

When the student does not achieve excellence in ten minutes, he receives a check mark in the "Lack of Efficiency in Achieving Excellence" box on the Guiding Check List (FIG. 19). You will proceed to instruction (in Chapter XV) and move the student to a lower range if the instruction guides you to do so.

You may know the student needs to be moved to a lower range of text complexity before he exceeds the ten-minute interval. You can use an LOE guiding technique and move the student down a range. Make sure to reference the technique if you are unfamiliar with it.

If you move a student down but think the new range is too easy, follow the "Advancing to a Higher Range" criteria described above again. If he should be moved up, move him back up.

Coached Reading

The student's performance in Coached Reading is not used to determine whether to move a student down. If the student displays a pattern of exceeding the ten minute interval during instruction for LOE, he must move down regardless of how he is doing in Coached Reading.

CAUSES OF DISCREPANCIES IN PERFORMANCE BETWEEN EXCELLENT READING AND COACHED READING

The following weaknesses when tutoring in the Excellent Reading Component causes discrepancies in the student's performance between Coached and Excellent Reading and slows his improvement.

1. Judging excellence incorrectly
2. Inconsistently performing guiding and instructing responsibilities
3. Over administering guiding remarks and techniques
4. Under administering guiding remarks and techniques The following weaknesses when tutoring in the Coached Reading Component causes discrepancies in the student's performance between Coached and Excellent Reading and slows his improvement.

1. Missing opportunities to coach
2. Giving incorrect feedback
3. Failing to deliver feedback in a timely manner
4. Failing to hold the student accountable for responding to the feedback in a timely manner
5. Over coaching cadence
6. Under coaching cadence If you are not feeling 100% confident in all aspects of the methodology's tutoring process, studying relevant sections, setting an expectation to improve, and experimenting during live sessions will yield positive results.

XIX. Graduation

A student is ready to graduate from the methodology when his reading problem has been eliminated. You will eventually have a sense that the student is an excellent reader and will notice that he is reading excellently in the Coached Reading component. When this occurs, implement the graduation process.

The Graduation process is designed to be administered step-by-step. You will always use the Graduation Check List, a sample of which is shown in FIG. 30, whenever you attempt to graduate any student.

DIFFERENCES BETWEEN SYMPTOMS AND DISTURBANCES

To determine if a student is an excellent reader, you have to know the difference between symptoms and disturbances.

SYMPTOMS

Symptoms are disruptions in the reading that are the result of the erroneous operation of the neural network that implicitly controls reading. They include Errors—Semantic and Syntactic
Unnatural Cadence
Excessive Self-Corrections
Excessive Re-Starts

DISTURBANCES

Disturbances are disruptions in the reading that sound like symptoms and can be misinterpreted as such, but they are not caused by a faulty guidance system. Rather, they are caused by unknown vocabulary or proper nouns, pronunciation issues, problems in the text, or nervousness.

Disturbances that are easily differentiated from symptoms.

There are unknown proper nouns or unknown vocabulary words in the text.

The reader cannot pronounce a word in the text.

Disturbances that are difficult to differentiate from symptoms

The author's sentence structure is awkward.
The author's message is unclear.
The graduation process is causing nervousness.

If you think a disruption in the reading is caused by the student's nervousness, count it as a symptom.

This prevents you from erroneously assuming that symptoms are disturbances caused by nervousness. As the student repeats the graduation process, he will become less nervous and disruptions of this type will not occur.

To insure that the student is not graduated when he still has a reading problem, it is very important that you identify a disruption in his reading as a disturbance rather than a symptom only if you are certain it is not a symptom.

Excellent readers display no symptoms, but they may display disturbances. Because disturbances can be difficult to identify, it is feasible that you may identify a disturbance as a symptom. For this reason, the graduation process allows a minimal number of (for example, three) "symptoms" to occur. This provides a safety net that makes it unlikely that a student will be judged 'not an excellent reader' if he is an excellent reader by a tutor calling a disturbance a symptom. On the other hand, if he is not an excellent reader, the student will display a pattern of symptoms, and you will sense that something about the reading did not "feel right."

THE RELATIONSHIP BETWEEN GRADUATION AND GRADE-LEVEL

To understand the relationship between graduation and grade-level, it is necessary to examine the concept of grade-level and the concept of graduation from the perspective of method's theory.

DETERMINATION OF GRADE-LEVEL

Think of grade-level as a measure of the complexity of the text. Grade-level designations are determined by applying a readability formula. There are different readability formulas available, and they all reflect the same underlying assumptions.

The longer the words, the more complex the text

The longer the sentences, the more complex the text

The more complex the text, the better the reading ability required to read it

RANGES IN THE LIBRARY

A range refers to the grade-level divisions in the method's library. Every book is assigned a grade-level designation determined by a computerized readability analysis, using multiple readability formulas. If it is short enough, an entire book is analyzed. If not, a minimum of six 100-word samples are analyzed. To qualify to be included in a library, at least 80% of the readability samples must fall within a single range.

The ranges are each composed of two grade-levels and are color-coded for easy identification. They include Red=early $1^{st}$ and $1^{st}$ grade
Green=$2^{nd}$ and $3^{rd}$ grades
Blue=$4^{th}$ and $5^{th}$ grades
Lime=$6^{th}$ and $7^{th}$ grades
Purple=$8^{th}$ and $9^{th}$ grades
Yellow=$10^{th}$ and $11^{th}$ grades
Orange=$12^{th}$ grade and college

TRADITIONAL ASSUMPTIONS ABOUT GRADE-LEVEL

The grade-level of a book is assumed to reflect the reading ability that must have been attained by the reader in order to read the book. Students who are reading 'below their grade levels' are labeled as having reading problems, and those who are reading 'at or above their grade levels' are assumed to be good readers—without reading problems. The goal of instruction in most reading intervention programs is to bring a student 'up to grade level.' It is often assumed that a student who is, for example, in eighth grade and is 'reading on $4^{th}$ grade level' can read $1^{st}$, $2^{nd}$, $3^{rd}$, or $4^{th}$ grade books just fine, but he will have problems with $5^{th}$, $6^{th}$, $7^{th}$, and $8^{th}$ grade books. If he could read $8^{th}$ grade books but not $9^{th}$ grade books, he would not be considered behind in reading.

THE METHOD'S THEORY CHALLENGES THESE ASSUMPTIONS—Changing the Traditional Paradigm In the present methodology, a reading problem is defined as a neural network in the brain that inappropriately drives the implicit process of reading. The student has to read the way his network guides the process, and it uses the same neural network on every book it reads—whether its Dick and Jane or Einstein's Theory of Relativity.

To eliminate the reading problem, the brain must remodel the neural network so it guides the implicit process of reading appropriately. Once that occurs, the student can easily and comfortably read any book he has sufficient prior knowledge to understand. We wouldn't expect a $4^{th}$ grade student to read an $11^{th}$ grade book because he would probably not know a significant amount of concepts and vocabulary presented by the author. We would, however, expect an $8^{th}$ grade student to read $9^{th}$ grade books because most $8^{th}$ graders are familiar with the concepts and vocabulary in $9^{th}$ grade books. For students without reading problems, their own prior knowledge determines whether they can read any particular book—the grade level is irrelevant.

Grade-level is a concept that has relevance only if the reader has a reading problem. If the network guides reading inappropriately, then the complexity of the text can limit the reader's success in understanding the author's message. An $8^{th}$ grade student who scores at $4^{th}$ grade on a reading test can't read $4^{th}$ grade books efficiently, effectively, and comfortably because he uses the same erroneously-operating guidance system no matter what he reads. He has managed to understand the message in $4^{th}$ grade books in spite of the reading problem, but reading anything will be an uncomfortable task requiring effort.

For students with reading problems, there is a correlation between the degree of a reading problem and the degree of effort that must be expended to read. As the complexity (grade level) of the text increases, so does the effort expended to read it. If the book is sufficiently complex in relation to the severity of the reading problem, the student will not be able to read it. Students with severe reading problems cannot read even moderately complex books. Students with mild reading problems, on the other hand may be able to read any book, regardless of complexity, providing they have enough prior knowledge to read it and providing they are willing to expend the effort made necessary by the existence of the reading problem.

THE GRADUATION RANGE IN THE METHOD

A student graduates from the method when the neural network driving the implicit reading process is corrected. You will have a sense of knowing he is reading excellently in the Coached Reading component, and you will also notice that he is reading smoothly and fluently—without explicit symptoms. The range where this occurs is irrelevant.

Throughout the student's participation in the method, he is moved to higher levels of text complexity as his reading problem improves. Doing so incorporates the appropriate degree of struggle into the methodology, which maximizes the rate of improvement. The progress of the brain will be slowed however, if it is confronted with books that contain new concepts and new vocabulary. The brain's cognitive energy will be diverted to figuring out the new information and away from correcting the implicit process of reading.

Students with reading problems have not had an opportunity to increase their vocabularies or their conceptual understanding through reading. The older they get, the more depressed their vocabularies and conceptual knowledge become as compared to students without reading problems.

You must be particularly sensitive when moving high school students past the purple range. The yellow and orange ranges frequently contain patterns of unknown vocabulary for this age group. Keep in mind that many adults have not mastered $10^{th}$ grade vocabulary.

Stop advancing your students and hold them in the ranges indicated until they graduate.

First and second grade students normally graduate in the green range.

Third and fourth grade students normally graduate in the blue range

Fifth and sixth grade students normally graduate in the lime range

Seventh and eighth grade students normally graduate in the purple range

Ninth, tenth, eleventh, and twelfth grade students normally graduate in the purple range If your student has advanced conceptual and vocabulary knowledge, he can graduate in a higher range than his specified graduation range. You can continue advancing him as long as he does not encounter too many vocabulary words he doesn't know.

PROCESS FOR IDENTIFYING AN EXCELLENT READER—FIRST READ (Not Tape Recorded)

You use the Graduation Check List (FIG. 30).

A. Stop the normal coaching process.

B. Take the book from the student saying, "I'm going to do something a little different." Offer no further explanation unless necessary.

C. Without verbalizing your purpose, select three pages or columns of text.

D. Say to the student "I want you to read these three pages (or columns) out loud. I won't be coaching you, but I will be using a Check List."

E. Listen for symptoms. Rest your pencil in the first check mark box in the "Identifiable Symptoms" row 301 on the Graduation Check List (FIG. 30). You will be able to concentrate on the reading better if you don't have to search for the appropriate checkmark box every time you identify a symptom. Immediately after you make a check mark in the first box, move your pencil to the second one, etc.

If you identify a symptom or if you think it's a disturbance, but you are not sure Put a check mark in the "Identifiable Symptoms" box 301 on the Graduation Check List.

If you identify a disturbance and you are certain it was not a symptom

Disregard it.

If the student self-corrects

Put a check mark in the "Self-Corrections" box 302 on the Graduation Check List. When the "Self-Correction" boxes 302 are full, put the next check mark(s) for a self-correction in the "Identifiable Symptoms" box 301.

If the student re-starts

Put a check mark in the "Re-Start" box 303 on the Graduation Check List. When the "Re-Start" box 303 is full, put the next check mark(s) for a re-start in the "Identifiable Symptoms" box. 301.

F. When the student finishes the read, decide whether to return to tutoring or to continue with the graduation process based on the following criteria.

If there are three check marks in any section of the "Check Marks for Identifiable Symptoms" row on the Graduation Check List Erase all the check marks in the "First Reading (not tape recorded): Identifying an Excellent Reader" boxes 301–303 on the Graduation Check List. Return to tutoring.

If there are fewer than three check marks in all sections of the "Check Marks for Identifiable Symptoms" row on the Graduation Check List Erase all the check marks in the "First Reading (not tape recorded): Identifying an Excellent Reader" boxes 301–303 on the Graduation Check List. Proceed to "Process for Identifying a Graduate," described below.

PROCESS FOR IDENTIFYING A GRADUATE—SECOND READING (Tape Recorded)

A. Say to the student "You're doing great. I need to listen to you again, and this time I'm going to record you." Retrieve the student's original consultation tape. Fast forward to the blank area on the tape.

B. Say to the student "I want you to read three new pages (or columns) out loud. I won't be coaching you, but I will be using a Check List." Use the book you have been using for Coached Reading.

C. Set the tape recorder to record, and tell the student to begin reading.

D. Listen for symptoms. Rest your pencil in the first check mark box in the "Identifiable Symptoms" row 306 on the Graduation Check List. (FIG. 30). You will be able to concentrate on the reading better if you don't have to search for the appropriate checkmark box every time you identify a symptom. Immediately after you make a check mark in the first box, move your pencil to the second one, etc.

If you identify a symptom or if you are not sure if it's a symptom or a disturbance Put a check mark in the "Identifiable Symptoms" box 306 on the Graduation Check List.

If you identify a disturbance and you are certain it was not a symptom Disregard it.

If the student self-corrects

Put a check mark in the "Self-Corrections" box 307 on the Graduation Check List. When the "Self-Correction" boxes 307 are full, put the next check mark(s) for a self-correction in the "Identifiable Symptoms" box 306.

If the student re-starts

Put a check mark in the "Re-Start" box 308 on the Graduation Check List. When the "Re-Start" box 308 is full, put the next check mark(s) for a re-start in the "Identifiable Symptoms" box 306.

E. When the student finishes the read, stop the recorder and decide whether to return to tutoring or to continue with the graduation process using the following criteria.

If there are three check marks in any section of the "Check Marks for Identifiable Symptoms" row on the Graduation Check List Return to tutoring.

If there are fewer than three check marks in all sections of the "Check Marks for Identifiable Symptoms" row on the Graduation Check List Rewind the tape to the beginning of the 3-page (or column) set and listen to the student's reading again. Do not use the Graduation Check List. Concentrate only on listening to the read.

After listening to the recording, reflect on the reading and rely on your intuitive response to answer the question, "Is he an excellent reader?"

If you experience a sense of knowing the student is an excellent reader

Place a check mark in the "Experiencing a Sense of Knowing the Student is an Excellent Reader" box 309 in the Graduation Check List.

Record the following pertinent student information on the consultation tape.

1. Student's name and identification number

2. The range the student started in and the range he graduated from

3. The total hours tutored in the method
4. The date of graduation
5. Conduct the exit interview and file it in the project files.
6. Present the student with a graduation certificate. Some schools present the certificates in special award assemblies.
7. Archive the student's folder and consultation tape. Keep the completed Graduation Check List (FIG. 30) in the archived student folder.

If you experience a sense of knowing the student is not an excellent reader

Erase all the check marks in the "Second Reading (tape recorded): Identifying a Graduate" boxes 306–308 on the Graduation Check List (FIG. 30). Return to tutoring.

If you are uncertain

Erase all the check marks in the "Second Reading (tape recorded): Identifying a Graduate" boxes 306–308 on the Graduation Check List (FIG. 30). Return to tutoring.

XX. Development Process for the Method's Libraries

The library suitable for implementing the methodology described above is obtainable from READ RIGHT Systems, Inc. of Shelton Washington, and includes five separate libraries:

1. An elementary school library
2. A middle school library
3. A junior high school library
4. An adult library, which also is used for high school projects.
5. An English as a foreign language library for use in our overseas projects Each of these libraries was developed according to the following procedures:

STEP ONE: SCREENING POTENTIAL BOOKS

Books that have been ordered from various publishers are read and screened for linguistic authenticity and for content. The books selected must, in the aggregate, reflect a wide range of interests and must represent various ethnic groups.

STEP TWO: SUBJECTING BOOKS THAT PASS THE SCREENING TO A READABILITY ANALYSIS

All books that pass the initial screen for linguistic authenticity, interest, and ethnic representation are subjected to a readability analysis to determine the complexity level of the text. A minimum of six 100-word samples are randomly selected from each book (or selection from a book) and scanned into a computer where a software program analyzes them in order to affix a readability-level designation to each sample. The software program utilizes five different readability formulae, as appropriate, (Dale-Chall, Fog, Flesch, Fry, and SMOG) and averages the results from each individual formula in order to yield a single readability value. This is done for each of the six or more samples from each book.

STEP THREE: SELECTING THE BOOKS WHOSE READABILITY LEVEL(S) IS CONGRUENT WITH THE LIBRARY CATEGORIZATION SCHEME

Each book is reviewed to determine whether the readability value (expressed in grade-level) for each of the six samples is congruent. Except for the first grade, the method's libraries are categorized in two grade-level ranges (primer-first; second-third; fourth-fifth; sixth-seventh; eighth-ninth; tenth-eleventh; twelfth-college) and are color-coded. To be included, 80% of the analyzed passages must fall into the defined category, plus or minus 0.2. For example, if a passage yields a readability value of 3.8–5.1, it can be called a blue (4–5) passage, and if 80% of the passages meet this criteria, it will be included in the library as a blue book. The highest range included differs from library to library. For example, it would not make sense to include the 12-college range in the elementary library!

STEP FOUR: OBTAINING PUBLISHERS' AND AUTHORS' PERMISSIONS TO TAPE-RECORD BOOKS

For selected books that matches the above-described categorization scheme for readability level, letters are sent to the authors and/or publishers seeking permission to tape-record each book for inclusion in the method's libraries. Only those books for which permission is granted are tape-recorded for use in the Excellent Reading component of the method.

STEP FIVE: FINALIZING THE LIBRARIES

The final step in developing the libraries is to sort the books that have passed the initial screen and that fit the ranges defined in the categorization scheme. It is ensured that sufficient numbers of books were recorded with the authors' permission at each range and that sufficient numbers of books were obtained at each range for the Coached Reading and Independent Reading components of our tutoring methodology. It is also verified that each range reflects a wide range of interests and is representative of the ethnic diversity of our country. If any "holes" are found anywhere, books to fill those gaps are searched, and those books are subjected to the same scrutiny as described above.

STEP SIX: CONTINUOUS IMPROVEMENT OF THE LIBRARIES

The libraries are improved on a continuous basis based on feedback from the users of the method. Also, catalogues from many publishers are received so that new titles can be sought periodically to enhance the existing libraries.

While the preferred embodiments of the invention have been illustrated and described, it will be appreciated that various changes can be made therein without departing from the spirit and scope of the invention.

The embodiments of the invention in which an exclusive property or privilege is claimed are defined as follows:

1. A method of teaching reading text to a student using audio tape-recorded text, the method being adapted to assist the student in guiding the process of reading, the student being placed in one of a plurality of reading skill levels under the method that are designed to accommodate students with various degrees of reading problems, the method comprising the steps of:
   (a) teaching the student the concept of excellent reading, wherein excellent reading is defined as an oral reading free of symptoms comprising:
      (i) omitting a word from the text;
      (ii) inserting a word in the text;
      (iii) inserting a nonsense word in the text;
      (iv) substituting a word in the text for a different word;
      (v) self-correcting;
      (vi) re-reading correctly read text; and
      (vii) unnatural cadence comprising:
         pauses that occur in places other than the end of a sentence or the end of an independent clause,
         the vowel sound in a word is elongated during pronunciation,
         the letter 't' in a word is pronounced /t/ instead of /d/,
         reading in a monotone,
         reading in an announcing voice,
         reading in a sing-song voice,
         rushing through periods at the end of sentences, and
         uneven speed during reading;
   (b) having a student perform a cycle, including:
      (i) having the student listen to audio tape-recorded text while reading along silently, and
      (ii) having the student pause the audio tape and silently read the same text on his own;
   (c) repeating the cycle in steps (b) until the student indicates that he can now excellently read the text;

(d) having the student read the text aloud;

(e) determining whether the student's oral reading was excellent or not;

(f) having the student determine whether his oral reading was excellent or not;

(g) if the student's oral reading was excellent and the student says it was, returning to step (b) using different text;

(h) recording one occurrence of excellence misjudgment, if:
  (i) the student's oral reading was not excellent and the student says it was,
  (ii) the student's oral reading was excellent and the student says it was not, or
  (iii) the student cannot state if his oral reading was excellent or not;

(i) recording one occurrence of cycle confusion indicating that the student did not perform enough cycles to achieve excellent reading, if the student's oral reading was not excellent and the student says it was not; and (j) repeating steps (b) through (i) until:
  (i) a predetermined number of occurrences of excellence misjudgment is recorded, then teaching the student the concept of excellent reading again using a predefined instruction set, or
  (ii) a predetermined number of occurrences of cycle confusion is recorded, then teaching the student the concept of performing enough cycles to achieve excellent reading using a predefined instruction set.

2. The method of claim 1, wherein step (h) further comprises administering a predefined guiding remark or technique to illustrate the concept of excellent reading.

3. The method of claim 1, wherein step (i) further comprises administering a predefined guiding remark or technique to illustrate the concept of performing enough cycles to achieve excellent reading.

4. The method of claim 1, wherein the predetermined number of occurrences of excellence misjudgment or cycle confusion is three.

5. The method of claim 1, wherein misjudgment of excellence and cycle confusion are recorded on a guiding checklist, and the concept of excellent reading and the concept of performing enough cycles to achieve excellent reading are taught using an instruction checklist.

6. The method of claim 1, further comprising the steps of:

(k) whenever the student exhibits behavior corresponding to at least one behavior predetermined to be inappropriate in an educational setting:
  (i) administering a predefined guiding remark or technique to illustrate the importance of behavior appropriate in an educational setting;
  (ii) recording one occurrence of inappropriate behavior; and (l) if a predetermined number of occurrences of inappropriate behavior are recorded, teaching the student the importance of appropriate behavior using a predefined instruction set.

7. The method of claim 1, wherein the concept of excellent reading is taught using a Label the Read sequence defined as:
  (a) having the student read unfamiliar text aloud;
  (b) determining if the student's reading was excellent reading, and if not, telling the student that his reading was not excellent reading;
  (c) having the student perform a cycle, including:
    (i) having the student listen to a subportion of the text while reading along silently, and
    (ii) having the student silently read the same text that he has listened to on his own;
  (d) repeating the cycle for a predetermined number of times;
  (e) encouraging the student to perform an excellent reading of the text aloud; and
  (f) telling the student when he performs an excellent reading of the text, so that the student can compare nonexcellent reading and excellent reading after having experienced both.

8. The method of claim 1, wherein the concept of excellent reading is taught using a Choose the Feedback sequence defined as:
  (a) having the student perform a cycle, including:
    (i) having the student listen to text while reading along silently, and
    (ii) having the student silently read the same text that he has listened to on his own;
  (b) repeating the cycle for a predetermined number of times;
  (c) having the student read the text aloud; and
  (d) if the student's oral reading is not excellent reading:
    (i) telling the student that his reading was not excellent reading, and
    (ii) naming or modeling symptoms that the student exhibited to reflect non-excellent reading.

9. The method of claim 2, further comprising the steps of:

(m) measuring the time elapsed since the student last achieved excellent reading;

(n) if the time exceeds 10 minutes, probing the cause for such lack of efficiency in achieving excellent reading by asking a predefined set of questions to the student, and eliminating the cause using a predefined set of solutions.

10. The method of claim 1, further comprising the step of:

(o) whenever the student does not know a vocabulary word or concept within the text, administer a Language Acquisition Discussion defined as:
  (i) defining the vocabulary word or the concept,
  (ii) explaining the vocabulary word or the concept outside the context of the text, and
  (iii) explaining the vocabulary word or the concept as being tied to the context of the text.

11. The method of claim 1, wherein a plurality of students are taught at the same time according to a predefined set of guidelines and processes.

12. The method of claim 1, wherein the student is placed in a reading skill level using a predefined interview procedure, the interview procedure comprising the steps of:

having the student read text aloud;

recording any errors in cadence corresponding to a series of predetermined errors marked by an interruption in the flow of language in the student's reading;

recording semantic and syntactic errors exhibited in the student's reading;

recording self-corrections exhibited in the student's reading;

recording text deviations exhibited in the student's reading; and quantifying the errors in cadence, semantic and syntactic errors, self-corrections, and text deviations according to a set of predefined scale systems.

13. The method of claim 12, wherein the student's progress in reducing his reading problem is monitored using a predefined Symptom Reduction Analysis procedure, the procedure comprising the steps of:

having the student read text aloud;

recording any errors in cadence exhibited in the student's reading;

recording semantic and syntactic errors exhibited in the student's reading;

recording self-corrections exhibited in the student's reading;

recording text deviations exhibited in the student's reading; and quantifying the errors in cadence, semantic and syntactic errors, self-corrections, and text deviations according to a set of predefined scale systems.

\* \* \* \* \*

UNITED STATES PATENT AND TRADEMARK OFFICE
CERTIFICATE OF CORRECTION

PATENT NO. : 6,869,287 B1
DATED : March 22, 2005
INVENTOR(S) : K.R. Tadlock et al.

It is certified that error appears in the above-identified patent and that said Letters Patent is hereby corrected as shown below:

Column 93,
Line 23, "(i) repeating steps (b)" should read -- (j) repeating steps (b) --

Column 94,
Lines 2-5, double indent the clauses beginning "(i)" and "(ii)"
Line 31, "claim 2," should read -- claim 1, --

Signed and Sealed this

Ninth Day of August, 2005

JON W. DUDAS
*Director of the United States Patent and Trademark Office*